US011108992B2

(12) United States Patent
Tsunashima

(10) Patent No.: US 11,108,992 B2
(45) Date of Patent: Aug. 31, 2021

(54) IMAGING CONTROL DEVICE AND METHOD, AND VEHICLE

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 131 days.

(21) Appl. No.: 16/303,515

(22) PCT Filed: May 25, 2017

(86) PCT No.: PCT/JP2017/019490
§ 371 (c)(1),
(2) Date: Nov. 20, 2018

(87) PCT Pub. No.: WO2017/212927
PCT Pub. Date: Dec. 14, 2017

(65) Prior Publication Data
US 2020/0329215 A1 Oct. 15, 2020

(30) Foreign Application Priority Data

Jun. 8, 2016 (JP) .............................. JP2016-114386

(51) Int. Cl.
*H04N 7/18* (2006.01)
*G06T 7/579* (2017.01)
(Continued)

(52) U.S. Cl.
CPC ............... *H04N 7/18* (2013.01); *G06T 7/579* (2017.01); *G06T 7/593* (2017.01); *H04N 5/247* (2013.01);
(Continued)

(58) Field of Classification Search
CPC ...... H04N 7/18; H04N 13/204; H04N 13/239; H04N 13/243; H04N 13/25; H04N 5/247;
(Continued)

(56) References Cited

U.S. PATENT DOCUMENTS 6,737,964 B2    5/2004 Samman et al.
8,497,905 B2 *  7/2013 Nixon .................. B64G 1/1021
                                                    348/143
(Continued)

FOREIGN PATENT DOCUMENTS

CN    1813168 A    8/2006
CN    103154666 A  6/2013
(Continued)

OTHER PUBLICATIONS

International Search Report and Written Opinion of PCT Application No. PCT/JP2017/019490, dated Aug. 15, 2017, 12 pages of ISRWO.

(Continued)

Primary Examiner — Alexander Gee
(74) Attorney, Agent, or Firm — Chip Law Group

(57) ABSTRACT

The present technology relates to an imaging control device and method, and a vehicle that enable distance measurement with higher accuracy. An imaging control unit controls imaging by a stereo camera system including at least a set of cameras arranged in a vertical direction, the set of cameras including at least one camera arranged to have an optical axis directed obliquely downward, and a monitoring processing unit performs monitoring processing on the basis of an image captured by the stereo camera system. For example, distance measurement processing is performed on the basis of an image captured by at least the set of cameras arranged to have at least one optical axis directed obliquely downward on a side surface of the vehicle. The present technology can be applied to driving assistance of a vehicle.

12 Claims, 42 Drawing Sheets

(51) Int. Cl.
*G06T 7/593* (2017.01)
*H04N 13/204* (2018.01)
*H04N 5/247* (2006.01)
*G06K 9/46* (2006.01)
*G06K 9/62* (2006.01)
*B60R 1/00* (2006.01)
*G01C 3/14* (2006.01)
*G01C 3/20* (2006.01)
*G06K 9/00* (2006.01)
*G01C 3/06* (2006.01)

(52) U.S. Cl.
CPC . *H04N 13/204* (2018.05); *G06T 2207/10012* (2013.01); *G06T 2207/30252* (2013.01)

(58) Field of Classification Search
CPC .................. G06T 7/579; G06T 7/593; G06T 2207/10012; G06T 2207/30252; G08B 13/19608; B60R 1/002; B60R 1/007; B60R 2300/107; B60R 2300/202; B60R 2300/301; B60R 2300/802; B60R 2300/8066; B60R 2300/8093
See application file for complete search history.

(56) References Cited

U.S. PATENT DOCUMENTS

| | | | |
|---|---|---|---|
| 2004/0105579 A1* | 6/2004 | Ishii | B60R 1/00 |
| | | | 382/154 |
| 2006/0072914 A1* | 4/2006 | Arai | G01S 17/931 |
| | | | 396/106 |
| 2008/0304705 A1 | 12/2008 | Pomerleau et al. | |
| 2010/0231717 A1* | 9/2010 | Sasaki | G06T 7/80 |
| | | | 348/148 |
| 2013/0182906 A1* | 7/2013 | Kojo | G06T 7/521 |
| | | | 382/103 |
| 2014/0002601 A1* | 1/2014 | Takano | H04N 13/398 |
| | | | 348/43 |
| 2014/0362193 A1* | 12/2014 | Kanetake | G06K 9/00805 |
| | | | 348/50 |
| 2015/0358610 A1* | 12/2015 | Takahashi | H04N 13/128 |
| | | | 348/47 |
| 2017/0116758 A1* | 4/2017 | Grewe | B60R 11/04 |

FOREIGN PATENT DOCUMENTS

| | | |
|---|---|---|
| DE | 10296593 T5 | 5/2004 |
| EP | 1645844 A1 | 4/2006 |
| EP | 2722646 A1 | 4/2014 |
| JP | 05-114099 A | 5/1993 |
| JP | 2002-359838 A | 12/2002 |
| JP | 2005-077130 A | 3/2005 |
| JP | 2008-085710 A | 4/2008 |
| JP | 2009-202610 A | 9/2009 |
| JP | 4861574 B2 | 1/2012 |
| JP | 2013-053962 A | 3/2013 |
| JP | 2013-070177 A | 4/2013 |
| JP | 2015-232455 A | 12/2015 |
| JP | 6417729 B2 | 11/2018 |
| WO | 02/080557 A1 | 10/2002 |
| WO | 2002/080557 A1 | 10/2002 |
| WO | 2005/022083 A1 | 3/2005 |
| WO | 2012/172870 A1 | 12/2012 |

OTHER PUBLICATIONS

Extended European Search Report of EP Application No. 17810107.7, dated Jun. 3, 2019, 10 pages.
Office Action for EP Patent Application No. 17810107.7, dated May 28, 2020, 8 pages of Office Action.
Office Action for CN Patent Application No. 201780034071.5 dated Sep. 28, 2020, 5 pages of Office Action and 6 pages of English Translation.

* cited by examiner

IMAGING CONTROL DEVICE AND METHOD, AND VEHICLE

CROSS REFERENCE TO RELATED APPLICATIONS

This application is a U.S. National Phase of International Patent Application No. PCT/JP2017/019490 filed on May 25, 2017, which claims priority benefit of Japanese Patent Application No. JP 2016-114386 filed in the Japan Patent Office on Jun. 8, 2016. Each of the above-referenced applications is hereby incorporated herein by reference in its entirety.

TECHNICAL FIELD

The present technology relates to an imaging control device and method, and a vehicle, and in particular to an imaging control device and method, and a vehicle that enable distance measurement with higher accuracy.

BACKGROUND ART

There are cases where a camera is attached to a vehicle such as an automobile or an object, and a picture by the camera is visually monitored or processed by a computer to automatically monitor the video. This is to prevent damage such as accidents and to perform automatic driving by grasping circumstances around the vehicle.

To recognize an object in a three-dimensional space, there is a technology of measuring a distance of the object in a three-dimensional space. As one of distance measurement technologies, a stereo camera system that measures a distance from pictures captured by two (or more) cameras using the principle of triangulation method is known (for example, Patent Document 1).

There is a device that attaches such a stereo camera system to a vehicle and measures a distance to an object around the vehicle such as an object in front of, behind, on a side of the vehicle, thereby to monitor the safety of the vehicle such as collision avoidance. So far, the stereo camera systems have been often mainly attached to the front of vehicles. Since vehicles basically move forward, ensuring the safety in front of vehicles is most important. Furthermore, use of a stereo camera for monitoring the rear from the viewpoint of collision prevention and the like is known (for example, Patent Document 2).

In contrast, monitoring sides of vehicles is necessary to prevent collisions at the time of lane change, entrainment at the time of right or left turn, and the like. However, in general, the importance is lower than the monitoring the front and the rear of vehicles. In addition, covering the entire side surfaces of vehicles, which requires a wider monitoring range than monitoring the front and the rear of vehicles, is costly. With these two problems, monitoring by distance measurement of the sides of the vehicles has not been done much. However, to improve the safety of vehicles, side monitoring is also important and solving these two problems is desired.

Therefore, to perform distance measurement in a wide range at a low cost, covering the entire side surfaces of a vehicle with a pair of stereo camera systems has been proposed (for example, Patent Document 3).

Patent Document 3 proposes use of a special optical system that enlarges an end portion of an imaging screen of a typical wide-angle lens in order to solve a problem that resolution is lowered at the edge portion of the screen. However, with such an optical system, there is a problem that a dead angle occurs in an oblique direction of the camera, which is costly.

Furthermore, a proposal to solve a problem in a case where a camera of a complementary metal oxide semiconductor (CMOS) image sensor, which has become mainstream in recent years, is applied to a stereo camera system has been made (for example, Patent Document 4).

CITATION LIST

Patent Document

Patent Document 1: Japanese Patent Application Laid-Open No. 05-114099
Patent Document 2: Japanese Patent Application Laid-Open No. 2008-85710
Patent Document 3: Japanese Patent Application Laid-Open No. 2013-53962
Patent Document 4: Japanese Patent Application Laid-Open No. 2013-70177

SUMMARY OF THE INVENTION

Problems to be Solved by the Invention

However, the proposal of Patent Document 4 merely solves the problem that occurs in a case where the camera of the CMOS image sensor is driven by a rolling shutter method. The proposal of Patent Document 4 is difficult to accurately measure a distance to an object in the vicinity of a vehicle, and is thus difficult to be applied to, for example, monitoring sides of the vehicle, which requires measurement of a distance to an object close to the vehicle.

The present technology has been made in view of such a situation, and enables distance measurement with higher accuracy.

Solutions to Problems

One aspect of the present technology is an imaging control device including an imaging control unit configured to control imaging by a stereo camera system including at least a set of cameras arranged in a vertical direction, the set of cameras including at least one camera arranged to have an optical axis directed obliquely downward, and a monitoring processing unit configured to perform monitoring processing on the basis of an image captured by the stereo camera system.

The image can be an image captured by the camera arranged on a side surface of a vehicle.

The monitoring processing unit can calculate a distance of a target object along a surface on which the vehicle travels.

The target object can include any one of a road surface, an identification display on the road surface, an end portion of the road surface, a curb, and a guardrail.

Another monitoring processing unit configured to calculate a distance of a target object perpendicular to the surface where the vehicle travels can be further included.

The monitoring processing unit can perform distance measurement processing based on the stereo camera system, and the another monitoring processing unit can perform distance measurement processing by motion stereo processing.

The monitoring processing unit can detect an edge from the image captured by the camera, and calculate a distance on the basis of an angle of the edge.

An image conversion unit configured to convert the image captured by the camera into an image viewing a periphery of the vehicle can be further included.

A distance measurement unit configured to perform distance measurement processing for a distance in front of and behind the vehicle by an ultrasonic wave, a radar, a laser sensor, or an infrared sensor can be further included.

The camera arranged to have an optical axis directed obliquely downward can be arranged such that an angle made by the optical axis and a direction toward directly below the vehicle from the optical axis falls within a range from $\Pi/6$ to $5\Pi/12$.

The image captured by the camera can be an image captured by a wide-angle camera.

At least a set of cameras configuring the stereo camera system can be further included.

One aspect of the present technology is an imaging control method including a step of controlling imaging by a stereo camera system including at least a set of cameras arranged in a vertical direction, the set of cameras including at least one camera arranged to have an optical axis directed obliquely downward, and a step of performing monitoring processing on the basis of an image captured by the stereo camera system.

One aspect of the present technology is a vehicle including a stereo camera system including at least a set of cameras arranged in a vertical direction, the set of cameras including at least one camera arranged to have an optical axis directed obliquely downward, and a monitoring processing unit configured to perform monitoring processing on the basis of an image captured by the stereo camera system.

In one aspect of the present technology, the imaging control unit controls imaging by a stereo camera system including at least a set of cameras arranged in a vertical direction, the set of cameras including at least one camera arranged to have an optical axis directed obliquely downward, and the monitoring processing unit performs monitoring processing on the basis of an image captured by the stereo camera system.

Effects of the Invention

As described above, according to one aspect of the present technology, distance measurement can be performed with higher accuracy.

Note that the effects described in the present specification are merely examples and are not limited, and additional effects may be exhibited.

MODE FOR CARRYING OUT THE INVENTION

Hereinafter, modes for carrying out the present technology will be described. Note that the description will be given in the following order.

1. First Embodiment: Imaging Control System (FIGS. 1 to 14)
   (1) Imaging Control System (FIGS. 1 to 3)
   (2) Configuration of Imaging Control Device (FIGS. 4 to 6)
   (3) Operation of Distance Measurement Unit (FIG. 7)
   (4) Operation of Distance Accuracy Improvement Unit (FIGS. 8 to 13)
   (5) Error
   (6) Integration Processing (FIG. 14)
   (7) Modification (FIGS. 15 and 16)
2. Second Embodiment: Imaging Control System (FIGS. 17 to 40)
   (1) Arrangement of Cameras (FIGS. 17 to 22)
   (2) Configuration Example 1 of Imaging Control System (FIGS. 23 and 24)
   (3) Configuration Example 2 of Imaging Control System (FIGS. 25 and 26)
   (4) Configuration Example 3 of Imaging Control System (FIGS. 27 to 30)
   (5) Configuration Example 4 of Imaging Control System (FIGS. 31 to 37)
   (6) Modifications (FIGS. 38, 39A, 39B, 39C, 40A, and 40B)
3. Application Example (FIGS. 41 and 42)
4. Others

Figure 1:
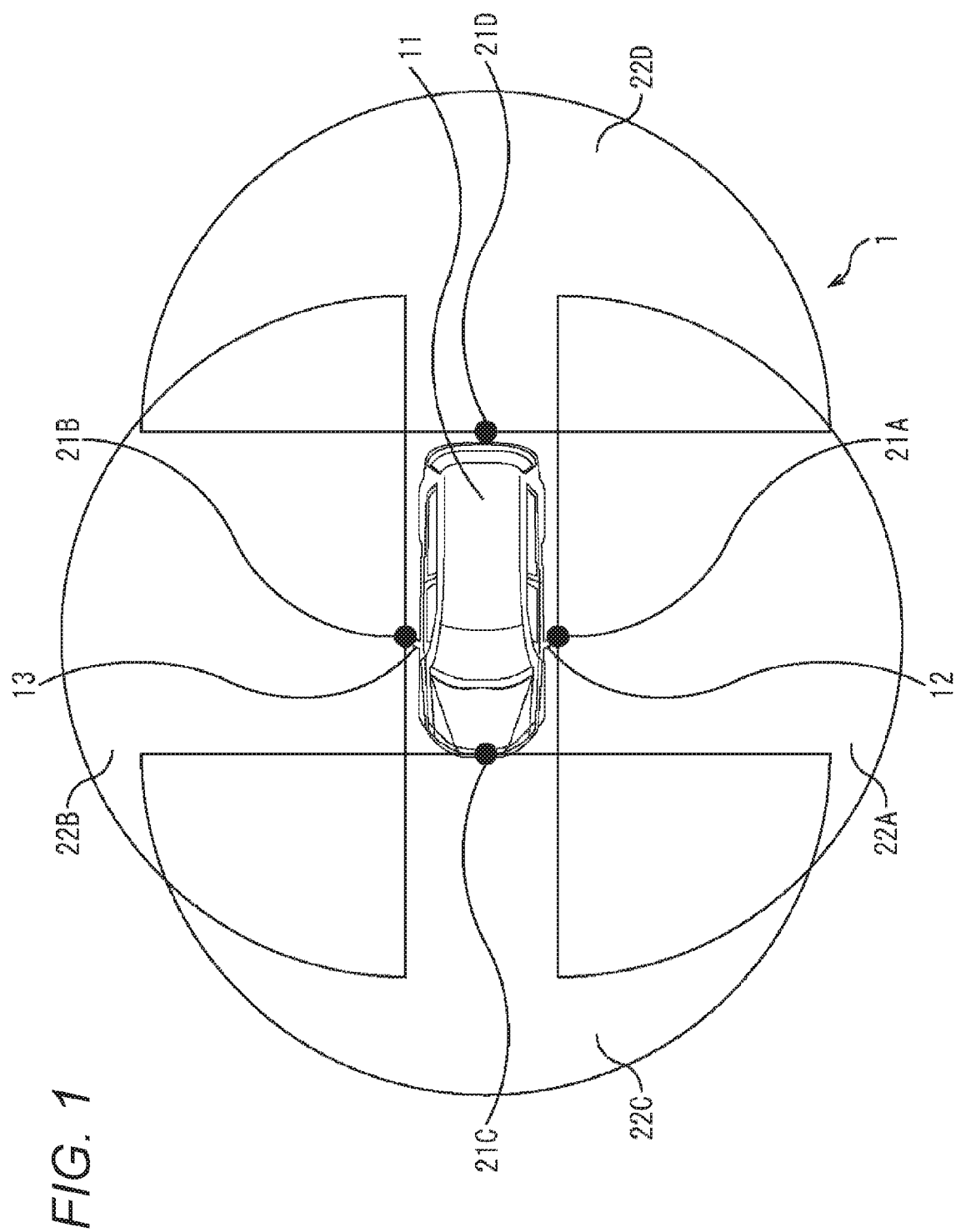
FIG. 1 is a diagram illustrating a configuration of an imaging control system according to a first embodiment of the present technology.
Figure 2:
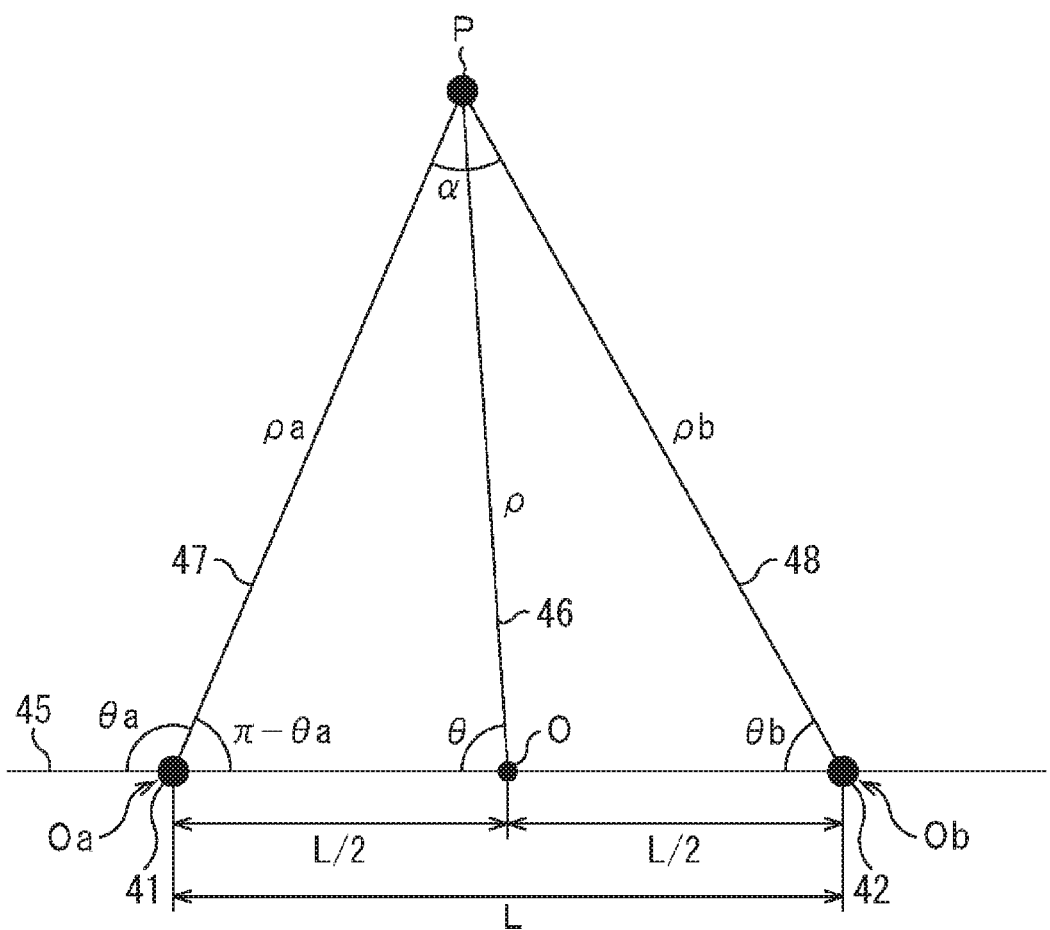
FIG. 2 is a diagram illustrating a coordinate system of a stereo camera system according to the first embodiment of the present technology.
Figure 3:
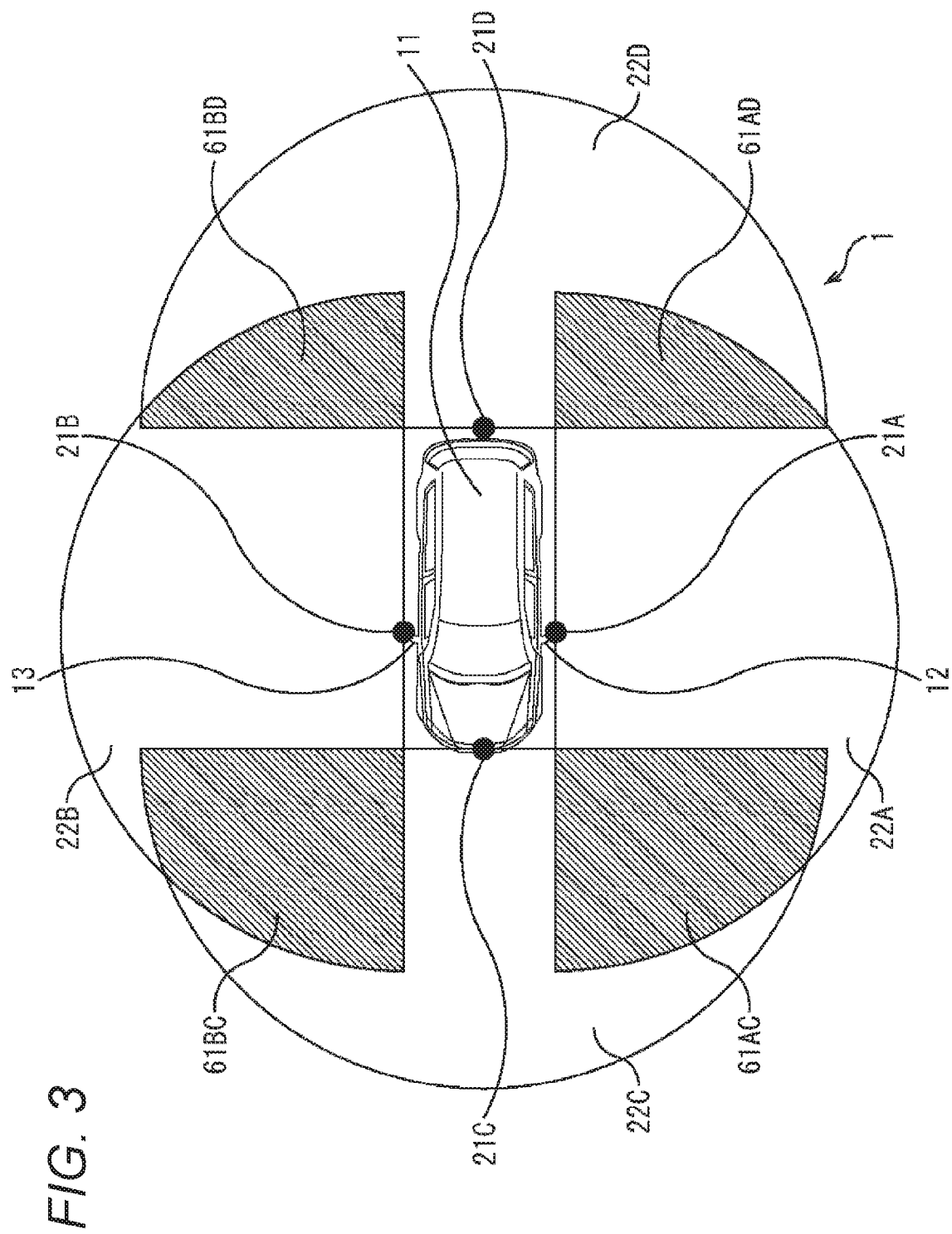
FIG. 3 is a diagram for describing a range in which distance measurement accuracy is low according to the first embodiment of the present technology.

First Embodiment (1) Imaging Control System (FIGS. 1 to 3)

FIG. 1 is a diagram illustrating a configuration of an imaging control system according to a first embodiment of the present technology. In an imaging control system 1 of the present technology, as illustrated in FIG. 1, four sets of stereo camera systems 21A to 21D are attached in four directions of a vehicle 11. The stereo camera systems are attached to door mirrors on side surfaces of the vehicle 11 and are attached to bumpers on front and rear surfaces. When attached to the side surface, the stereo camera system can be attached to a pillar (a front pillar, a center pillar, a rear pillar, or the like), a door, a roof rail, or the like, other than the door mirror.

The stereo camera system 21A is installed on a left side of the vehicle 11 and measures a distance to a target object in a detection range 22A on the left side of the vehicle 11. The stereo camera system 21B is installed on a right side of the vehicle 11 and measures a distance to a target object in a detection range 22B on the right side of the vehicle 11. The stereo camera system 21C is installed on a front of the vehicle 11 and measures a distance to a target object in a detection range 22C in front of the vehicle 11. The stereo camera system 21D is installed at the rear of the vehicle 11 and measures a distance to a target object in a detection range 22D behind the vehicle 11.

Cameras (cameras 41 and 42 in FIG. 2 as described below) of the stereo camera systems 21A to 21D perform capture for distance measurement using a lens with a wide viewing angle. FIG. 1 illustrates an example of a case where the viewing angle is 180 degrees as the detection ranges 22A to 22D (note that, to actually secure the viewing angle of 180 degrees, a lens with a wider viewing angle than 180 degrees, for example, 190 degrees, is necessary). Furthermore, the detection ranges 22A to 22D in FIG. 1 indicate ranges in an angular direction, and the size in a distance direction, that is, the size of a semicircle diameter is actually larger. This also similarly applies to FIG. 3 as described below.

Note that, precisely, the detection ranges 22A to 22D are areas where imaging ranges of the cameras 41 and 42 in FIG. 2 as described below overlap, but the detection ranges 22A to 22D are illustrated by semicircles with one radius for convenience.

Note that, in a case where it is not necessary to individually distinguish the stereo camera systems 21A to 21D, the stereo camera systems 21A to 21D are hereinafter described as stereo camera system 21. The four sets of stereo camera systems 21, which have similar other configuration elements, monitor entire periphery of the vehicle 11. A set of stereo camera systems 21 is configured by two or more cameras.

FIG. 2 is a diagram illustrating a coordinate system of the stereo camera system according to the first embodiment of the present technology. The coordinate system of the stereo camera system 21 is defined as illustrated in FIG. 2.

A center point of one camera 41 of the stereo camera system 21 configured by the two cameras 41 and 42 is Oa, a center point of the other camera 42 is Ob, a midpoint between the center point Oa and the center point Ob (that is, a central point of the stereo camera system 21) is O. A target point to be captured is P, and a distance (base line length) between the center point Oa and the center point Ob is L. Between angles formed by a straight line 46 connecting the target point P and the center point O and a straight line 45 passing through the center point Oa and the center point Ob, an angle on a left side in FIG. 2 (an angle formed by the straight line 46 and a line segment on a left side of the center point O on the straight line 45) is defined as θ. That is, the angle θ is an angle formed by the target point P to be captured and the stereo camera system 21. Note that the target point represents a target object to be captured, that is, an object to be monitored, and schematically represents, for example, a person, an obstacle, another vehicle, or the like around the vehicle 11 as a point.

Between angles formed by a straight line 47 connecting the target point P and the center point Oa and the straight line 45, an angle on a left side in FIG. 2 (an angle formed by the straight line 47 and a line segment on a left side in FIG. 2 of the center point Oa on the straight line 45) is defined as θa. Between angles formed by a straight line 48 connecting the target point P and the center point Ob and the straight line 45, an angle on a left side in FIG. 2 (an angle formed by the straight line 48 and a line segment on a left side in FIG. 2 of the center point Ob on the straight line 45) is defined as θb. An angle formed by the straight line 47 and the straight line 48 is α. Furthermore, a distance between the center point O and the target point P is ρ, a distance between the target point P and the center point Oa is ρa, and a distance between the target point P and the center point Ob is ρb. At this time, the following equation (1) is obtained from the sine theorem.

$$\rho a/\sin \theta b = L/\sin \alpha = L/\sin(\theta a - \theta b) \quad (1)$$

Note that $\alpha = \theta a - \theta b$.

Furthermore, the distance ρ between the center point O and the target point P can be written as the following equation (2).

$$\rho \cdot \sin \theta = \rho a \cdot \sin(\Pi - \theta ea) = \rho a \cdot \sin \theta a \quad (2)$$

The equation (3) is obtained from the equations (1) and (2).

$$\sin(\theta a - \theta b) = L/\rho \cdot \sin \theta a \cdot \sin \theta b / \sin \theta \quad (3)$$

In general, the distance (base line length) L between the center point Oa and the center point Ob is about several to several tens of cm, whereas the distance ρ from the center point O to the target point P is about, for example, several m, which is sufficiently large, and in this case, $\theta \approx \theta a$, and $\theta \approx \theta b$ are established. Further, $\theta b < \theta < \theta a$ is always established. From these conditions, the following approximate equation (4) is established.

$$\sin \theta a \cdot \sin \theta b \approx \sin^2 \theta \quad (4)$$

The following equation (5) is obtained from the equations (3) and (4).

$$\sin(\theta a - \theta b) \approx L/\rho \cdot \sin \theta \quad (5)$$

Since the angles θa and θb are angles of object light of the two cameras 41 and 42, a difference θa−θb between the angles is an angular difference of incident light. In stereo image processing, the distance to the target object is calculated from θa−θb. Since the base line length L is a constant, it is found that the difference θa−θb is inversely proportional to the distance ρ to the target object according to the equation (5). Therefore, the distance measurement accuracy decreases as the distance between the target object and the stereo camera system 21 increases.

One of major reasons to perform the distance measurement in the stereo camera system 21 mounted on the vehicle 11 is to detect an obstacle in the vicinity of the vehicle 11 and to prevent contact between the vehicle 11 and the obstacle. Therefore, it is reasonable that the distance measurement accuracy increases as the distance between the vehicle 11 and the obstacle is short.

However, there are places where the distance measurement accuracy is low although these places are close to the vehicle 11. Specifically, as illustrated in FIG. 3, the distance measurement accuracy in the vicinity of four corners of the vehicle 11 is low. FIG. 3 is a diagram for describing a range in which the distance measurement accuracy is low according to the first embodiment of the present technology.

As illustrated in FIG. 3, an area 61AC where the detection range 22A of the stereo camera system 21A and the detection range 22C of the stereo camera system 21C overlap is distant from both the stereo camera system 21A and the stereo camera system 21C. An area 61BC where the detection range 22B of the stereo camera system 21B and the detection range 22C of the stereo camera system 21C overlap is distant from both the stereo camera system 21B and the stereo camera system 21C.

Similarly, an area 61BD where the detection range 22B of the stereo camera system 21B and the detection range 22D of the stereo camera system 21D overlap is distant from both the stereo camera system 21B and the stereo camera system 21D. An area 61AD where the detection range 22A of the stereo camera system 21A and the detection range 22D of the stereo camera system 21D overlap is distant from both the stereo camera system 21A and the stereo camera system 21D.

Therefore, the distance measurement accuracy in these areas 61AC, 61BC, 61BD, and 61AD is low despite relatively close to the vehicle 11. Monitoring areas of the two stereo camera systems 21 overlap in the areas 61AC, 61BC, 61BD, and 61AD at the four corners. Therefore, in the present technology, the measurement accuracy is improved from distance measurement results of the two stereo camera systems 21.

Figure 4:
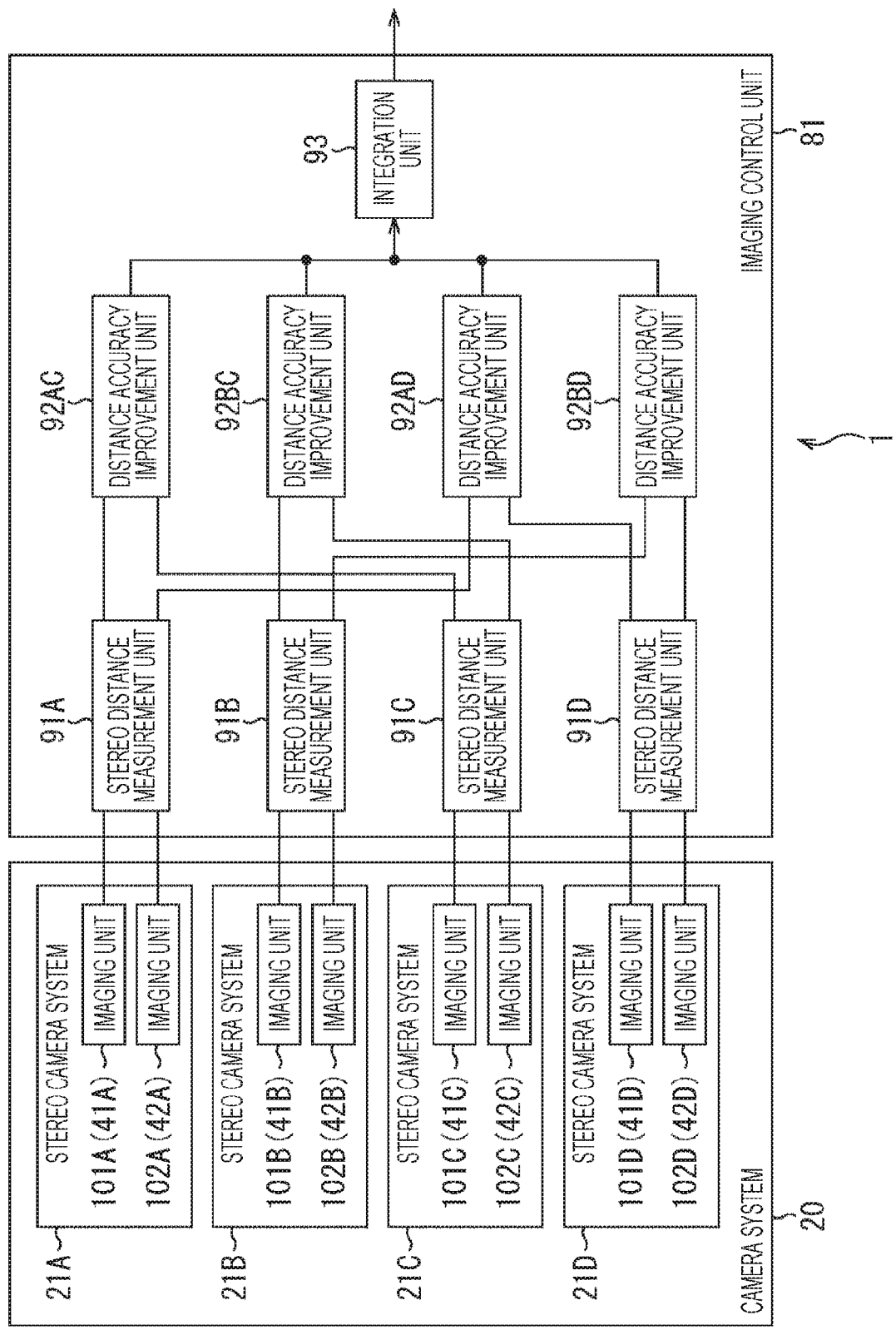
FIG. 4 is a block diagram illustrating a configuration of the imaging control system according to the first embodiment of the present technology.
Figure 5:
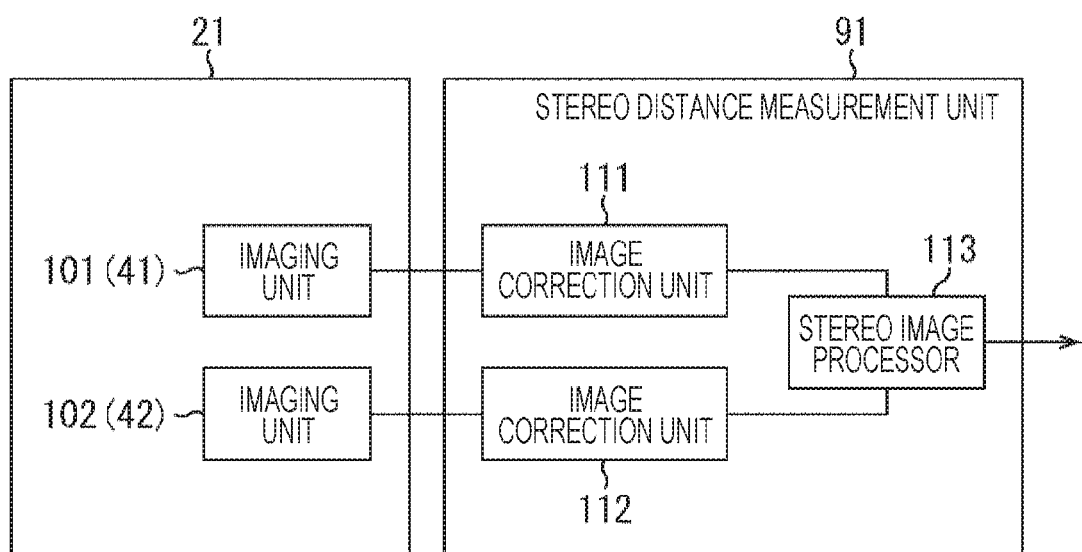
FIG. 5 is a block diagram illustrating a configuration of a stereo distance measurement unit according to the first embodiment of the present technology.
Figure 6:
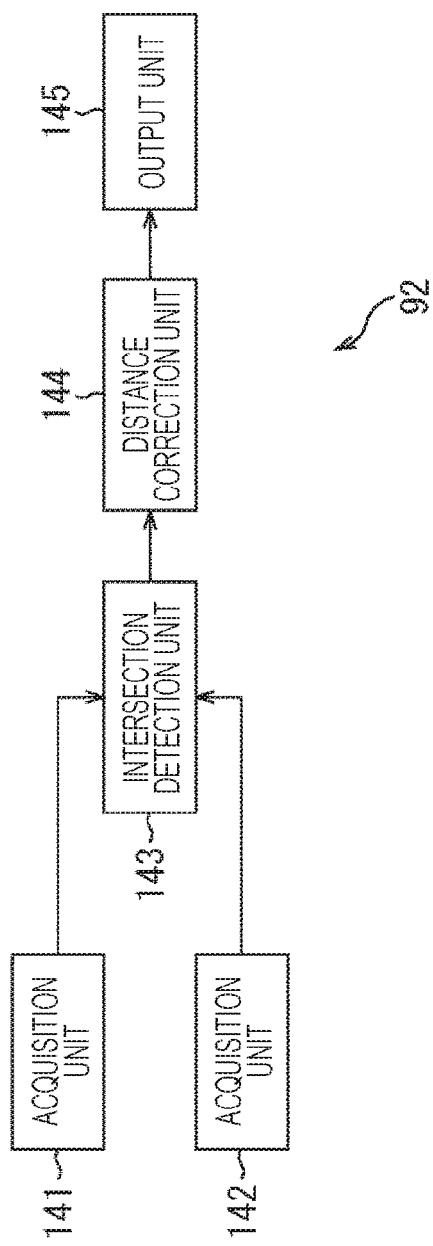
FIG. 6 is a block diagram illustrating a configuration of a distance accuracy improvement unit according to the first embodiment of the present technology.

(2) Configuration of Imaging Control Device (FIGS. 4 to 6)

FIG. 4 is a block diagram illustrating a configuration of the imaging control system 1 according to the first embodiment of the present technology. The imaging control system 1 is configured by a camera system 20 and an imaging control unit 81.

The camera system 20 includes the stereo camera systems 21A to 21D. The stereo camera system 21A includes an imaging unit 101A and an imaging unit 102A. The imaging unit 101A includes a camera 41A, and the imaging unit 102A includes a camera 42A.

Similarly, the stereo camera system 21B includes an imaging unit 101B and an imaging unit 102B, and the imaging unit 101B includes a camera 41B and the imaging unit 102B includes a camera 42B. The stereo camera system 21C includes an imaging unit 101C and an imaging unit 102C, and the imaging unit 101C includes a camera 41C and the imaging unit 102C includes a camera 42C. The stereo camera system 21D includes an imaging unit 101D and an imaging unit 102D, and the imaging unit 101D includes a camera 41D and the imaging unit 102D includes a camera 42D.

Images captured by the imaging units 101A and 102A are supplied to a stereo distance measurement unit 91A, and images captured by the imaging units 101B and 102B are supplied to a stereo distance measurement unit 91B. Images captured by the imaging units 101C and 102C are supplied to a stereo distance measurement unit 91C, and images captured by the imaging units 101D and 102D are supplied to a stereo distance measurement unit 91D.

The imaging control unit 81 is configured by the stereo distance measurement units 91A to 91D, a distance accuracy improvement unit 92AC, a distance accuracy improvement unit 92BC, a distance accuracy improvement unit 92AD, and a distance accuracy improvement unit 92BD. Further, the imaging control unit 81 includes an integration unit 93.

The stereo distance measurement unit 91A measures the distance in the detection range 22A on the left side of the vehicle 11. The stereo distance measurement unit 91B measures the distance in the detection range 22B on the right side of the vehicle 11. The stereo distance measurement unit 91C measures the distance in the detection range 22C in front of the vehicle 11. The stereo distance measurement unit 91D measures the distance in the detection range 22D behind the vehicle 11.

The distance accuracy improvement unit 92 acquires a measurement result from the stereo distance measurement unit 91 that measures the distance in the corresponding overlapping area 61, and improves the distance accuracy. In other words, the distance accuracy improvement unit 92AC acquires the measurement results of the stereo distance measurement unit 91A that measures the distance in the detection range 22A and the stereo distance measurement unit 91C that measures the distance in the detection range 22C, and improves the distance accuracy. The distance accuracy improvement unit 92BC acquires the measurement results of the stereo distance measurement unit 91B that measures the distance in the detection range 22B and the stereo distance measurement unit 91C that measures the distance in the detection range 22C, and improves the distance accuracy.

Similarly, the distance accuracy improvement unit 92AD acquires the measurement results of the stereo distance measurement unit 91A that measures the distance in the detection range 22A and the stereo distance measurement unit 91D that measures the distance in the detection range 22D, and improves the distance accuracy. The distance accuracy improvement unit 92BD acquires the measurement results of the stereo distance measurement unit 91B that measures the distance in the detection range 22B and the stereo distance measurement unit 91D that measures the distance in the detection range 22D, and improves the distance accuracy.

The integration unit 93 acquires and integrates outputs of the distance accuracy improvement unit 92AC, the distance accuracy improvement unit 92BC, the distance accuracy improvement unit 92AD, and the distance accuracy improvement unit 92BD, grasps a state of the entire periphery of the vehicle 11, and outputs the state.

FIG. 5 is a block diagram illustrating a configuration of a stereo distance measurement unit according to the first embodiment of the present technology. The stereo distance measurement unit 91 is configured as illustrated in FIG. 5.

The stereo distance measurement unit 91 includes image correction units 111 and 112 and a stereo image processing unit 113. Outputs of the imaging unit 101 (including the camera 41) and the imaging unit 102 (including the camera 42) of the stereo camera system 21 are respectively supplied to the image correction unit 111 and the image correction unit 112, and aberration of a lens and the like are corrected as preprocessing. That is, since the cameras 41 and 42 have wide-angle lenses and are cameras capable of performing capture with a wider viewing angle than ordinary cameras, captured images are distorted. Processing of correcting the distortion and projecting the image on a plane to obtain a planar image is performed for distance calculation. The stereo image processing unit 113 calculates the distance to the target object from outputs of the image correction unit 111 and the image correction unit 112. That is, an object appearing in one image of the cameras 41 and 42 is detected from the other image, and the distance is calculated from deviation between positions.

Note that the wide-angle camera is a camera including a lens of 35 mm or less, in particular, a lens of 28 mm or less, in 35-mm conversion. Alternatively, the wide-angle camera is a camera capable of performing capture with the viewing angle of 60 degrees or more, in particular, 120 degrees or more, or 150 degrees or more. The viewing angle can be 180 degrees or more. In particular, a wide angle lens or camera with a wide viewing angle is sometimes referred to as a fisheye lens (fθ lens) or a fisheye camera, or a super wide-angle lens or super wide-angle camera.

The distance accuracy improvement unit 92 in FIG. 4 is configured as illustrated in FIG. 6. FIG. 6 is a block diagram illustrating a configuration of the distance accuracy improvement unit according to the first embodiment of the present technology. As illustrated in FIG. 6, the distance accuracy improvement unit 92 includes acquisition units 141 and 142, an intersection detection unit 143, a distance correction unit 144, and an output unit 145.

The acquisition units 141 and 142 acquire measurement information from the corresponding stereo distance measurement units 91. For example, in the case of the distance accuracy improvement unit 92AC, the acquisition unit 141 acquires the measurement information of the stereo distance measurement unit 91A, and the acquisition unit 142 acquires the measurement information of the stereo distance measurement unit 91C. The intersection detection unit 143 detects intersections from the measurement information acquired by the acquisition units 141 and 142. In other words, overlap of observation points is detected. The distance correction unit 144 calculates a distance of the intersection detected by the intersection detection unit 143. In other words, the distance measured by the stereo distance measurement unit 91 is corrected. The output unit 145 outputs a result calculated by the distance correction unit 144 to the integration unit 93.

Figure 7:
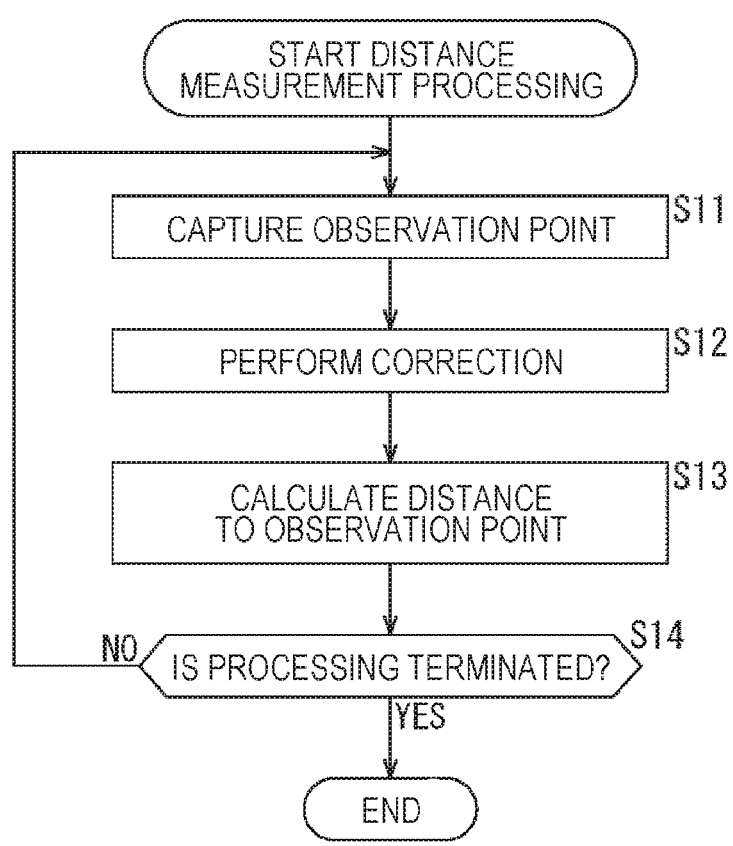
FIG. 7 is a flowchart for describing distance measurement processing according to the first embodiment of the present technology.

(3) Operation of Distance Measurement Unit (FIG. 7)

Next, an operation of the stereo distance measurement unit 91 will be described with reference to FIG. 7. FIG. 7 is a flowchart for describing distance measurement processing according to the first embodiment of the present technology.

In step S11, the imaging unit 101 (including the camera 41) and the imaging unit 102 (including the camera 42) in FIG. 5 capture the observation point. In step S12, the image correction unit 111 corrects lens aberration, camera image distortion, and the like of the image imaged by the imaging unit 101. Similarly, the image correction unit 112 corrects lens aberration, camera image distortion, and the like of the image imaged by the imaging unit 102. In other words, the distortion of the image is corrected and the image is projected on a virtual plane to obtain a planar image for distance calculation.

In step S13, the stereo image processing unit 113 calculates the distance to the observation point. In other words, the camera 41 of the imaging unit 101 and the camera 42 of the imaging unit 102 are arranged at positions separated by a distance L. Therefore, the image captured by the camera 41 and the image captured by the camera 42 have a phase difference, and the distance to the observation point can be calculated on the basis of the phase difference. That is, the object corresponding to the object appearing in one image of the cameras 41 and 42 is detected from the other image, and the distance is calculated from the deviation between the positions of the objects in the two images. The measurement information obtained as a result of the calculation is output to the corresponding distance accuracy improvement unit 92.

In step S14, the stereo image processing unit 113 determines whether or not to terminate the processing. In a case where an instruction on termination of the processing has not been given yet from a user, the processing returns to step S11 and the processing in step S11 and subsequent steps is repeated. In a case where the instruction on the termination of the processing has been given, the processing is terminated.

The above processing is performed in the detection ranges 22A to 22D by the stereo distance measurement units 91A to 91D, respectively. The measurement information obtained as a result of the measurement in the detection ranges 22A to 22D is output to the corresponding distance accuracy improvement units 92A to 92D.

In other words, the measurement information of the stereo distance measurement unit 91A that has measured the distance in the detection range 22A and of the stereo distance measurement unit 91C that has measured the distance in the detection range 22C is supplied to the distance accuracy improvement unit 92AC. The measurement information of the stereo distance measurement unit 91B that has measured the distance in the detection range 22B and of the stereo distance measurement unit 91C that has measured the distance in the detection range 22C is supplied to the distance accuracy improvement unit 92BC.

Similarly, the measurement information of the stereo distance measurement unit 91A that has measured the distance in the detection range 22A and of the stereo distance measurement unit 91D that has measured the distance in the detection range 22D is supplied to the distance accuracy improvement unit 92AD. The measurement information of the stereo distance measurement unit 91B that has measured the distance in the detection range 22B and of the stereo distance measurement unit 91D that has measured the distance in the detection range 22D is supplied to the distance accuracy improvement unit 92BD.

Note that the virtual plane on which the image is projected in the correction processing can be one plane. However, it is also possible to prepare a plurality of virtual planes (for example, three), divide the image captured with the wide-angle lens into three, and project the image divided into ⅓ into the respective virtual planes.

(4) Operation of Distance Accuracy Improvement Unit (FIGS. 8 to 13)

Figure 8:
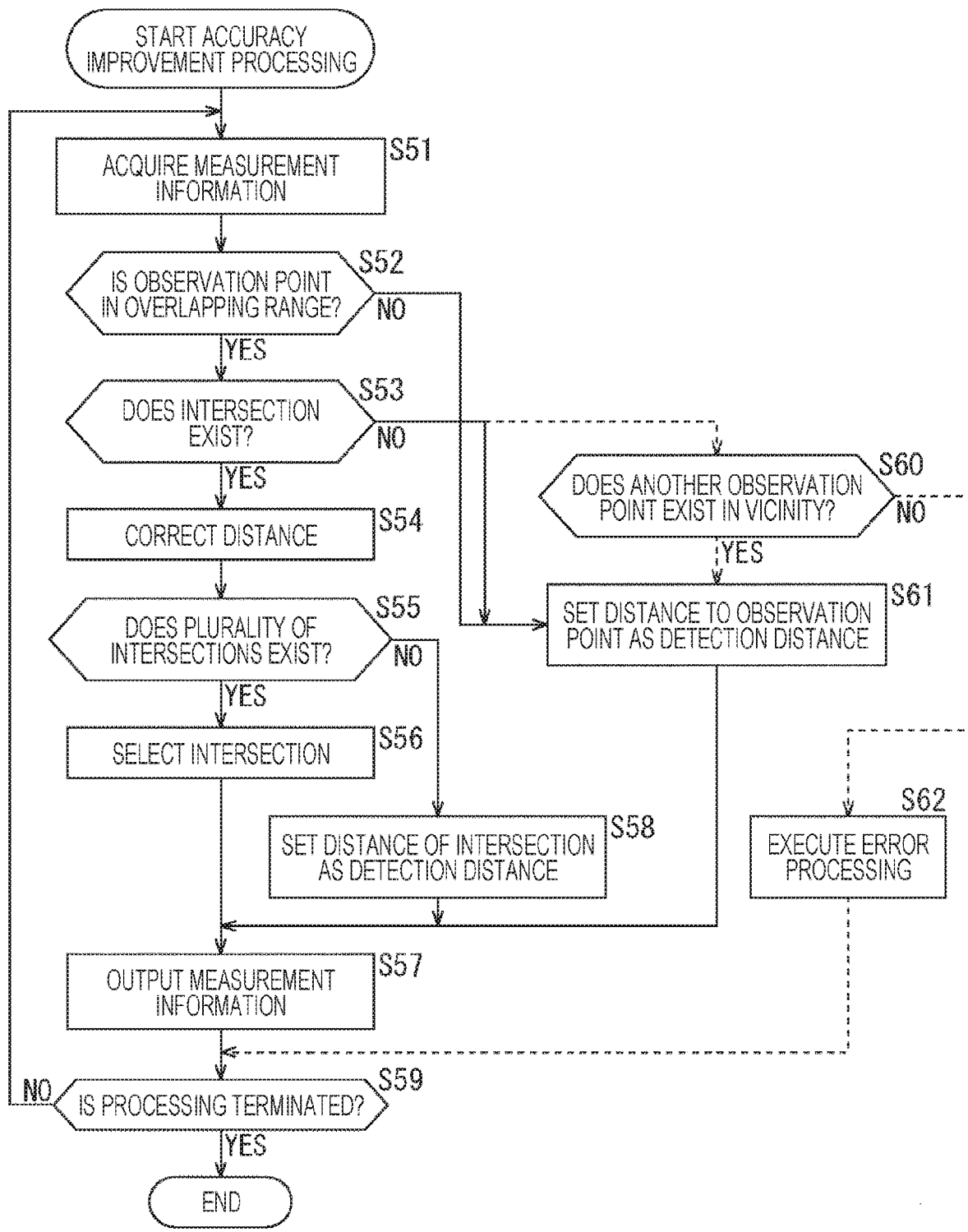
FIG. 8 is a flowchart for describing accuracy improvement processing according to the first embodiment of the present technology.

Next, an operation of the distance accuracy improvement unit 92 will be described with reference to FIG. 8. FIG. 8 is a flowchart for describing accuracy improvement processing according to the first embodiment of the present technology.

In step S51, the acquisition units 141 and 142 in FIG. 6 acquire the measurement information from the stereo image processing units 113 of the corresponding stereo distance measurement units 91. For example, in the case of the distance accuracy improvement unit 92AC, the acquisition unit 141 acquires measurement information from the stereo image processing unit 113A of the stereo distance measurement unit 91A, and the acquisition unit 142 acquires measurement information from the stereo image processing unit 113C of the stereo distance measurement unit 91C.

In step S52, the intersection detection unit 143 determines whether or not the observation points are observation points in an overlapping range. In other words, whether or not the coordinates of the observation points included in the measurement information acquired by the acquisition units 141 and 142 in step S51 are coordinates in the area 61 is determined. For example, in the case of the distance accuracy improvement unit 92AC, the coordinates of the observation point in the detection range 22A and the observation point in the detection range 22C are input, and thus whether or not the input coordinates are coordinates included in the range 61AC where the detection ranges 22A and 22C overlap is determined.

In a case where the observation points in the overlapping range are observed, the intersection detection unit 143 determines in step S53 whether or not an intersection exists. Here, the intersection will be described with reference to FIG. 9.

Figure 9:
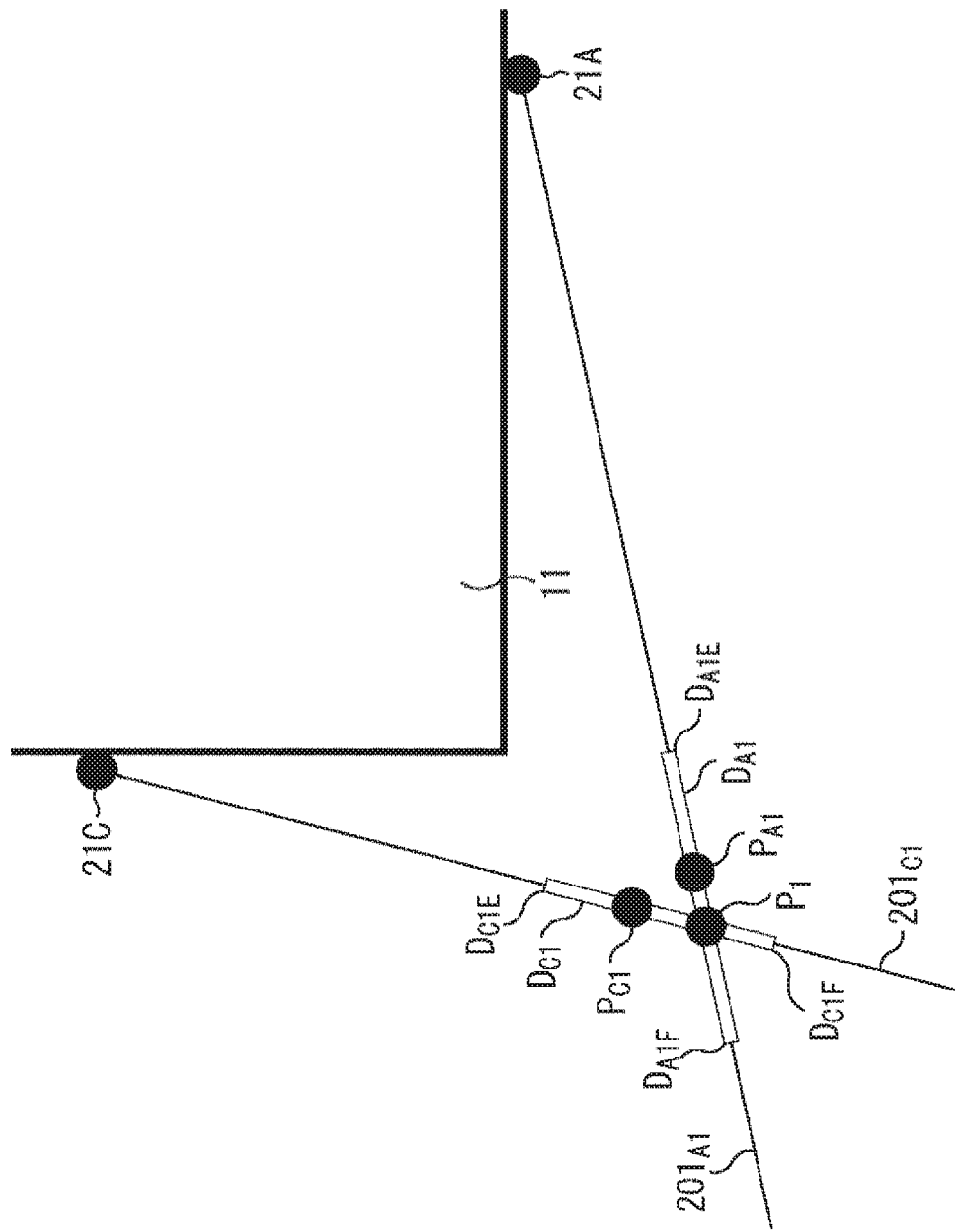
FIG. 9 is a diagram for describing the accuracy improvement processing according to the first embodiment of the present technology.

FIG. 9 is a diagram for describing the accuracy improvement processing according to the first embodiment of the present technology. Note that FIG. 9 schematically illustrates the vehicle 11. This also similarly applies to FIGS. 10 to 13 as described below.

As illustrated in FIG. 9, it is assumed that an observation point $P_{A1}$ is observed in a line-of-sight direction $201_{A1}$ from the image of the stereo camera system 21A acquired by the acquisition unit 141. The coordinates of this observation point $P_{A1}$ have a distance measurement error $D_{A1}$. In other words, in a case where an object is on a predetermined line of sight (that is, the target point P to be captured in FIG. 2) and the object is observed as an observation point, the position of the actual target point to be captured is somewhere in an error range. A point corresponding to a target object obtained by observing a predetermined object as the target object to be monitored, such as a person, an obstacle, or another vehicle around the vehicle 11 is the observation point. In other words, an image of the target object obtained via an observation system, that is, a point based on observation information (for example, a measured distance in an observed direction) is the observation point. Therefore, since the coordinates of the observation point $P_{A1}$ include an error, in reality, the observation point $P_{A1}$ can be considered to be located within a range of the error $D_{A1}$ that is a range from a coordinate $D_{A1F}$ ahead of the observation point $P_{A1}$ and a coordinate $D_{A1E}$ after the observation point $P_{A1}$. In FIG. 9, the error $D_{A1}$ is illustrated by a thick line. Note that the details of the error will be described below.

Similarly, it is assumed that an observation point $P_{C1}$ is observed in a line-of-sight direction $201_{C1}$ from the image of the stereo camera system 21C acquired by the acquisition unit 142. The coordinates of this observation point $P_{C1}$ have a distance measurement error $D_{C1}$. That is, since the coordinates of the observation point $P_{C1}$ include an error, the observation point $P_{C1}$ can be considered to be actually located within a range of the error $D_{C1}$ that is a range from a coordinate $D_{C1F}$ ahead of the observation point $P_{C1}$ and a coordinate $D_{C1E}$ after the observation point $P_{C1}$.

As described above, the error $D_{A1}$ and the error $D_{C1}$ respectively have predetermined ranges (widths). For example, in a case where the observation point $P_{----A1}$ and the observation point $P_{C1}$ are substantially the same observation points, an intersection $P_1$ of the observation point $P_{----A1}$ and the observation point $P_{C1}$ can be considered as an actual observation point. In step S53, whether or not such an intersection $P_1$ exists is determined. That is, the distance (that is, the position) of the measured observation point has a width (that is, a predetermined range), and overlap of observation points having the width is detected. In other words, overlap of error ranges of the distances of the measured observation points is detected as the overlap of the observation points.

Therefore, in a case where it is determined in step S53 that the intersection exists, the distance correction unit 144 corrects the distance acquired in step S51, in step S54. Specifically, the distance acquired in step S51 is corrected to the distance of the intersection detected in step S53. In other words, in the example of FIG. 9, the coordinates of the intersection $P_1$ are newly calculated.

In step S55, the intersection detection unit 143 determines whether or not a plurality of intersections exists. This state will be described with reference to FIG. 10 FIG. 10 is a diagram for describing the accuracy improvement processing according to the first embodiment of the present technology.

Figure 10:
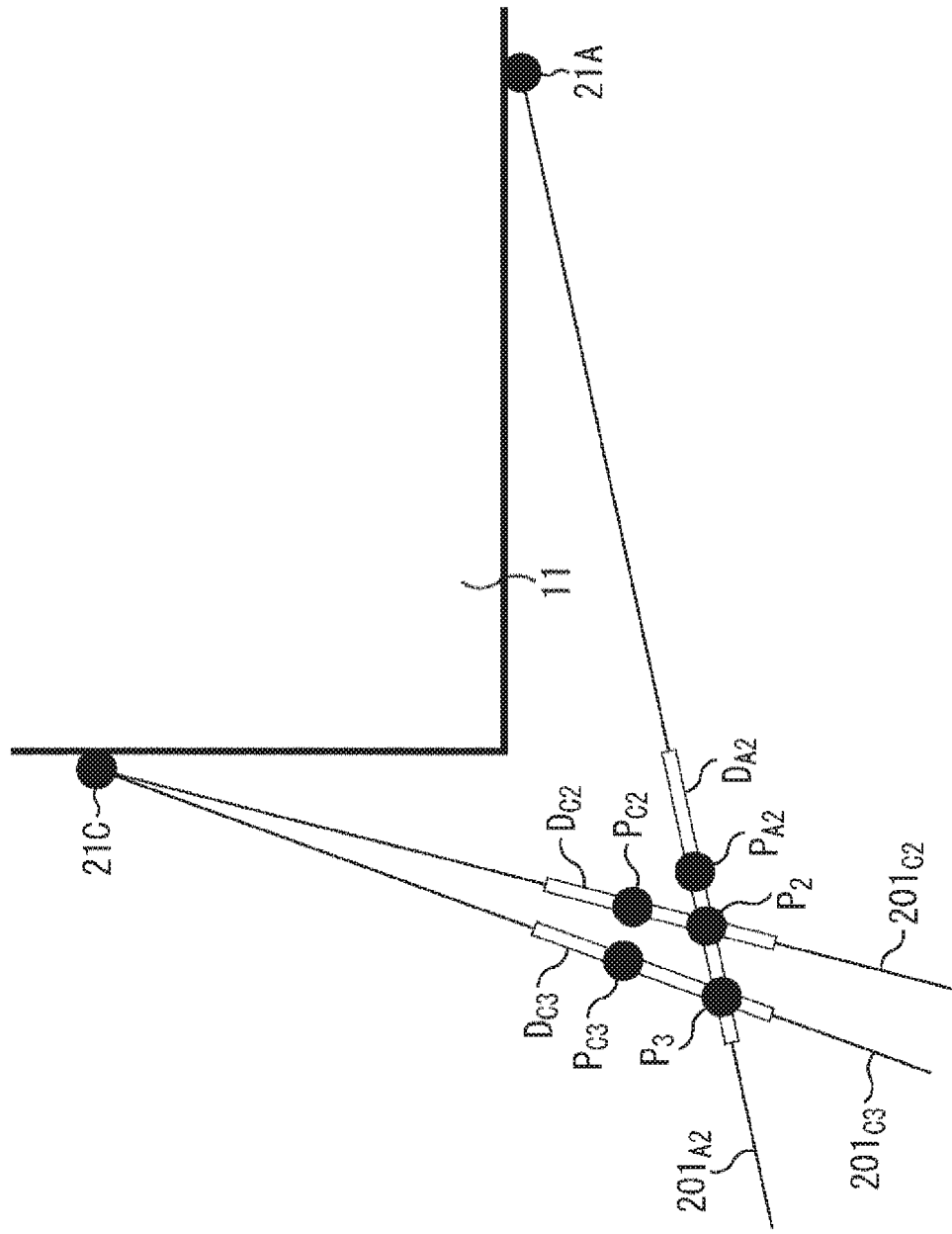
FIG. 10 is a diagram for describing the accuracy improvement processing according to the first embodiment of the present technology.

In the example of FIG. 10, an observation point $P_{A2}$ is observed in a line-of-sight direction $201A_2$ from the image of the stereo camera system 21A acquired by the acquisition unit 141. The coordinates of this observation point $P_{A2}$ have a distance measurement error $D_{A2}$. Further, an observation point $P_{C2}$ is observed in the direction of the line-of-sight direction $201_{C2}$ from the image of the stereo camera system 21C acquired by the acquisition unit 142. The coordinates of this observation point $P_{C2}$ have a distance measurement error $D_{C2}$. Further, an observation point $P_{C3}$ is observed in a line-of-sight direction $201_{C3}$ from the image of the stereo camera system 21C acquired by the acquisition unit 142. The coordinates of this observation point $P_{C3}$ have a distance measurement error $D_{C3}$.

The error $D_{A2}$ and the error $D_{C2}$ have an intersection $P_2$, and the error $D_{A2}$ and the error $D_{C3}$ have an intersection $P_3$. That is, in a case of this example, the intersection $P_3$ is detected in addition to the intersection $P_2$, and there is the plurality of intersections.

In a case where it is determined in step S55 that a plurality of intersections exists, the distance correction unit 144 selects an intersection in step S56. In the example of FIG. 10, either the intersection $P_2$ or the intersection $P_3$ is selected on the basis of a predetermined criterion. For example, an intersection close to the vehicle 11 or an intersection close to the observation point can be selected. In the case of the example of FIG. 10, the intersection $P_2$ is selected regardless of which criterion is adopted. The separation calculation unit 144 sets the distance of the selected intersection as a detection distance. In the example of FIG. 10, the distance of the intersection $P_2$ is set as the detection distance in place of the distance of the observation point $P_{A2}$ measured by the stereo distance measurement unit 91A.

In a case where it is determined in step S55 that a plurality of intersections does not exist, the distance correction unit 144 sets the distance of the intersection as the detection distance in step S58. In other words, the distance of the intersection calculated in step S54 is used as it is as the detection distance. In the case of the example of FIG. 9, since there is only one intersection, processing proceeds from step S55 to step S58, in which the distance of the intersection $P_1$ is set as the detection distance in place of the observation point $P_{A1}$.

Figure 11:
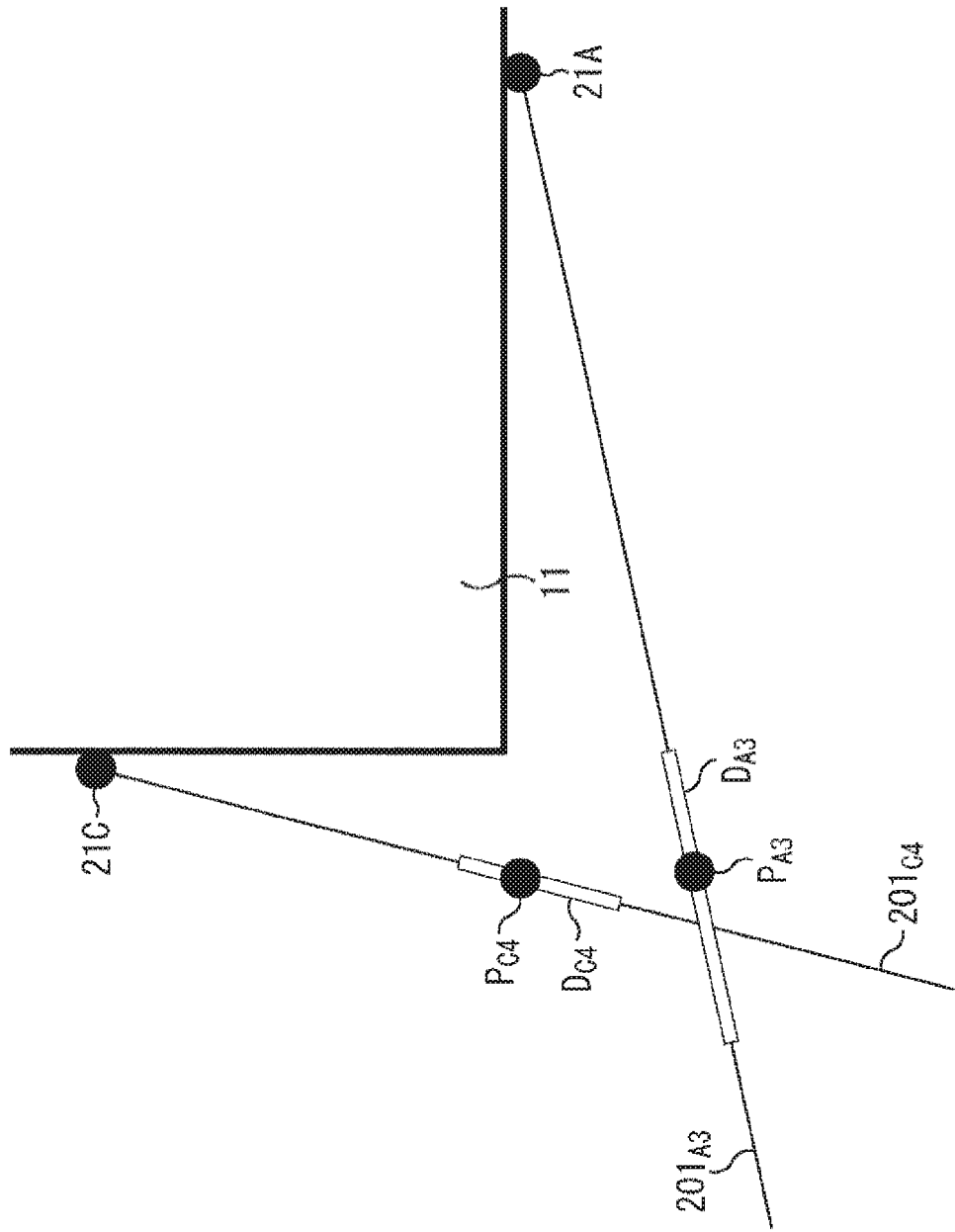
FIG. 11 is a diagram for describing the accuracy improvement processing according to the first embodiment of the present technology.

In a case where it is determined in step S53 that there is no intersection, the distance correction unit 144 sets a distance to the observation point as the detection distance in step S61. This state will be described with reference to FIG. 11. FIG. 11 is a diagram for describing the accuracy improvement processing according to the first embodiment of the present technology.

In the example of FIG. 11, an observation point $P_{A3}$ is observed in a line-of-sight direction $201_{A3}$ from the image of the stereo camera system 21A acquired by the acquisition unit 141. The coordinates of this observation point $P_{A3}$ have a distance measurement error $D_{A3}$. An observation point $P_{C4}$ is observed in a line-of-sight direction $201_{C4}$ from the image of the stereo camera system 21C acquired by the acquisition unit 142. The coordinates of this observation point $P_{C4}$ have a distance measurement error $D_{C4}$. The line-of-sight direction $201_{A3}$ and the line-of-sight direction $201_{C4}$ intersect, but the error $D_{A3}$ and the error $D_{C4}$ do not intersect.

The example of FIG. 11 is an example in which the observation point $P_{A3}$ and the observation point $P_{C4}$ are observed in the overlapping range (YES is determined in step S52), but no intersection exists (NO is determined in step S53). In this case, in step S61, the distance correction unit 144 sets the distance to the observation point as the detection distance. In other words, the distance between the observation point $P_{A3}$ and the observation point $P_{C4}$ is used as it is as the detection distance. That is, in this case, different observation points (target objects) are observed.

Figure 12:
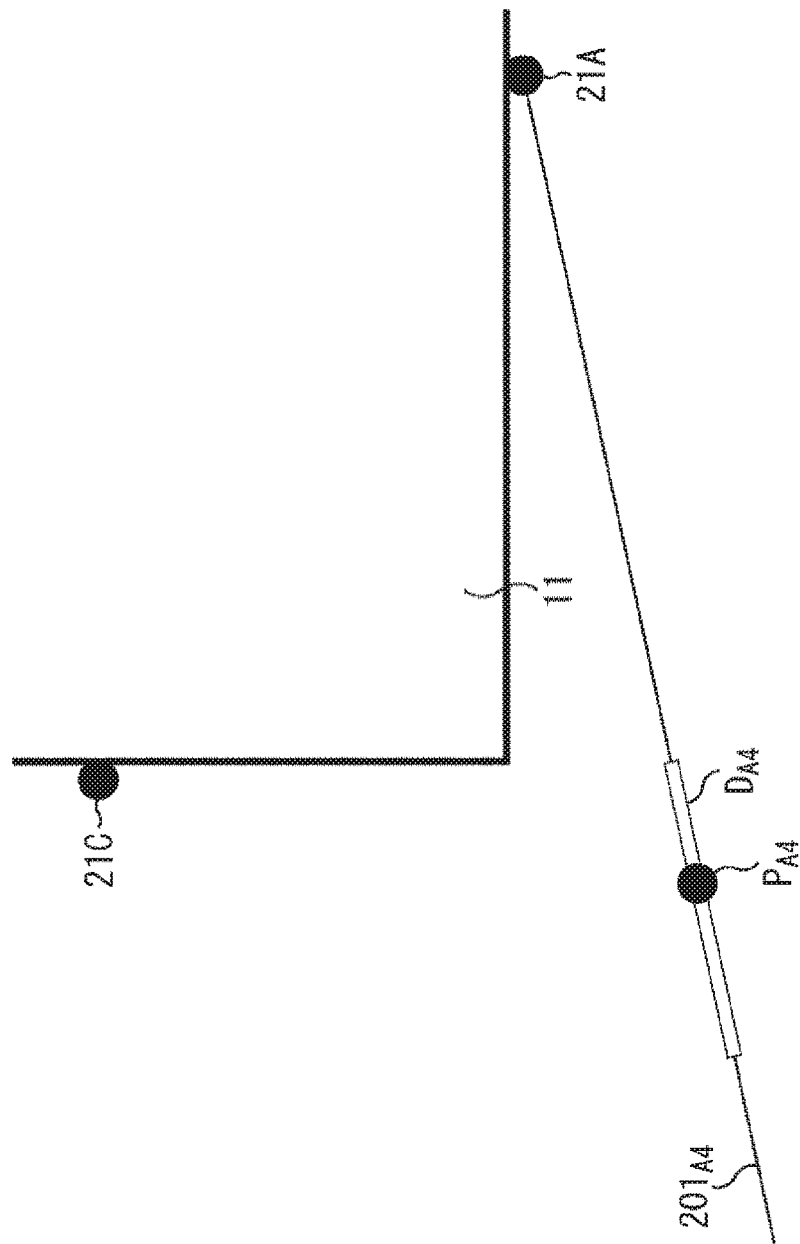
FIG. 12 is a diagram for describing the accuracy improvement processing according to the first embodiment of the present technology.

FIG. 12 is a diagram for describing the accuracy improvement processing according to the first embodiment of the present technology. In the example of FIG. 12, an observation point $P_{A4}$ is observed in a line-of-sight direction $201_{A4}$ from the image of the stereo camera system 21A acquired by the acquisition unit 141. The coordinates of this observation point $P_{A4}$ have a distance measurement error $D_{A4}$. Further, the acquisition unit 142 does not detect an observation point from the image of the stereo camera system 21C. This example is also an example in which the observation point $P_{A4}$ is observed in the overlapping range (YES is determined in step S52) but no intersection exists (NO is determined in step S53). Therefore, even in this case, the distance correction unit 144 sets the distance to the observation point as the detection distance in step S61. In other words, the distance of the observation point $P_{A4}$ is used as it is as the detection distance.

Note that, in a case where no intersection exists in the observation point and the error and the coordinates of the observation points themselves match, that is, in a case where the stereo camera systems 21A and 21C detect observation points of the same coordinates, it is determined in step S53 that no intersection exists. Then, in step S61, the distance to the observation point is used as it is as the detection distance.

Note that, in a case where the observation point is observed in the overlapping range (YES in step S52) but there is no intersection (NO is determined in step S53), that is, in the case of the example of FIG. 12, this case can be processed as illustrated by the dotted lines in FIG. 8.

In other words, in a case where it is determined in step S53 that no intersection exists, the intersection detection unit 143 determines in step S60 whether or not another observation point exists in the vicinity. In the case where another observation point exists in the vicinity, the distance correction unit 144 sets the distance to the observation point as the detection distance in step S61.

In a case where it is determined in step S60 that no other observation point exists in the vicinity, the distance correction unit 144 executes error processing in step S62. In other words, in this processing, the observation point $P_{A4}$ is supposed to be detected by the stereo camera system 21C but the observation point $P_{A4}$ is not detected in the case illustrated in FIG. 12. Therefore, the detection of the observation point $P_{A4}$ is determined as an error and is deleted.

In a case where it is determined in step S52 that the observation point is not located in the overlapping range, the distance correction unit 144 sets the distance to the observation point as the detection distance in step S61. In other words, the distance of the observation point is used as it is as the detection distance. This example will be described with reference to FIG. 13.

Figure 13:
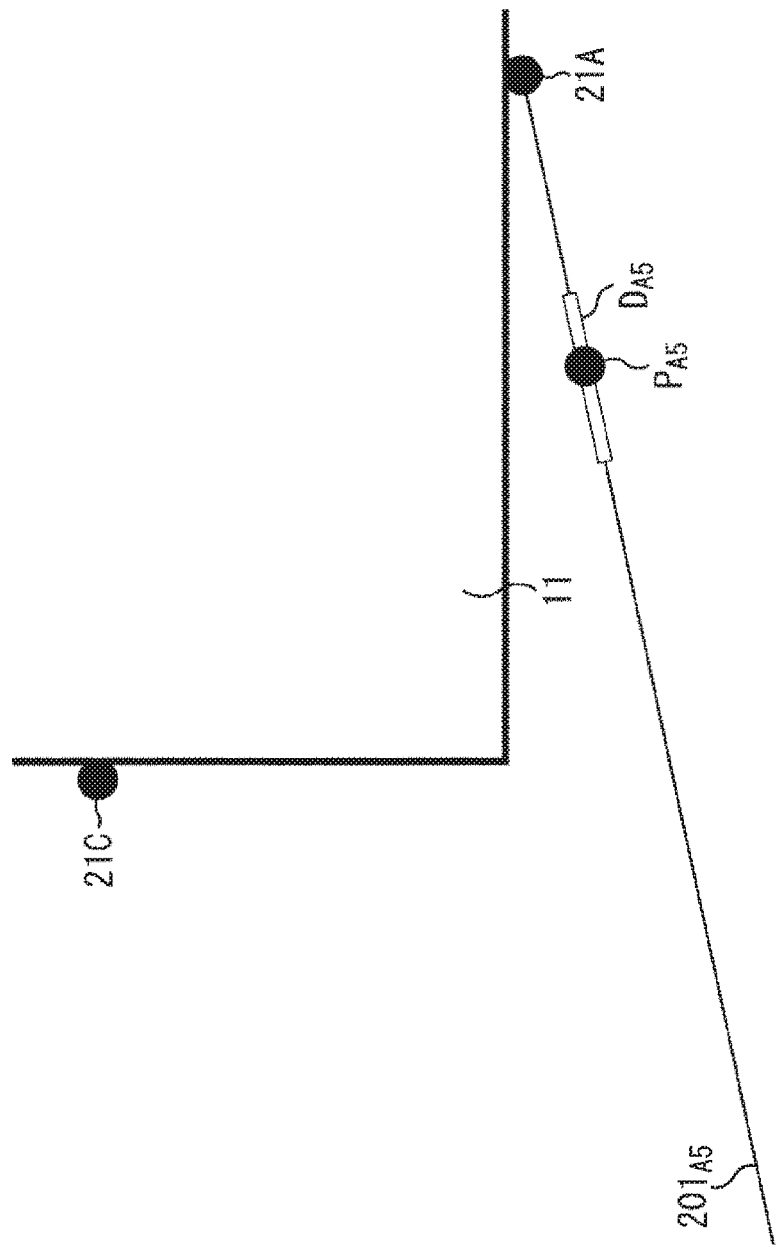
FIG. 13 is a diagram for describing the accuracy improvement processing according to the first embodiment of the present technology.

FIG. 13 is a diagram for describing the accuracy improvement processing according to the first embodiment of the present technology. In the example of FIG. 13, an observation point $P_{A5}$ is observed in a line-of-sight direction $201_{A5}$ from the image of the stereo camera system 21A acquired by the acquisition unit 141. The coordinates of this observation point $P_{A5}$ have a distance measurement error $D_{A5}$. The observation point $P_{A5}$ is observed in the detection range 22A, but the detection range 22A is not the area $61_{AC}$. Further, no observation point is detected in the detection range 22C. In such a state, the distance of the observation point $P_{A5}$ is used as it is as the detection distance. That is, the distance of the observation point not located within the area 61 in the detection range 22 is used as it is as the detection distance.

After the processing in step S56, S58, or S61, the output unit 145 outputs the obtained measurement information to the integration unit 93 in step S57. In other words, the measurement information of the intersection selected in step S56, the measurement information of the intersection obtained in step S58, or the measurement information of the distance to the observation point obtained in step S61 is supplied to the integration unit 93.

After the processing in step S57 or S62, the distance correction unit 144 determines in step S59 whether or not to terminate the processing. In a case where an instruction on termination of the processing has not been given yet from the user, the processing returns to step S51 and similar processing is repeated. In a case where the instruction on the termination has been given, the processing is terminated.

The above processing is performed in each of the distance accuracy improvement unit 92AC, the distance accuracy improvement unit 92BC, the distance accuracy improvement unit 92AD, and the distance accuracy improvement unit 92BD.

(5) Error

Next, the error of the stereo camera system 21 will be further described. When the above equation (5) is transformed into an equation for calculating the distance $\rho$ from the stereo camera system 21 to the target point P, the equation (6) is obtained.

$$\rho \approx L \cdot \sin\theta/\sin(\theta a - \theta b) = L \cdot \sin\theta/\sin\alpha \quad (6)$$

Note that $\alpha = \theta a - \theta b$.

Furthermore, when $\alpha$ is sufficiently small, it can be approximated as $\sin\alpha \approx \alpha$. So the equation (6) can be further transformed into the following equation (7).

$$\rho \approx L \cdot (\sin\theta)/\alpha \quad (7)$$

Since angles observed in the stereo camera system 21 are the angles $\theta a$ and $\theta b$, the error of the distance $\rho$ can be calculated from a reciprocal ratio of the angle $\alpha$ $(=\theta a - \theta b)$ where the distance L and the angle $\theta$ are constants. In general, since the angles $\theta a$ and $\theta b$ obtained from the stereo camera system 21 are discrete values, the angle $\alpha$ is also discrete.

Here, when $\alpha$ is expressed as $\alpha = d/E$, the equation (7) can be expressed by the following equation (8). d is an integer and varies according to $\alpha$, and E is a fixed value of a real number determined from the resolution of the camera and the like. Although a value range of $\alpha$ is $0 < \alpha < \Pi(3.14)$, d can be larger than 3.14 by being divided by a sufficiently large fixed value E.

$$\rho \approx L \cdot E \cdot (\sin\theta)/d \quad (8)$$

It is assumed that the error of d is ±1. In that case, an error $\Delta\rho m$ of the distance $\rho$ when the error of d is $-1$ and an error $\Delta\rho p$ of the distance $\rho$ when the error of d is $+1$ are as follows.

$$\Delta\rho m = L \cdot E \cdot (\sin\theta)/(d-1) - L \cdot E \cdot (\sin\theta)/d = L \cdot E \cdot (\sin\theta)/(d \cdot (d-1)) = \rho/(d-1)(\text{note that } d > 1) \quad (9)$$

$$\Delta\rho p = L \cdot E \cdot (\sin\theta)/d - L \cdot E \cdot (\sin\theta)/(d+1) = L \cdot E \cdot (\sin\theta)/(d \cdot (d+1)) = \rho/(d+1) \quad (10)$$

In the case of d=2, the error $\Delta$ of the distance $\rho$ becomes maximum. In this case, $\Delta\rho m = \rho$ from the equation (9) and $\Delta\rho p = \rho/3$ from the equation (10). The error when d is $-1$, in other words, the error on the side where the distance $\rho$ becomes larger (longer) is 100% with respect to the distance $\rho$ to the target point P to be captured. Furthermore, the error when d is $+1$, that is, the error on the side where the distance $\rho$ becomes smaller (shorter) is 33% with respect to the distance $\rho$ to the target point P to be captured. This is the maximum error and a normal error is smaller. For example, in a case where d=10, the error $\Delta\rho m$ is 11% of the distance $\rho$ and the error $\Delta\rho p$ is 9% of the distance $\rho$. Furthermore, this is a case where the error of d is ±1, and the error of the distance $\rho$ becomes larger as the error of d becomes larger.

As described above, the error $D_A$, $D_C$, and the like can be determined by appropriately determining the value of d to be ±1, ±2, or the like in system design. For example, first, the stereo camera system 21 is checked with ±1, then the value is changed to ±2, ±3, and the like to adjust the error.

Figure 14:
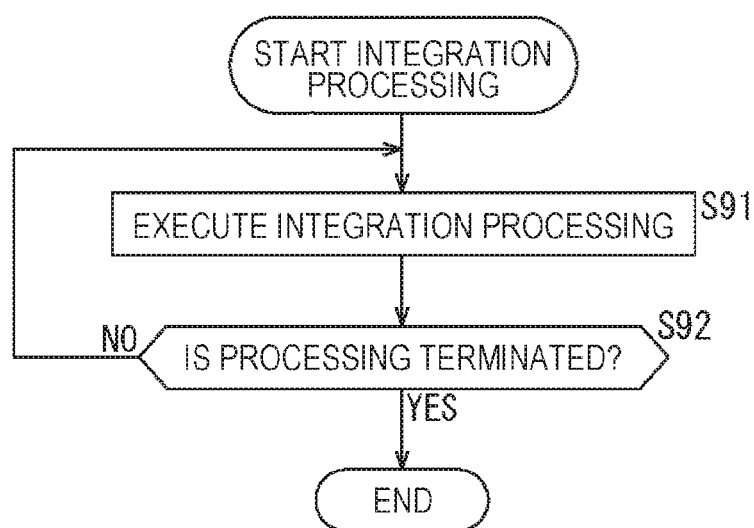
FIG. 14 is a flowchart for describing integration processing according to the first embodiment of the present technology.

(6) Integration Processing (FIG. 14)

Next, integration process will be described with reference to FIG. 14. FIG. 14 is a flowchart for describing the integration processing according to the first embodiment of the present technology.

In step S91, the integration unit 93 in FIG. 4 executes the integration processing. In other words, the measurement information measured by the distance accuracy improvement unit 92AC, the distance accuracy improvement unit 92BC, the distance accuracy improvement unit 92AD, and the distance accuracy improvement unit 92BD are measurement information of the periphery of the vehicle 11, that is, the left side, right side, front, and rear. The integration unit 93 integrates these pieces of measurement information, and causes a monitor (not illustrated) to display the integrated information as the measurement information in all directions of the vehicle 11, and causes a storage unit to store the integrated information.

The integration unit 93 performs various assistances. For example, the integration unit 93 can perform parking assistance such as backward parking and parallel parking, provide obstacle recognition information such as structures, bicycles, and pedestrians obliquely behind the vehicle at intersection stop or light or left turn, and monitor the following cars in the next lane at lane change.

Furthermore, the integration unit 93 can be made not to issue an alert although performing monitoring at normal driving, and can issue an alert when detecting an obstacle at a distance equal to or less than a basis distance or can in particular monitor an opposite side of a traveling direction of the vehicle (for example, the right side at left turn or the left side at right turn). Conversely, monitoring in unnecessary directions (for example, the right side at left turn and the left side at right turn) can be omitted. Further, although the detection accuracy in the four directions may be the same, the detection accuracy of one direction (for example, a side surface) can be made higher than the other direction (for example, the front surface or the rear surface).

In step S92, the integration unit 93 determines whether or not to end the processing. In a case where an instruction on termination of the processing has not been given yet from the user, the processing returns to step S91 and similar processing is repeated. In a case where the instruction on the termination has been given, the processing is terminated.

Generally, to widen a monitoring range, a lens with a wide angle of view is attached to the camera. In particular, in a case where a wide range of monitoring is required, such as the side surface of the vehicle, the entire side surface of the vehicle can be monitored by one camera or a set of stereo camera systems by use of a super wide-angle lens such as a fisheye lens. However, in a case where the super wide-angle lens is used, spatial resolution of a captured image is lowered, and thus the size of an object transferred to the image becomes small, and the analysis accuracy is lowered in a case where the captured image is analyzed and image recognition or the like is performed. The distance measurement accuracy by the stereo image processing is also lowered.

However, according to the present technology, the overlap of a plurality of the observation points where the measurement ranges overlap is detected, and a new distance is calculated on the basis of the overlap of the observation points. Therefore, the decrease in the distance measurement accuracy can be suppressed.

Note that the present technology can also be applied to a case of measuring a distance using a camera with a normal viewing angle.

Note that although the cameras 41 and 42 of the stereo camera system 21 can be arranged in a lateral direction, the cameras 41 and 42 can also be arranged shifted up and down (in the vertical direction) as described below with reference to FIGS. 17 to 22. In addition, the cameras 41 and 42 may be arranged to have optical axes directed downward with respect to a direction parallel to a basis plane.

Furthermore, in the above description, the four directions are monitored by the stereo camera systems 21, but at least one of the four directions may be monitored by an ultrasonic wave, a radar, a laser sensor, an infrared sensor, or the like. Moreover, a viewing system can be used in combination, in addition to the obstacle recognition and monitoring by the stereo camera system 21.

Figure 15:
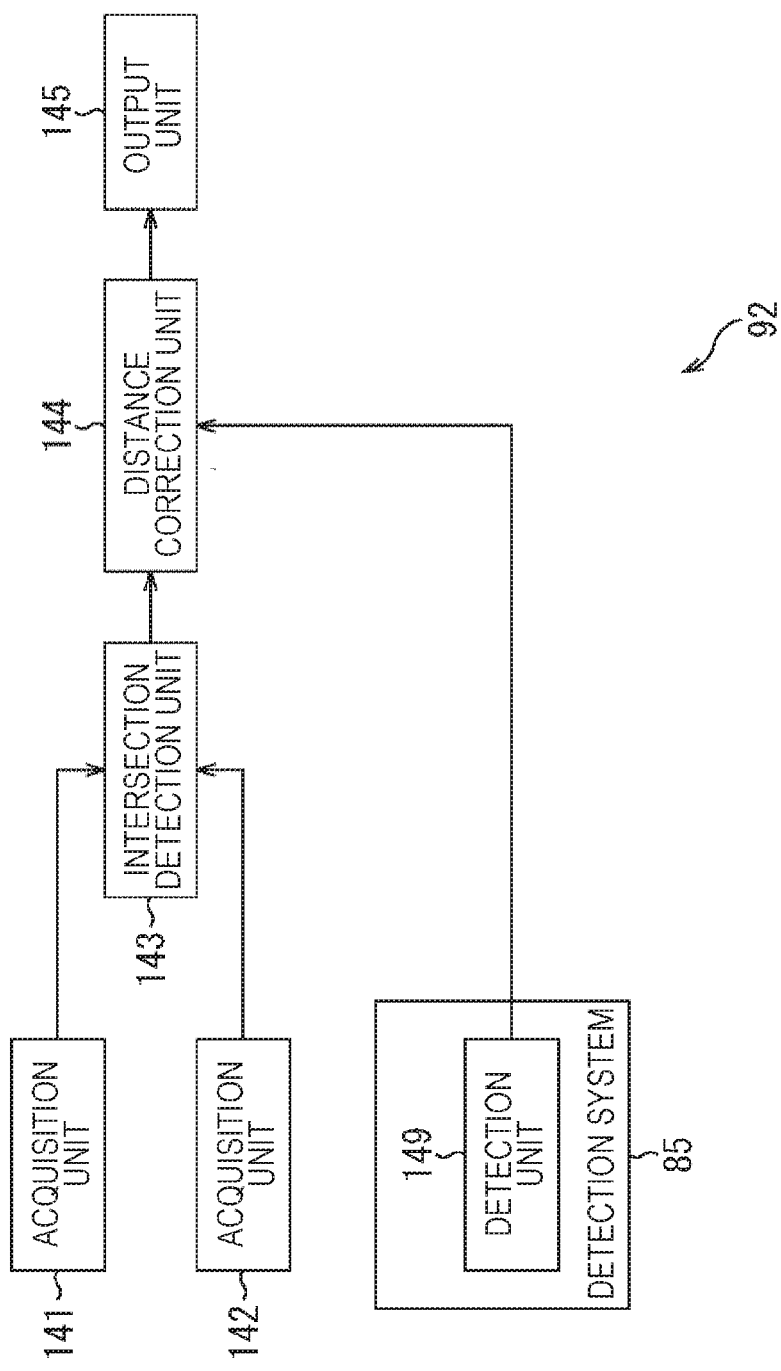
FIG. 15 is a block diagram illustrating a configuration of the distance accuracy improvement unit according to the first embodiment of the present technology.
Figure 16:
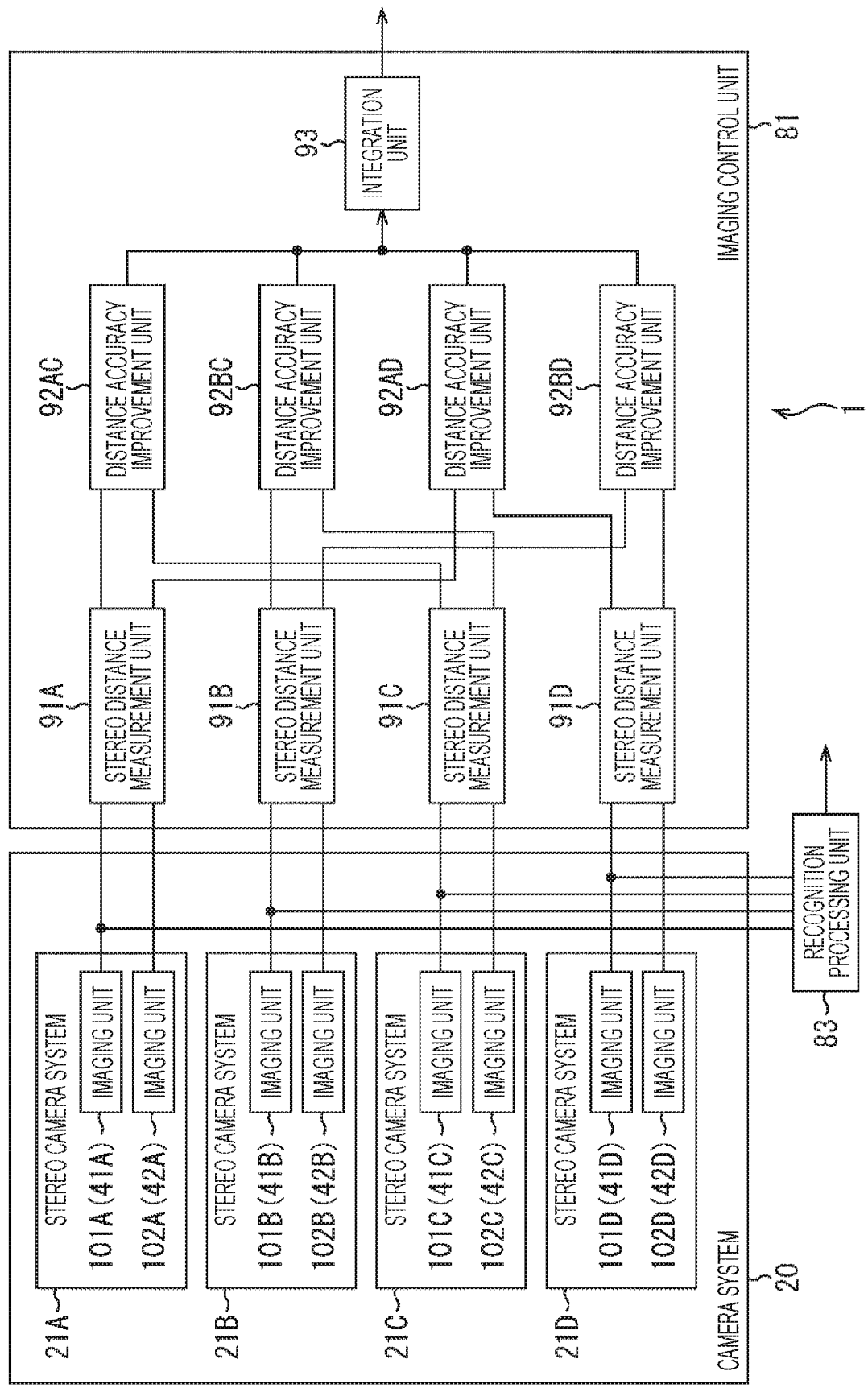
FIG. 16 is a block diagram illustrating a configuration of the imaging control system according to the first embodiment of the present technology.

(7) Modification (FIGS. 15 and 16)

Note that, to correct the distance by the distance correction unit 144, a configuration can be further added. FIG. 15 is a block diagram illustrating a configuration of the distance accuracy improvement unit according to the first embodiment of the present technology.

In the configuration example of FIG. 15, a detection system 85 is provided in addition to the camera system 20. The detection system 85 includes a detection unit 149. The detection unit 149 is provided corresponding to each of the detection ranges 22A to 22D. The detection unit 149 is configured by at least one of an ultrasonic sensor, an infrared sensor, a millimeter wave sensor, or a radar, for example. The detection unit 149 as another detection unit detects the distance of the observation point in each of the detection ranges 22A to 22D by an ultrasonic sensor, an infrared sensor, a millimeter wave sensor, a radar, or the like. A detection result is supplied to the corresponding distance correction unit 144. The distance correction unit 144 executes accuracy improvement processing using not only the output from the intersection detection unit 143 but also the detection result of the detection unit 149. With the configuration, more accurate accuracy improvement processing can be realized.

Moreover, another function can be added. FIG. 16 is a block diagram illustrating a configuration of the imaging control system according to the first embodiment of the present technology.

In the configuration example of FIG. 16, a captured image of at least one of the imaging unit 101A or 102A (the imaging unit 101A in this embodiment) of the stereo camera system 21A is supplied to a recognition processing unit 83. Similarly, captured images of the imaging unit 101B of the stereo camera system 21B, the imaging unit 101C of the stereo camera system 21C, and the imaging unit 101D of the stereo camera system 21D are supplied to the recognition processing unit 83. The recognition processing unit 83 recognizes what the target object observed in each of the detection ranges 22A to 22D is from the input captured images. A recognition result is presented to the user.

Second Embodiment (1) Arrangement of Cameras (FIGS. 17 to 22)

Figure 17:
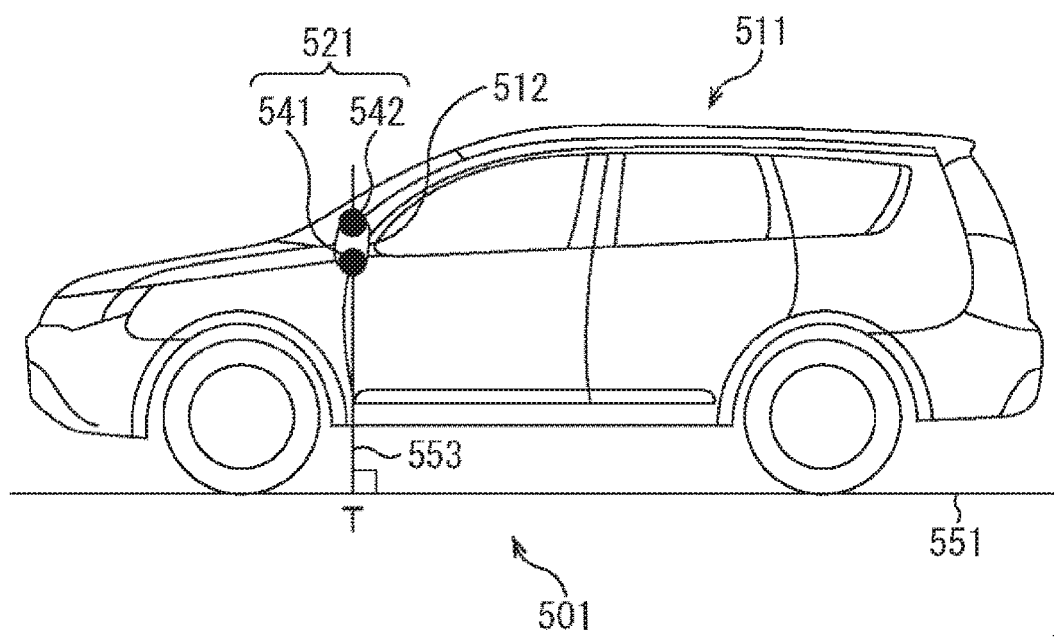
FIG. 17 is a diagram illustrating a configuration of an imaging control system according to a second embodiment of the present technology.
Figure 18:
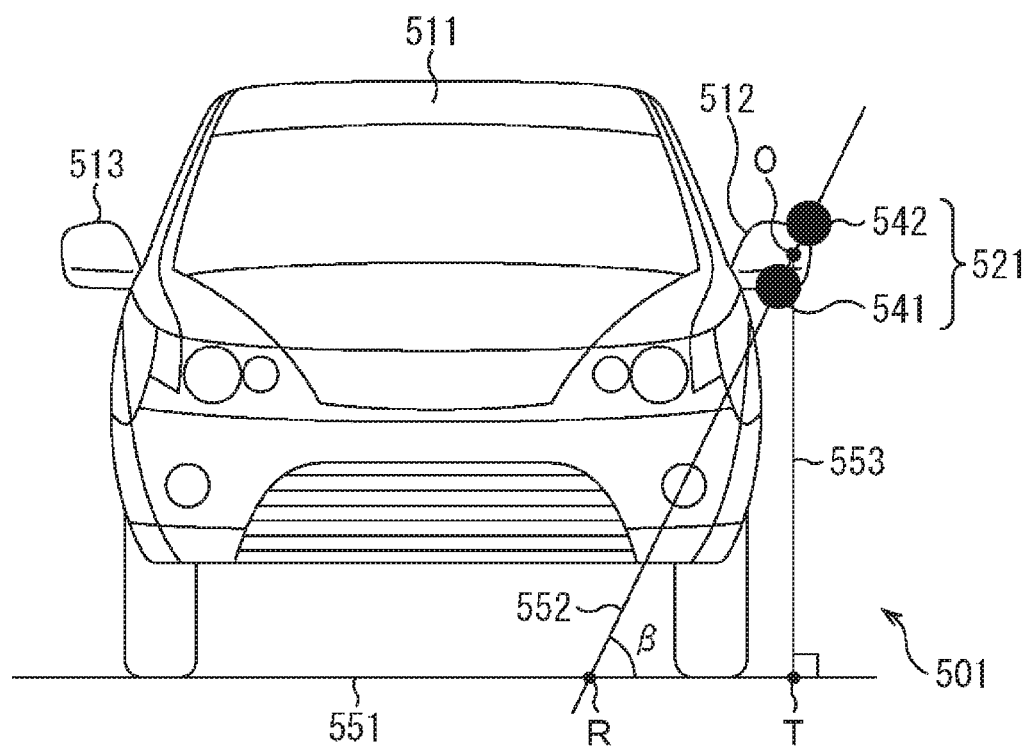
FIG. 18 is a diagram illustrating a configuration of the imaging control system according to the second embodiment of the present technology.

Next, a second embodiment will be described. FIGS. 17 and 18 are diagrams illustrating a configuration of an imaging control system according to a second embodiment of the present technology.

As illustrated in FIGS. 17 and 18, in an imaging control system 501 according to the second embodiment, a stereo camera system 521 including two cameras 541 and 542 as a set is provided on a side surface of a vehicle 511 in an up-down direction (that is, a vertical direction). That is, the cameras 541 and 542 are arranged in a plane perpendicular to a basis plane (road surface 551) to have a parallax in a height direction. Note that the cameras 541 and 542, the stereo camera system 521, and the vehicle 511 respectively correspond to the cameras 41 and 42, the stereo camera system 21, and the vehicle 11 of the first embodiment. Although attaching positions of the cameras 541 and 542 are favorably vicinities near centers of the side surfaces of the vehicle 511, there are some cases where installation is difficult because there are doors and the like in the vicinities of the centers. FIGS. 17 and 18 illustrate an example in which the cameras 541 and 542 are attached to the vicinities of door mirrors.

Furthermore, another reason to attach the cameras to the vicinity of the door mirror is to attach the stereo camera system 521 directed obliquely downward, as illustrated in FIG. 18. To the door mirror, the stereo camera system 521 can be attached obliquely downward without adding a special jig or the like. Note that a wide-angle camera is used here for the cameras 541 and 542 configuring the stereo camera system 521.

Note that, in FIGS. 17 and 18, the stereo camera system 521 is installed only on the left side of the vehicle 511. However, in reality, the stereo camera system 521 is installed on a right side as well.

Of course, the stereo camera system 521 can be attached to a pillar (a front pillar, a center pillar, a rear pillar, or the like), a door, a roof rail, or the like, other than to the door mirror. The stereo camera system 521 may be attached to anywhere on the side surface of the vehicle 511.

Hereinafter, the reason why the cameras 541 and 542 are arranged as illustrated in FIGS. 17 and 18 will be described. Before the description, a coordinate system of the stereo camera system 521 will be described.

A coordinate system of the cameras 541 and 542 and a target point P to be captured is similar to that in the case illustrated in FIG. 2 of the first embodiment. Therefore, description of the coordinate system is omitted. However, the second embodiment should be understood by replacing the cameras 41 and 42 in FIG. 2 with the cameras 541 and 542.

Since the coordinate system in FIG. 2 is applied, the equations (1) to (5) are also applied to the second embodiment.

From the equation (5), it is found that θa−θb (sin (θa−θb)) is inversely proportional to a distance ρ from a center point O of the stereo camera system 521 to an object (the target point P to be captured), and is proportional to an angle θ formed by the object and the stereo camera system 521. It can be said that the larger θa–θb (sin (θa–θb)) is more resistant to the influence of an error, and the distance measurement accuracy is higher. Therefore, when the angle θ formed by the object and the stereo camera system 521 approaches 0 or 180 degrees, sin (θa–θb) becomes small, and thus the distance measurement accuracy is lowered.

For the above reasons, when the two cameras 541 and 542 of the stereo came system 521 are attached side by side on the side surface of the vehicle 511 (that is, at the same height parallel to the road surface 551), measuring a distance to the front or the rear from the side surface of the vehicle 511 becomes difficult. Therefore, in the case of installing the stereo camera system 521 on the side surface of the vehicle 511, it is better to install the two cameras 541 and 542 up and down (that is, by perpendicularly changing the height from the road surface 551). By doing so, a distance of the front (in a vehicle traveling direction) or a distance of the rear (in an opposite direction to the vehicle traveling direction) from the side surface as well as a distance of a substantially central portion of the side surface of the vehicle 511 can be accurately measured.

However, when the two cameras 541 and 542 of the stereo camera system 521 are vertically arranged, the distance measurement accuracy directly above and below the stereo camera system 521 is lowered this time. Although the necessity to perform the distance measurement processing for a space directly above the stereo camera system 521 for detecting an obstacle and the like is low because the space is usually the sky. However, a space directly below the stereo camera system 521 is the road surface 551 and thus the distance measurement processing needs to be performed. Therefore, as illustrated in FIG. 18, consider arrangement of the stereo camera system 521 to have an optical axis directed obliquely downward (the direction of the road surface 551) while maintaining the vertical arrangement.

Figure 19:
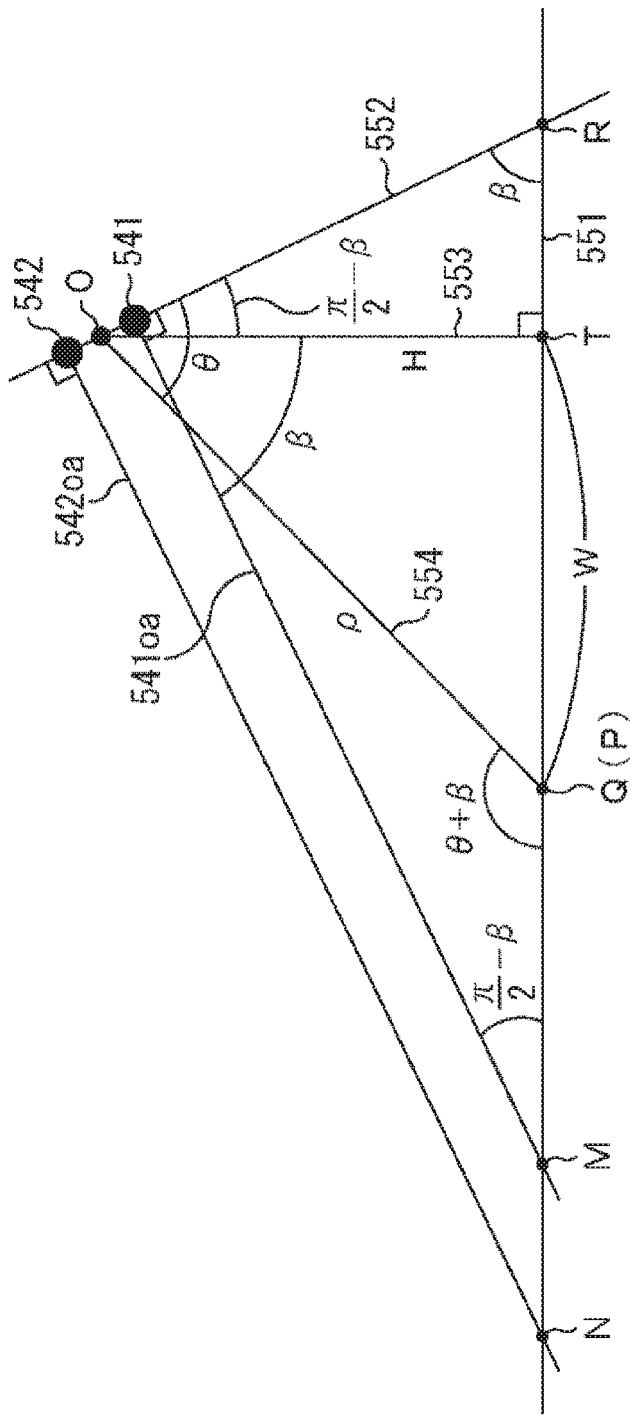
FIG. 19 is a diagram illustrating a coordinate system of a stereo camera system according to the second embodiment of the present technology.

Here, the coordinate system illustrated in FIG. 19 is further defined. FIG. 19 is a diagram illustrating the coordinate system of the stereo camera system according to the second embodiment of the present technology. An angle formed by the stereo camera system 521 and the road surface 551 on which the vehicle 511 travels is β. In other words, a straight line 552 passing through the cameras 541 and 542 intersects with the road surface 551 at a point R. The angle formed by the straight line 552 and the road surface 551 is β.

An optical axis 541oa of the camera 541 and an optical axis 542oa of the camera 542 are directed in a direction perpendicular to the straight line 552 passing through the cameras 541 and 542. A straight line 553 that is a perpendicular line to the road surface 551 passing through the center point O of the stereo camera system 521 intersects with a point T on the road surface 551. In other words, the point T is a point on the road surface 551 directly below the stereo camera system 521 (that is, directly below the vehicle 511). The optical axes 541oa and 542oa are directed in a direction of the angle β with respect to the straight line 553 passing through the center point O of the stereo camera system 521 and the point T. In other words, the angle β represents an attaching angle of the stereo camera system 521 and also represents a directivity direction of the optical axes 541oa and 542oa of the cameras 541 and 542.

Furthermore, when a height of the center point O of the stereo camera system 521 from the road surface 551 (a length of the straight line 553) is H and a target point to be captured on the road surface 551 is Q, a distance ρ between the center point O and the target point Q to be captured (the length of a straight line 554 connecting the center point O and the target point Q to be captured) can be expressed by the equation (12). The equation (12) can be derived from the equation (11).

$$H/\rho = \sin(\Pi - (\theta+\beta)) = \sin(\theta+\beta) \quad (11)$$

$$\rho = H/\sin(\theta+\beta) \quad (12)$$

Here, the following equation (13) is obtained from the equations (5) and (12).

$$\sin(\theta a - \theta b) \approx L/H \cdot \sin\theta \cdot \sin(\theta+\beta) \quad (13)$$

It is assumed that a distance L between the two cameras 541 and 542 of the stereo camera system 521 and an attaching height H are constants in the equation (13). Then, the distance measurement accuracy with respect to the road surface 551 in the vicinity of the vehicle 511 depends on the attaching angle β of the stereo camera system 521.

In a case of the angle β=Π/2, that is, in a case where the two cameras 541 and 542 of the stereo camera system 521 are perpendicularly attached with respect to the road surface 551, the angle θ=0 when the point T directly below the stereo camera system 521 is captured. As a result, it is found that the distance measurement accuracy becomes lowest according to the equation (13).

Conversely, in a case of the angle β=0, that is, in a case where the two cameras 541 and 542 of the stereo camera system 521 are attached to be directed directly below and in parallel to the road surface 551, the angle θ=Π/2 when the point T directly below the stereo camera system 521 is captured, and it is found that the distance measurement accuracy becomes highest according to the equation (13).

In the case of 0<β<Π/2, the angle θ=Π/2–β when the point T directly below is captured. At this time, the equation (13) is as in the following equation (14).

$$\sin(\theta a - \theta b) \approx L/H \cdot \sin(\Pi/2 - \beta) \cdot \sin(\Pi/2 - \beta + \beta) = L/H \cdot \cos\beta \quad (14)$$

Figure 20:
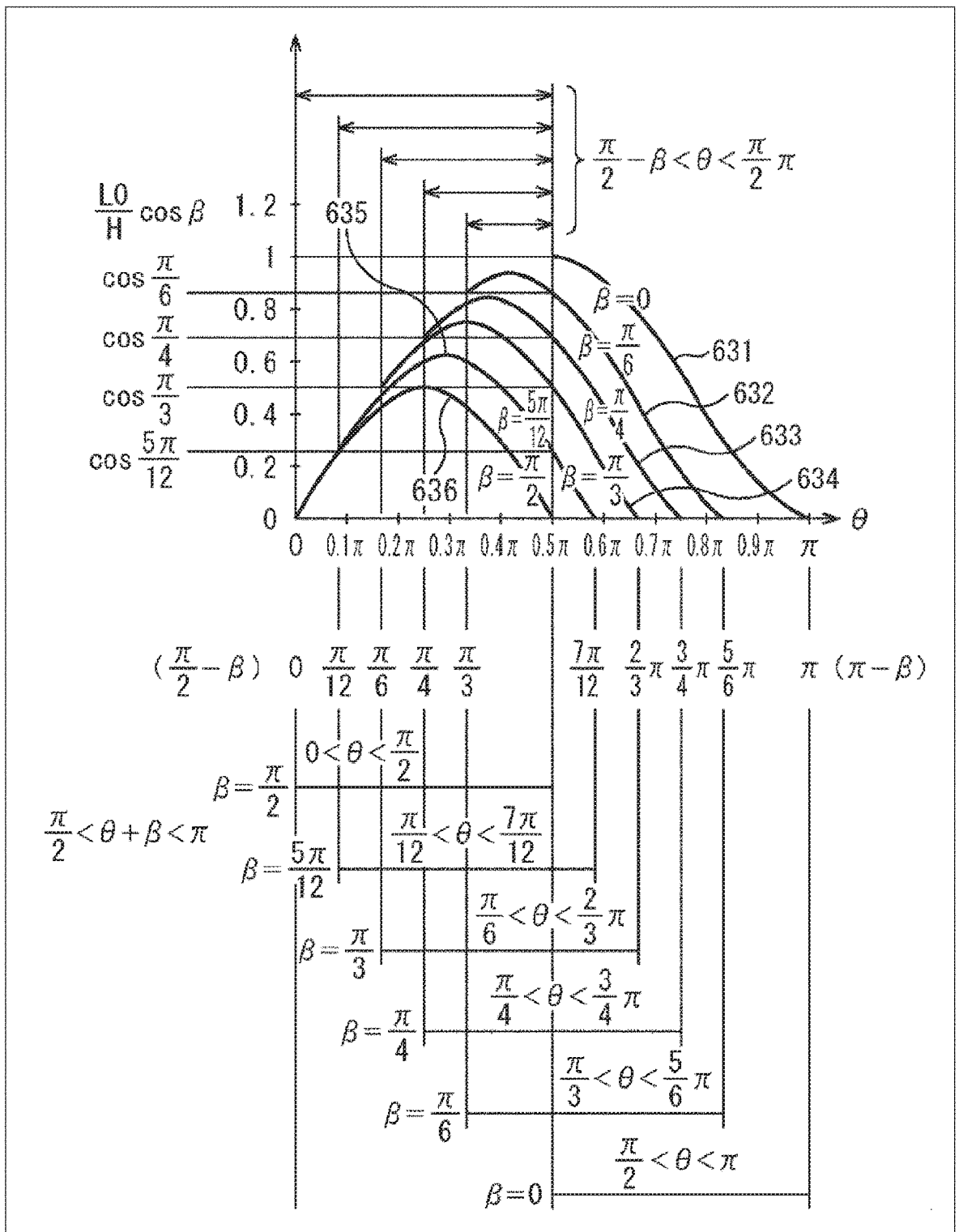
FIG. 20 is a diagram illustrating distance accuracy characteristics according to the second embodiment of the present technology.

FIG. 20 illustrates change of the equation (13) with respect to the angle θ when the attaching angle β of the stereo camera system 521 is changed in some values. FIG. 20 is a diagram illustrating distance accuracy characteristics according to the second embodiment of the present technology. In FIG. 20, the vertical axis represents the magnification of the distance measurement accuracy, and the horizontal axis represents the angle θ (the unit is in radians).

The magnification of the distance measurement accuracy will be described. The distance measurement accuracy becomes largest when the space directly below the stereo camera system 521 (the angle θ=Π/2) is captured in the case where the stereo camera system 521 is attached in parallel to the road surface 551 (the angle β=0). Assuming that the height H at which the stereo camera system 521 is attached is 1.0 m and the distance L between the two cameras 541 and 542 that configure the stereo camera system 521 is 1.0 m, and the distance measurement accuracy on the above assumption is set as a standard (one-time magnification). The reason why L=1.0 m is set is to make the standard of the distance measurement accuracy be one-time magnification by setting the constant term (L/H) of the equation (14) to 1. The distance between the two cameras 541 and 542 configuring the actual stereo camera system 521 is about several to several tens of cm.

In FIG. 20, a curve 631 represents a case of the angle β 0, a curve 632 represents a case of the angle β=Π/6, a curve 633 represents a case of the angle β=Π/4, a curve 634 represents a case of the angle β=Π/3, a curve 635 represents a case of the angle $\beta=5\Pi/12$, and a curve 636 represents a case of the angle $\beta=\Pi/2$, respectively.

The reason why the left side of the curves in FIG. 20 is interrupted in the middle will be described. In the case of the angle $\theta=\Pi/2-\beta$ the target point Q to be captured coincides with the point T on the road surface 551 directly below the stereo camera system 521. In the case of $\theta+\beta<\Pi/2$, the target point Q to be captured is located on a right side of the point T in FIG. 19, that is, inside the vehicle 511 to which the stereo camera system 521 is attached, and thus the road surface 551 cannot be captured. Furthermore, in the case of $\theta+\beta>\Pi$, the target point Q to be captured is at infinity and thus measurement cannot be performed. Therefore, FIG. 20 illustrates only a section where $\Pi/2<\theta+\beta<\Pi$ is established (a section where a value range of the angle $\beta$ is $\Pi/2-\beta<\theta<\Pi-\beta$ because the attaching angle $\beta$ of the stereo camera system 521 is a constant).

Referring to FIG. 20, in the case of the angle $\beta=0$ (in the case of the curve 631), the distance measurement accuracy takes the maximum value of 1 when the angle $\theta=\Pi/2$ and monotonically decreases when the angle $\theta$ becomes larger than n/2. Furthermore, in the case of the angle $\beta>0$ (in the case of the curves 632 to 636), the value L/H·cos $\beta$ is obtained at the angle $\theta=\Pi/2-\beta$. When the angle $\theta$ becomes larger than $\Pi/2-\beta$ the distance measurement accuracy once becomes large and then small. Then, when the angle $\theta=\Pi/2$, the same value L/H·cos $\beta$ is obtained, which is equal to the resolution of the point T directly below the stereo camera system 521. Thereafter, when the angle $\theta>\Pi/2$, the distance measurement accuracy becomes smaller. That is, in the equation (13), it can be said that the distance measurement accuracy is high in the range of $\Pi/2-\beta<\theta<\Pi/2$, and this range is suitable for the distance measurement.

When increasing the angle $\beta$ (where $\beta\leq\Pi/2$), the range suitable for the distance measurement becomes broad, but the value of the equation (14) becomes small. In other words, it reaches a state where the distance measurement accuracy is low. Meanwhile, when decreasing the angle $\beta$ the range suitable for the distance measurement becomes narrow, but the value of the equation (14) becomes high and the distance measurement accuracy becomes high. Thus, from the equation (13), it can be said that the distance measurement accuracy and the distance measurement range are in a trade-off state.

Therefore, if a wide distance measurement range is required, the angle $\beta$ is made large (brought to approach $\Pi/2$). In other words, it is sufficient to bring the attaching angle $\beta$ of the stereo camera system 521 perpendicular to the road surface 551 (it is sufficient that the optical axes 541$oa$ and 542$oa$ of the cameras 541 and 542 are brought parallel to the road surface 551). Meanwhile, if the distance measurement accuracy at a short distance is required, the angle $\beta$ is decreased (brought to approach zero). In other words, it is sufficient to bring the attaching angle $\beta$ of the stereo camera system 521 parallel to the road surface 551 (that is, horizontal in this case) (it is sufficient that the optical axes 541$oa$ and 542$oa$ of the cameras 541 and 542 are brought perpendicular to the road surface 551).

By setting the angle $\beta$ within the range of $0<\beta<\Pi/2$, the optical axes 541$oa$ and 542$oa$ of the cameras 541 and 542 intersect with the road surface 551 at points M and N. That is, by attaching the cameras 541 and 542 such that their optical axes 541$oa$ and 542$oa$ intersect with the road surface 551, the distance measurement processing becomes possible.

FIG. 20 illustrates a relationship between the attaching angle $\beta$ of the stereo camera system 521, and the angle $\theta$ of the target point Q to be captured with respect to the stereo camera system 521. To make the relationship between the vehicle 511 and the target point Q to be captured easy to understand, FIG. 20 is transformed to illustrate a relationship between the distance measurement accuracy and a distance W, where a distance between the point T and the target point Q to be captured is W, as illustrated in FIG. 19. First, the distance W is expressed by the following equation (15). Note that since the value of $\theta+\beta$ is larger than $\Pi/2$, the value of tan $(\theta+\beta)$ becomes negative and the value of distance W becomes positive.

$$W=H/\tan(\Pi-(\theta+\beta))=-H/\tan(\theta+\beta) \qquad (15)$$

Figure 21:
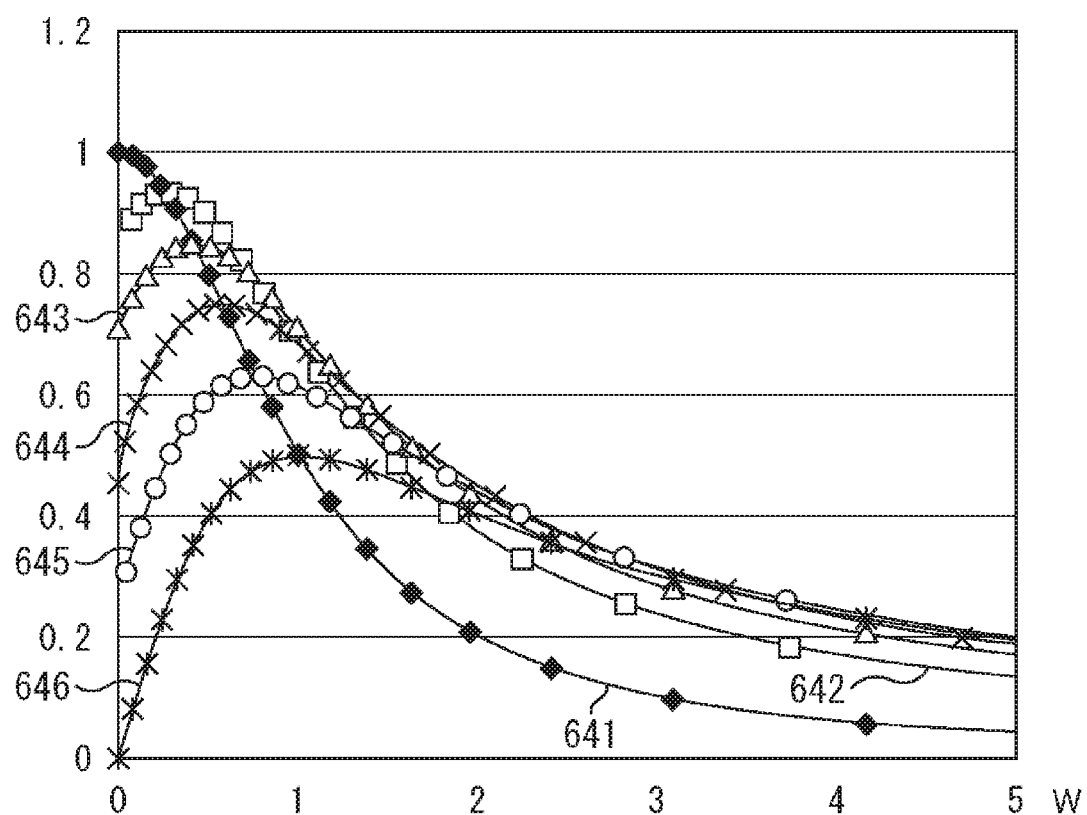
FIG. 21 is a diagram illustrating distance accuracy characteristics according to the second embodiment of the present technology.

A modified version of FIG. 20 using the equation (15) is illustrated in FIG. 21. FIG. 21 is a diagram illustrating distance accuracy characteristics according to the second embodiment of the present technology. In FIG. 21, the vertical axis represents the magnification of the distance measurement accuracy, and the horizontal axis represents the distance W (the unit is in meters). In FIG. 21, a curve 641 represents the magnification in a case where the angle $\beta$ is 0, a curve 642 represents the magnification in a case where the angle $\beta$ is $\Pi/6$, a curve 643 represents the magnification in a case where the angle $\beta$ is $\Pi/4$, and a curve 644 represents the magnification in a case where the angle $\beta$ is $\Pi/3$, respectively. A curve 645 represents the magnification in a case where the angle $\beta$ is $5\Pi/12$, and curves 646 and 645 represent the magnification in a case where the angle $\beta$ is $\Pi/2$.

As illustrated in FIG. 21, in the case of the angle $\beta=0$ (in the case of the curve 641), that is, in the case where the stereo camera system 521 is attached in parallel to the road surface 551, the magnification of the distance measurement accuracy at the point T (W=0.0 m) directly below the stereo camera system 521 becomes highest, which is 1. However, as the distance W increases, the distance measurement accuracy greatly decreases (in other words, the rate of decrease is large and the distance measurement accuracy becomes lower than that in a case where the angle $\beta$ is larger than 0). In the case of the angle $\beta=\Pi/2$ (that is, in the case of the curve 646), the distance measurement accuracy at the point T greatly decreases. However, the rate of decrease in the distance measurement accuracy of when the distance W becomes large, that is, when the target point Q to be captured is moved away from the vehicle 511 is low (the accuracy is better than that in the case where the angle $\beta$ is 0).

That is, when the angle $\beta$ is small, the distance measurement accuracy at a short distance is high, but the distance measurement accuracy at a long distance is low. On the contrary, when the angle $\beta$ is increased, the distance measurement accuracy at a short distance decreases, but a significant decrease in the distance measurement accuracy at a long distance can be prevented. Therefore, by setting the angle $\beta$ in a range from $\Pi/6$ to $5\Pi/12$ (the range illustrated by the curves 642 to 645), the distance measurement accuracy at a short distance and at a long distance can be balanced. In other words, this range is a range with high utility value where the distance measurement from a short distance to a long distance is practically possible.

For example, assuming that it is desired to measure the distance of the entire adjacent lane in a case where the stereo camera system 521 is attached to the side surface of the vehicle 511. The lane width is about 3.5 m in a case of a wide highway, but considering the traveling position within the lane of the vehicle 511, distance measurement of about 4 m is considered necessary. As shown in FIG. 21, the distance measurement accuracy is high in the case of the angle $\beta=\Pi/3$ (in the case of the curve 644) or in the case of Π/2 (in the case of the curve 646). In the case of the angle β=Π/2 (in the case of the curve 646), the distance measurement accuracy in the vicinity of the point T (W=0.0 m) is extremely low. Therefore, considering the distance accuracy at a short distance, it can be said that the case of the angle β=Π/3 (the case of the curve 644) is more desirable than the case of the angle β=Π/2 (the case of the curve 646).

In other words, to increase the distance measurement accuracy of one lane next to the side surface of the vehicle 511, it is good to attach the stereo camera system 521 to the side surface of the vehicle 511 at the angle β=Π/3 (the case of the curve 644), that is, at an angle about 60 degrees.

However, in the case of a large-sized vehicle such as a truck, the height H becomes large, and thus the driver is difficult to confirm the vicinity of the vehicle 511. Therefore, in such a case, the angle β can be set to a smaller value so that the accuracy can be improved when the distance W is small.

Figure 22:
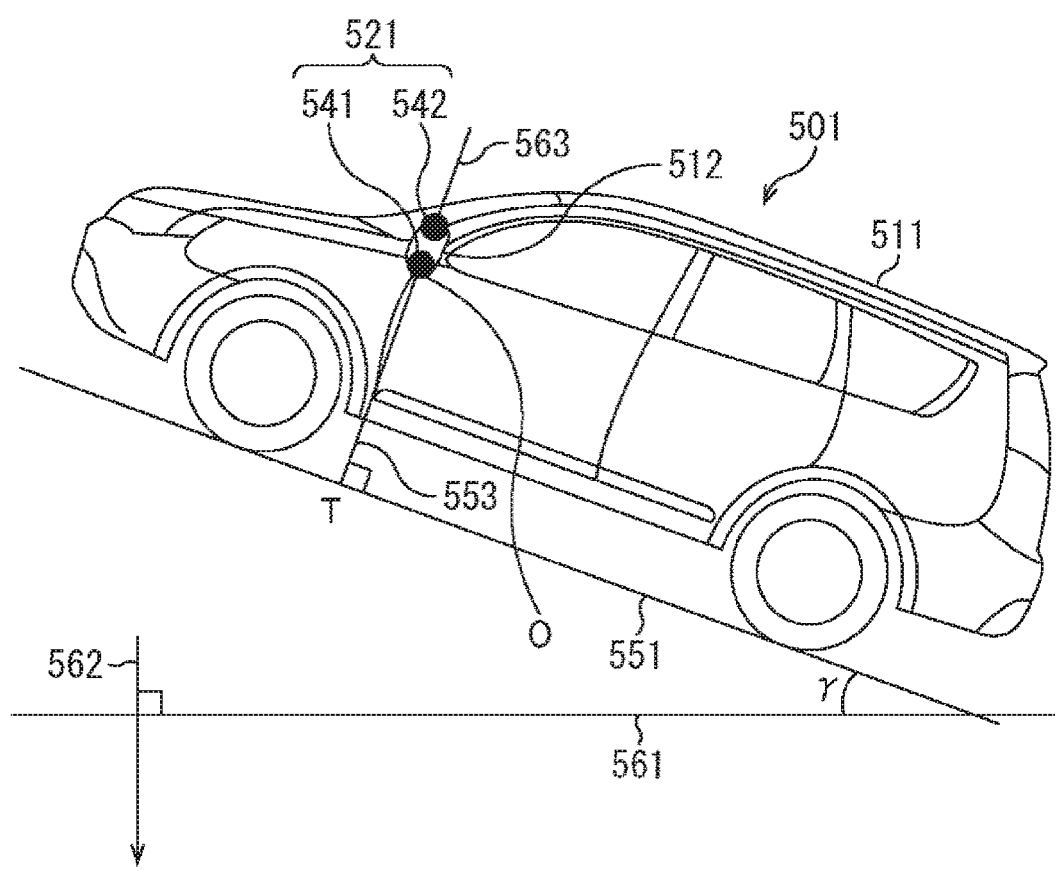
FIG. 22 is a diagram illustrating a configuration of the imaging control system according to the second embodiment of the present technology.

The attaching angle β of the stereo camera system 521 will be further described with reference to FIG. 22. FIG. 22 is a diagram illustrating a configuration of the imaging control system according to the second embodiment of the present technology. FIG. 17 illustrates a case where the vehicle 511 is arranged on the horizontal road surface 551. In contrast, FIG. 22 illustrates a case where the vehicle 511 is arranged on an inclined road surface 551.

In other words, in FIG. 22, the road surface 551 is inclined by an angle γ with respect to a horizontal plane 552 that is perpendicular to a vertical direction 553 that is the direction of gravity. That is, FIG. 22 illustrates a state where the vehicle 511 is climbing the uphill road surface 551. What the stereo camera system 521 monitors are an identification display on the road surface such as a white line on the road surface 551 where the vehicle 511 travels, an end portion of the road surface, a curb, a groove, a guardrail, or the like. Therefore, the road surface 551 on which the vehicle 511 travels is used as a basis plane, and the stereo camera system 521 is attached at an angle β with respect to the basis plane. The coordinate system of FIG. 19 can also be applied to FIG. 22 regardless of the value of the angle γ of the road surface 551.

That is, the cameras 541 and 542 of the stereo camera system 521 are arranged in an up-down direction (vertical direction) in a plane 556 that is perpendicular to the road surface 551 as the basis plane and includes the optical axes 541*oa* and 542*oa*. The plane 556 is also a plane perpendicular to the traveling direction of the vehicle 511 in the examples of FIGS. 17, 18, and 22. In the examples of FIGS. 17, 18, and 22, the camera 541 is arranged down and the camera 542 is arranged up in the plane 556. Then, the stereo camera system 521 is inclined within the plane 556 such that the angle formed with the basis plane (road surface 551) becomes β.

In other words, the cameras 541 and 542 of the stereo camera system 521 are arranged such that the optical axes 541*oa* and 542*oa* are directed downward with respect to a direction parallel to the basis plane (road surface 551), in other words, the optical axes 5410*a* and 542*oa* intersect with the basis plane. Alternatively, the optical axes 541*oa* and 542*oa* are arranged directed obliquely downward with respect to the vehicle 511. In other words, referring to FIG. 19, the camera 541 is arranged to cause the angle β formed by the optical axis 5410*a* and the direction toward directly below the vehicle 511 from the optical axis 541*oa* to fall within the range from Π/6 to 5Π/12. This also similarly applies to the camera 542. At least one of optical axis 541*oa* or 542*oa* (see FIGS. 40A and 40B as described below) is arranged directed obliquely downward toward a monitoring direction (the right side direction of the cameras 541 and 542 in FIG. 18 and the left side direction of the cameras 541 and 542 in FIG. 19). Specifically, the cameras 541 and 542 are arranged such that the angle β in FIG. 19 satisfies 0<β21 Π/2. With the arrangement, distance measurement in a wide range relatively close to the vehicle 511 can be performed with accuracy. Therefore, it is suitable for monitoring the side surface of the traveling vehicle 511, which requires a wide range of monitoring.

Note that, as the cameras 541 and 542, a camera with a normal viewing angle can be used instead of the wide-angle camera.

Figure 23:
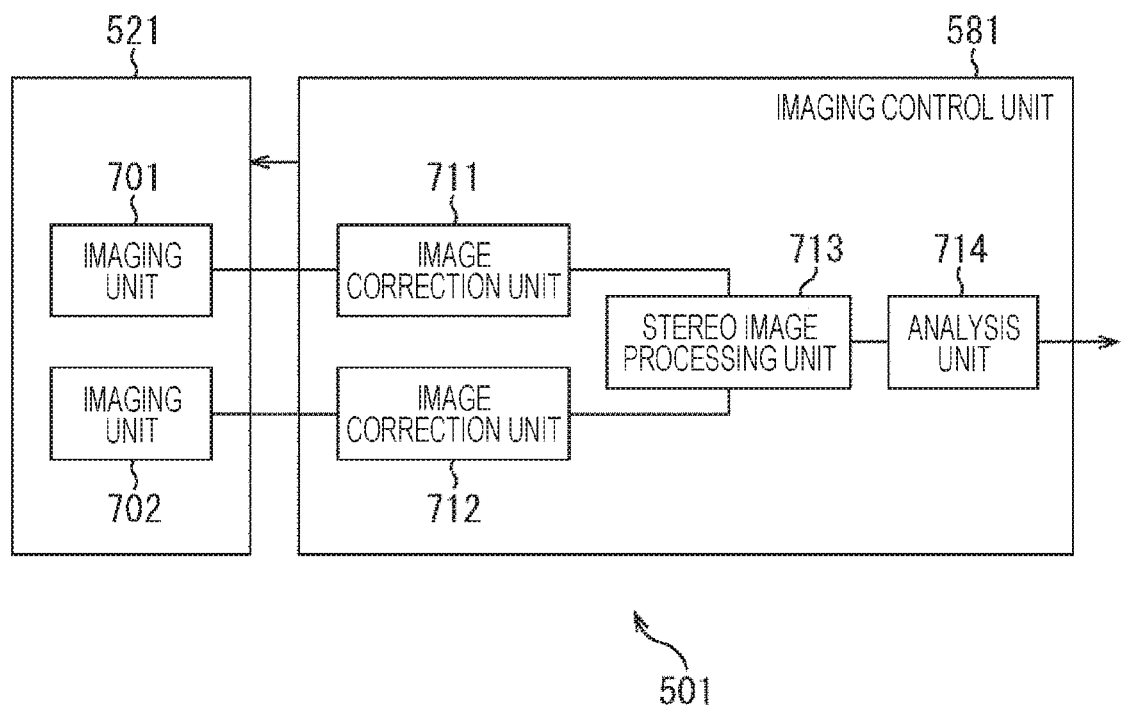
FIG. 23 is a block diagram illustrating a configuration of the imaging control system according to the second embodiment of the present technology.
Figure 24:
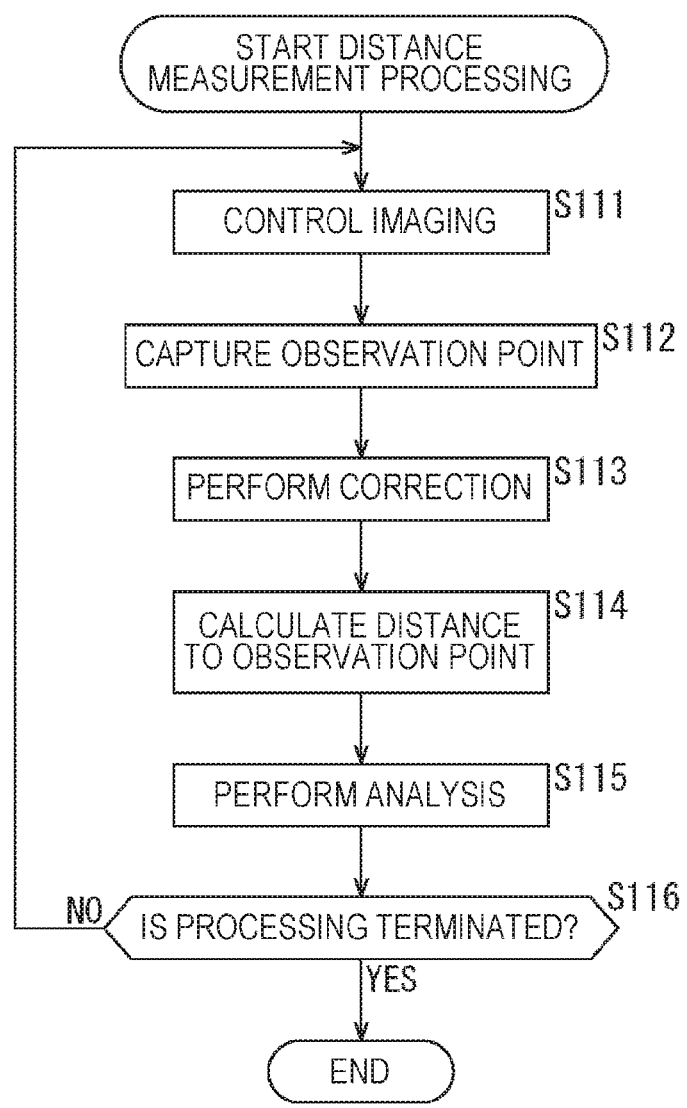
FIG. 24 is a flowchart for describing distance measurement processing according to the second embodiment of the present technology.

(2) Configuration Example 1 of Imaging Control System (FIGS. 23 and 24)

Next, the imaging control system 501 in which the stereo camera system 521 is arranged to have the optical axes 541*oa* and 542*oa* directed downward with respect to the direction parallel to the basis plane (road surface 551) will be described with reference to FIG. 23. FIG. 23 is a block diagram illustrating a configuration of the imaging control system according to the second embodiment of the present technology.

The imaging control system 501 in FIG. 23 is configured by the stereo camera system 521 and an imaging control unit 581. The imaging control unit 581 controls the imaging operation of the stereo camera system 521.

For example, the stereo camera system 521 arranged on the left side of the vehicle 511 is configured by an imaging unit 701 including the camera 541 and an imaging unit 702 including the camera 542. As described above, the cameras 541 and 542 are arranged on the side surface of the vehicle 511 up and down and such that the optical axes 541*oa* and 542*oa* are directed downward with respect to the direction parallel to the basis plane (road surface 551). The imaging unit 701 outputs an image captured by the camera 541, and the imaging unit 702 outputs an image captured by the camera 542.

The imaging control unit 581 includes image correction units 711 and 712, a stereo image processing unit 713, and an analysis unit 714. Outputs of the imaging unit 701 and the imaging unit 702 of the stereo camera system 521 are respectively supplied to the image correction unit 711 and the image correction unit 712, and aberration of a lens and the like are corrected as preprocessing. The stereo image processing unit 713, which performs the distance measurement processing, calculates the distance to the target object from outputs of the image correction units 711 and 712. The analysis unit 714 analyzes a result of the distance measurement and outputs the analyzed result to a subsequent device.

Next, an operation of the imaging control system 501 will be described with reference to FIG. 24. FIG. 24 is a flowchart for describing distance measurement processing according to the second embodiment of the present technology.

In step S111, the imaging control unit 581 controls the imaging operation of the stereo camera system 521. Note that this processing will be continuously executed thereafter. Further, this processing can also be externally controlled. In step S112, the imaging unit 701 (including the camera 541) and the imaging unit 702 (including the camera 542) in FIG. 23 capture the observation point. In step S113, the image correction unit 711 corrects lens aberration, camera image distortion, and the like of the image captured by the imaging unit 701. Similarly, the image correction unit 712 corrects lens aberration, camera image distortion, and the like of the image captured by the imaging unit 702. In other words, the distortion of the image is corrected and the image is projected on a virtual plane to obtain a planar image for distance calculation.

In step S114, the stereo image processing unit 713, as a monitoring processing unit that performs monitoring processing, calculates the distance to the observation point. In other words, the camera 541 of the imaging unit 701 and the camera 542 of the imaging unit 702 are arranged at positions separated by a distance L. Therefore, the image captured by the camera 541 and the image captured by the camera 542 have a phase difference, and the distance to the observation point can be calculated on the basis of the phase difference. That is, an object corresponding to an object appearing in one image of the cameras 541 and 542 is detected from the other image, and the distance is calculated from the deviation between the positions of the objects in the two images. A calculation result is output to the analysis unit 714.

In step S115, the analysis unit 714 analyzes the distance calculated by the stereo image processing unit 713, and outputs an analysis result. For example, a white line or the like (displayed on the road surface 551) at the same height as the road surface 551 is left as it is, and an object located higher than the road surface 551 is recognized as an obstacle. Alternatively, processing of collectively displaying information according to the position with respect to the vehicle 511, issuing an alarm in a case where the measured distance is smaller than a predetermined criterion value, or the like is performed.

In step S116, the stereo image processing unit 713 determines whether or not to terminate the processing. In a case where an instruction on termination of the processing has not been given yet from a user, the processing returns to step S111 and the processing in step S111 and subsequent steps is repeated. In a case where the instruction on the termination of the processing has been given, the processing is terminated.

Though not illustrated, the above processing is also executed in the stereo camera system 521 including the cameras 541 and 542 arranged on the right side of the vehicle 511 and the corresponding imaging control unit 581.

As described above, both sides of the vehicle 511 are monitored and driving thereof is assisted. The cameras 541 and 542 are arranged up and down and such that the optical axes of the cameras 541 and 542 are arranged to be directed downward with respect to the direction parallel to the basis plane. Therefore, not only the distance of the front or rear of the side surface of the vehicle 511 but also the distance in particular of a vicinity of a substantially central portion of the side can also be accurately measured.

Furthermore, in the above description, the measurement processing has been mainly described as the monitoring processing. However, white line recognition, curb recognition, detection of road surface condition, detection of vehicles including overtaking vehicles and oncoming vehicles, detection of pedestrians, and the like can also be processed in the monitoring processing.

Figure 25:
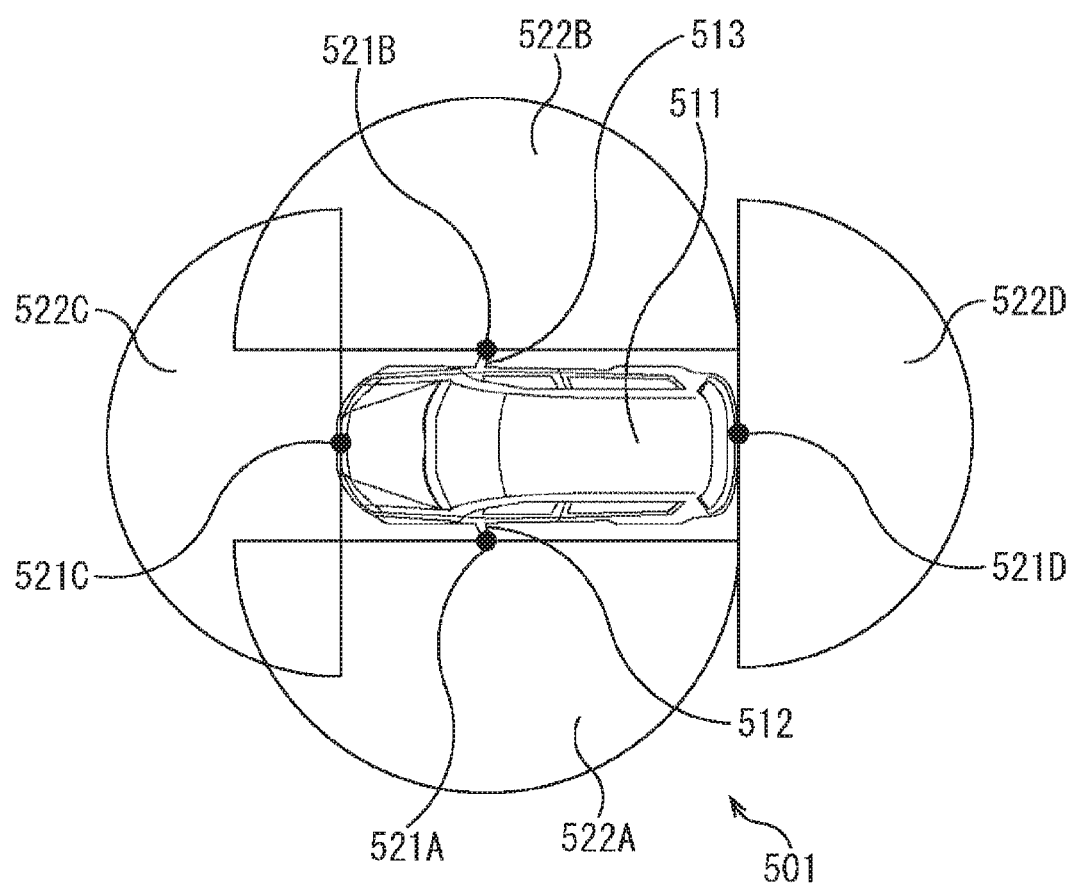
FIG. 25 is a diagram illustrating a configuration of the imaging control system according to the second embodiment of the present technology.
Figure 26:
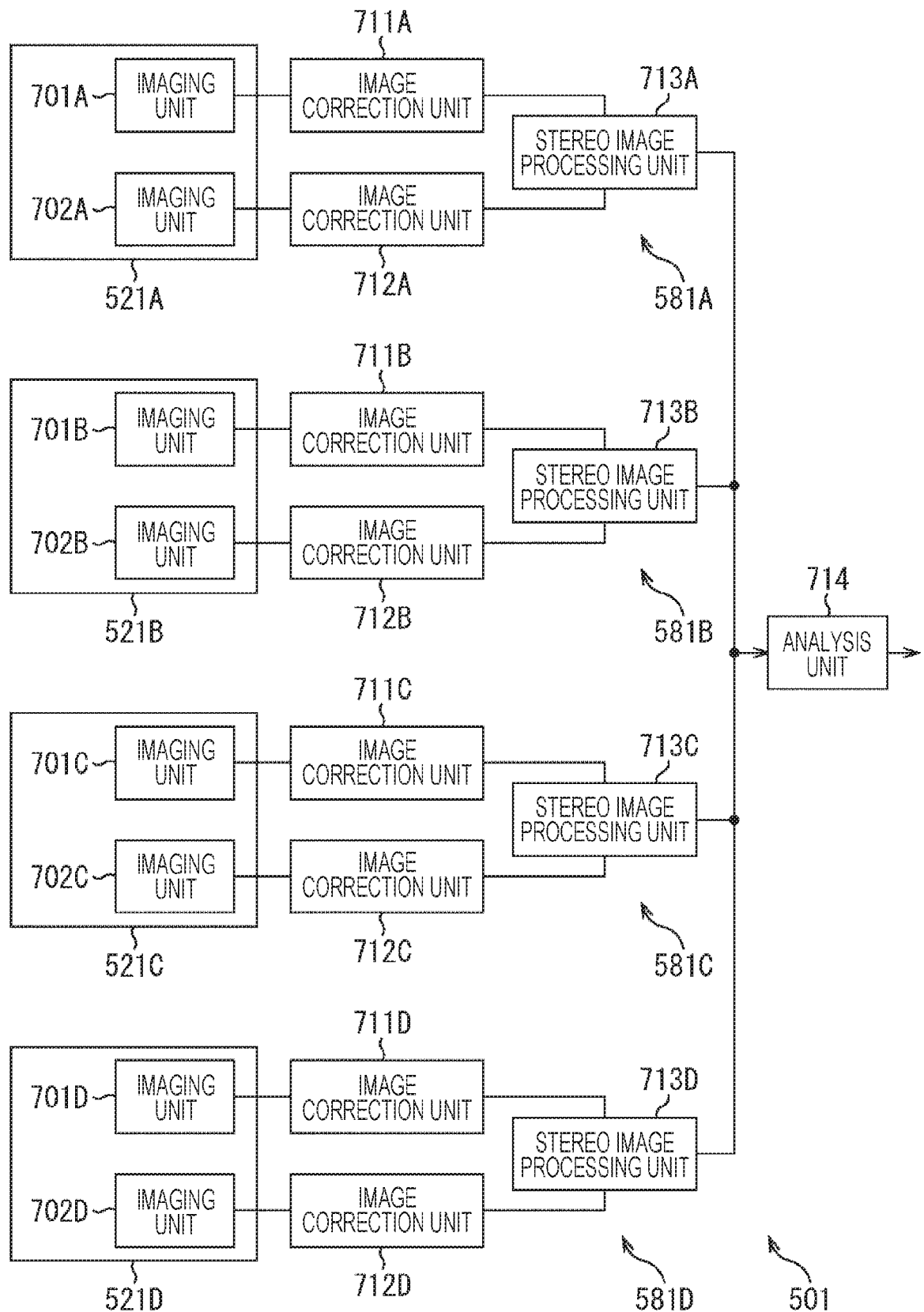
FIG. 26 is a block diagram illustrating a configuration of the imaging control system according to the second embodiment of the present technology.

(3) Configuration Example 2 of Imaging Control System (FIGS. 25 and 26)

Next, another imaging control system will be described with reference to FIGS. 25 and 26. FIG. 25 is a diagram illustrating a configuration of the imaging control system according to the second embodiment of the present technology. FIG. 26 is a block diagram illustrating a configuration of the imaging control system according to the second embodiment of the present technology.

In the imaging control system 501 of FIG. 25, stereo camera systems 521A and 521B are arranged on the left and right side surfaces of the vehicle 511. Further, in the imaging control system 501, a stereo camera system 521C is arranged on the front side of the vehicle 511 and a stereo camera system 521D is arranged on the rear side of the vehicle 511.

The stereo camera system 521A performs measurement in a detection range 522A on the left side of the vehicle 511 and the stereo camera system 521B performs measurement in a detection range 522B on the right side of the vehicle 511. Similarly, the stereo camera system 521C performs measurement in a detection range 522C in front of the vehicle 511 (that is, the direction in which the vehicle 511 travels forward). The stereo camera system 521D performs measurement in a detection range 522D behind the vehicle 511 (that is, the direction in which the vehicle 511 travels rearward).

FIG. 25 illustrates an example of a case where the viewing angle is 180 degrees as the detection ranges 522A to 522D (note that, to actually secure the viewing angle of 180 degrees, a lens with a wider viewing angle than 180 degrees, for example, 190 degrees, is necessary).

Note that the detection range 522 in FIG. 25 indicates a range in an angular direction, and the size in a distance direction, that is, the size of a semicircle diameter is actually larger.

As illustrated in FIG. 26, in the imaging control system 501 of FIG. 26, the stereo camera system 521 and the imaging control unit 581 illustrated in FIG. 23 are provided corresponding to the four surfaces of the vehicle 511. In other words, the stereo camera system 521A and an imaging control unit 581A, the stereo camera system 521B and an imaging control unit 581B, the stereo camera system 521C and an imaging control unit 581C, and the stereo camera system 521D and an imaging control unit 581D are provided.

The stereo camera system 521A includes an imaging unit 701A and an imaging unit 702A that capture the detection range 522A. The imaging control unit 581A includes image correction units 711A and 712A that correct outputs of the imaging units 701A and 702A and a stereo image processing unit 713A that calculates the distance in the detection range 522A from outputs of the image correction units 711A and 712A.

The stereo camera system 521B includes an imaging unit 701B and an imaging unit 702B that capture the detection range 522B. The imaging control unit 581B includes image correction units 711B and 712B that correct outputs of the imaging units 701B and 702B and a stereo image processing unit 713B that calculates the distance in the detection range 522B from outputs of the image correction units 711B and 712B.

The stereo camera system 521C includes an imaging unit 701C and an imaging unit 702C that capture the detection range 522C. The imaging control unit 581C includes image correction units 711C and 712C that correct outputs of the imaging units 701C and 702C and a stereo image processing unit 713C that calculates the distance in the detection range 522C from outputs of the image correction units 711C and 712C.

The stereo camera system 521D includes an imaging unit 701D and an imaging unit 702D that capture the detection range 522D. The imaging control unit 581D includes image correction units 711D and 712D that correct outputs of the imaging units 701D and 702D and a stereo image processing unit 713D that calculates the distance in the detection range 522D from outputs of the image correction units 711D and 712D.

The analysis unit 714 is provided in common to the detection ranges 522A to 522D, and analyzes the outputs of the stereo image processing units 713A to 713D.

The operation of the imaging control system 501 in FIG. 26 is similar to the operation illustrated in the flowchart in FIG. 24. Therefore, the operation of the imaging control system 501 in FIG. 26 will be described with reference to FIG. 24.

In step S112, the imaging unit 701A (including the camera 541A) and the imaging unit 702A (including the camera 542A) in FIG. 26 capture the observation point. In step S113, the image correction unit 711A corrects lens aberration, camera image distortion, and the like of the image captured by the imaging unit 701A. Similarly, the image correction unit 712A corrects lens aberration, camera image distortion, and the like of the image captured by the imaging unit 702A. In other words, the distortion of the image is corrected and the image is projected on a virtual plane to obtain a planar image for distance calculation.

In step S114, the stereo image processing unit 713A calculates the distance to the observation point. In other words, the camera 541A of the imaging unit 701A and the camera 542A of the imaging unit 702A are arranged at positions separated by a distance L. Therefore, the image captured by the camera 541A and the image captured by the camera 542A have a phase difference, and the distance to the observation point can be calculated on the basis of the phase difference. That is, an object corresponding to an object appearing in one image of the cameras 541A and 542A is detected from the other image, and the distance is calculated from the deviation between the positions of the objects in the two images. A calculation result is output to the analysis unit 714A.

The above processing in steps S111 to S114 is similarly performed in the stereo camera systems 521B to 521D and the imaging control units 581B to 581D.

In step S115, the analysis unit 714 analyzes the distance calculated by the stereo image processing units 713A to 713D, and outputs an analysis result. For example, in a case where the measured distance is smaller than a predetermined criterion value, processing such as issuing a warning is performed.

In step S116, the stereo image processing units 713A to 713D determine whether or not to terminate the processing. In a case where an instruction on termination of the processing has not been given yet from a user, the processing returns to step S111 and the processing in step S111 and subsequent steps is repeated. In a case where the instruction on the termination of the processing has been given, the processing is terminated.

As described above, not only both sides of the vehicle 511 but also the front and rear of the vehicle 511 are monitored, and driving of the vehicle 511 is assisted. The cameras 541 and 542 are arranged up and down and the optical axes are arranged to be directed downward with respect to the direction parallel to the basis plane. Therefore, not only the distances of substantially central portions in the detection ranges 522A to 522D of the vehicle 511 but also the distances of portions in right and left directions from the central portions can be accurately measured.

Furthermore, the stereo camera system 521C on the front side and the stereo camera system 521D on the rear side of the vehicle 511 illustrated in FIG. 25 may have narrower measurement ranges in a plane parallel to the road surface 551 of the distance measurement than the stereo camera systems 521A and 521B on both side surfaces. Therefore, the distance measurement processing in the detection ranges 522C and 522D in front of and behind the vehicle 511 is performed by an ultrasonic wave, a radar, a laser sensor, an infrared sensor, or the like, as a distance measurement processing unit, or by a combined system of the aforementioned device and the stereo camera system 521.

(4) Configuration Example 3 of Imaging Control System (FIGS. 27 to 30)

Figure 27:
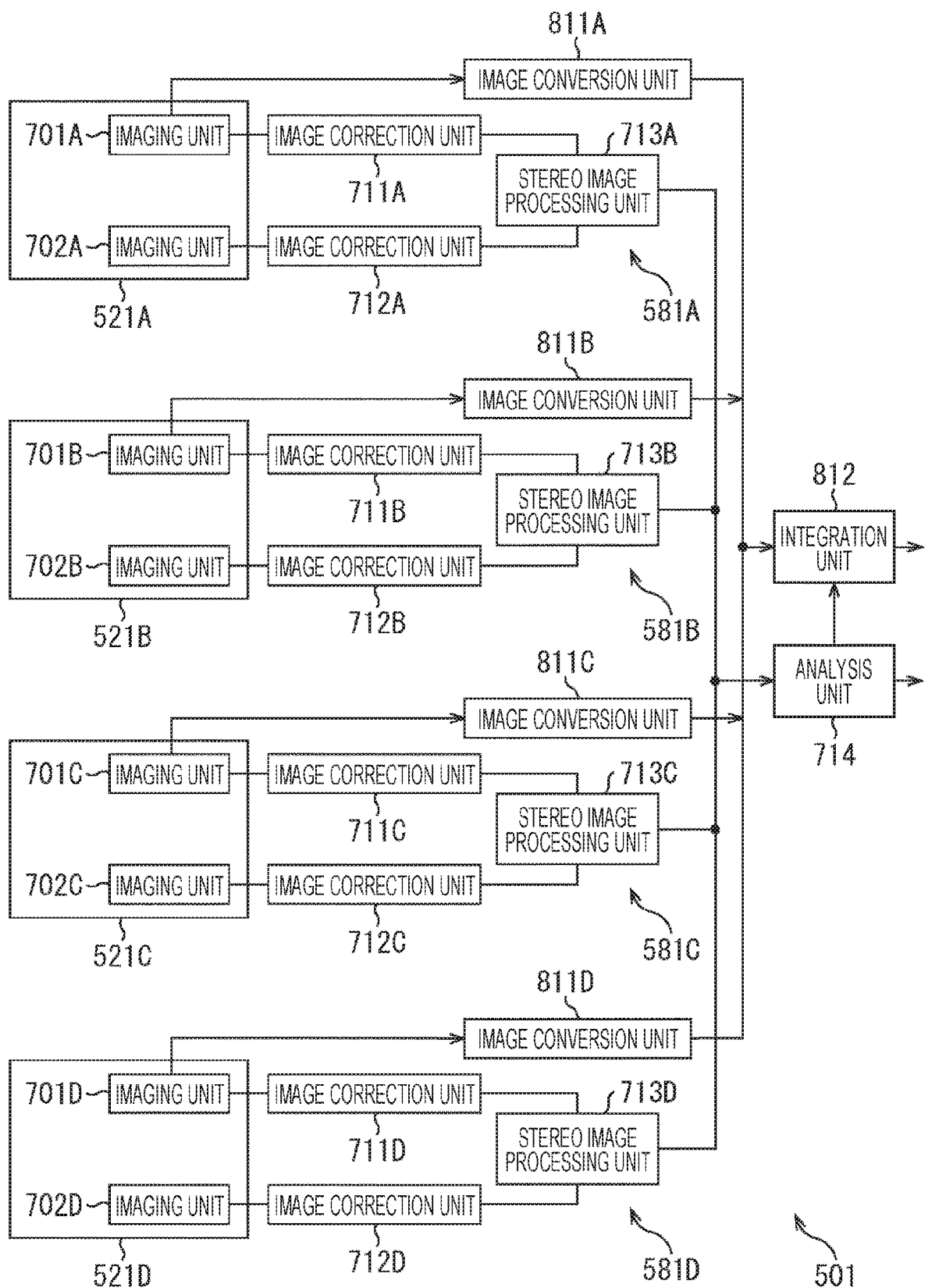
FIG. 27 is a block diagram illustrating a configuration of the imaging control system according to the second embodiment of the present technology.

Next, another imaging control system will be described with reference to FIG. 27. FIG. 27 is a block diagram illustrating a configuration of the imaging control system according to the second embodiment of the present technology.

The imaging control system 501 in FIG. 27 includes the stereo camera systems 521A to 521D, and the imaging control units 581A to 581D, similarly to the imaging control system 501 in FIG. 26. The imaging control unit 581A includes the image correction units 711A and 712A and the stereo image processing unit 713A. The imaging control unit 581B includes the image correction units 711B and 712B and the stereo image processing unit 713B. The imaging control unit 581C includes the image correction units 711C and 712C and the stereo image processing unit 713C. The imaging control unit 581D includes the image correction units 711D and 712D and the stereo image processing unit 713D. Furthermore, the imaging control units 581A to 581D include the analysis unit 714 common to the imaging control units 581A to 581D. The above configuration is a similar configuration to that of the imaging control system 501 in FIG. 26.

In addition, in FIG. 27, the imaging control unit 581A includes an image conversion unit 811A, the imaging control unit 581B includes an image conversion unit 811B, the imaging control unit 581C includes an image conversion unit 811C, and the imaging control unit 581D includes an image conversion unit 811D, respectively. Furthermore, the imaging control units 581A to 581D include an integration unit 812 common to the imaging control units 581A to 581D.

The image conversion unit 811A converts a viewpoint of the image output by the imaging unit 701A using an image conversion method such as projective transformation. With the conversion, an image that a user views a periphery of the vehicle 511, such as an image for around monitor system, can be obtained. Similarly, the image conversion unit 811B converts a viewpoint of the image output by the imaging unit 701B using an image conversion method such as projective transformation, and the image conversion unit 811C converts a viewpoint of the image output by the imaging unit 701C using an image conversion method such as projective transformation. The image conversion unit 811D converts a viewpoint of the image output by the imaging unit 701D using an image conversion method such as projective transformation.

Note that the image conversion units 811A to 811D perform the projective transformation for the images output from the imaging units 701A to 701D. However, the image conversion units 811A to 811D can perform the projective transformation for the images output from the imaging units 702A to 702D.

The integration unit 812 integrates the outputs of the image conversion unit 811A, the image conversion unit 811B, the image conversion unit 811C, and the image conversion unit 811D.

Figure 28:
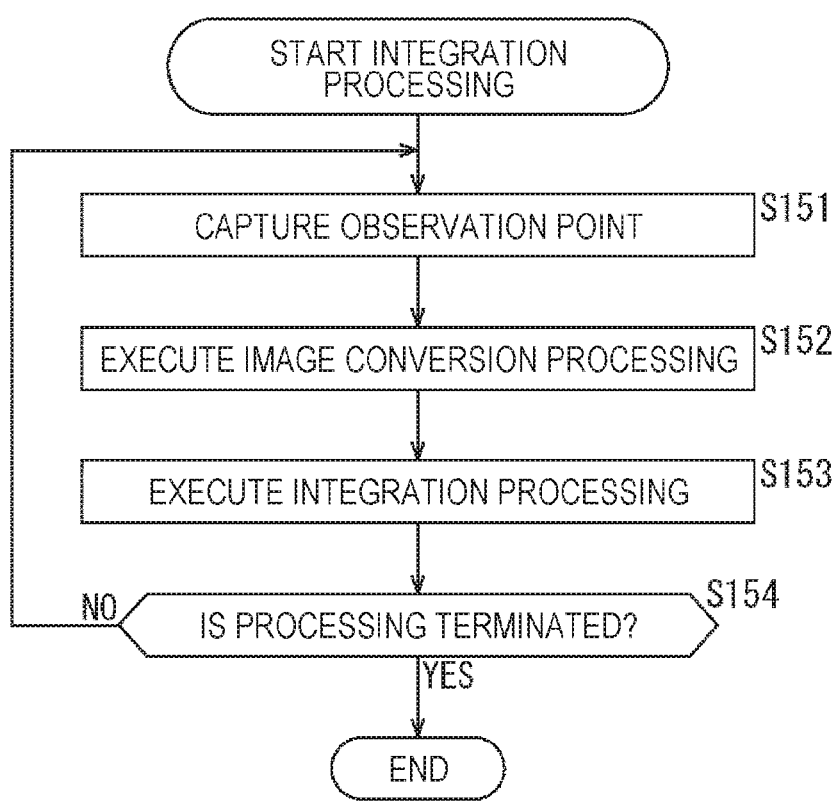
FIG. 28 is a flowchart for describing integration processing according to the second embodiment of the present technology.

Next, an operation of the imaging control system 501 in FIG. 27 will be described with reference to FIG. 28. Note that the processing regarding the imaging units 701 and 702, the image correction units 711 and 712, the stereo image processing unit 713 as the monitoring processing unit that performs the monitoring processing, and the analysis unit 714, of the operation of the imaging control system 501 in FIG. 27, is similar to the operation of the imaging control system 501 in FIG. 26. In other words, the operation is similar to the operation illustrated in the flowchart in FIG. 24. Therefore, repetitive description is omitted.

Therefore, operations of configurations of the image conversion unit 811 and the integration unit 812 in the imaging control system 501 in FIG. 27 will be mainly described. FIG. 28 is a flowchart for describing the integration processing according to the second embodiment of the present technology.

In step S151, the imaging unit 701A (that is, the camera 541A) in FIG. 27 captures the observation point. Similarly, the imaging unit 701B (that is, the camera 541B), the imaging unit 701C (that is, the camera 541C), and the imaging unit 701D (that is, the camera 541D) also capture the observation point.

The imaging unit 702A (that is, the camera 542A) to the imaging unit 702D (that is, the camera 542D) similarly capture the observation point, but the captured images are not used for the integration processing described now, so description is omitted.

In step S152, the image conversion unit 811A executes image conversion processing. In other words, the viewpoint of the image captured by the imaging unit 701A (that is, the camera 541A) is converted by an image conversion method such as projective transformation. With the conversion, an image for around monitor system is generated. Similar image conversion processing is executed by the image conversion units 811B, 811C, and 811D.

In step S153, the integration unit 812 executes the integration processing. In other words, images in the detection range 522A to the detection range 522D around the vehicle 511 are obtained by the image conversion units 811A to 811D. Thus, these images are integrated and the image for around monitor system for viewing the periphery of the vehicle 511 in bird's eye view is generated and output. This image is displayed on a monitor or the like at a subsequent stage.

In step S154, the image conversion units 811A to 811D determine whether or not to terminate the processing. In a case where an instruction on termination of the processing has not been given yet from a user, the processing returns to step S151 and the processing in step S151 and subsequent steps is repeated. In a case where the instruction on the termination of the processing has been given, the processing is terminated.

Figure 29:
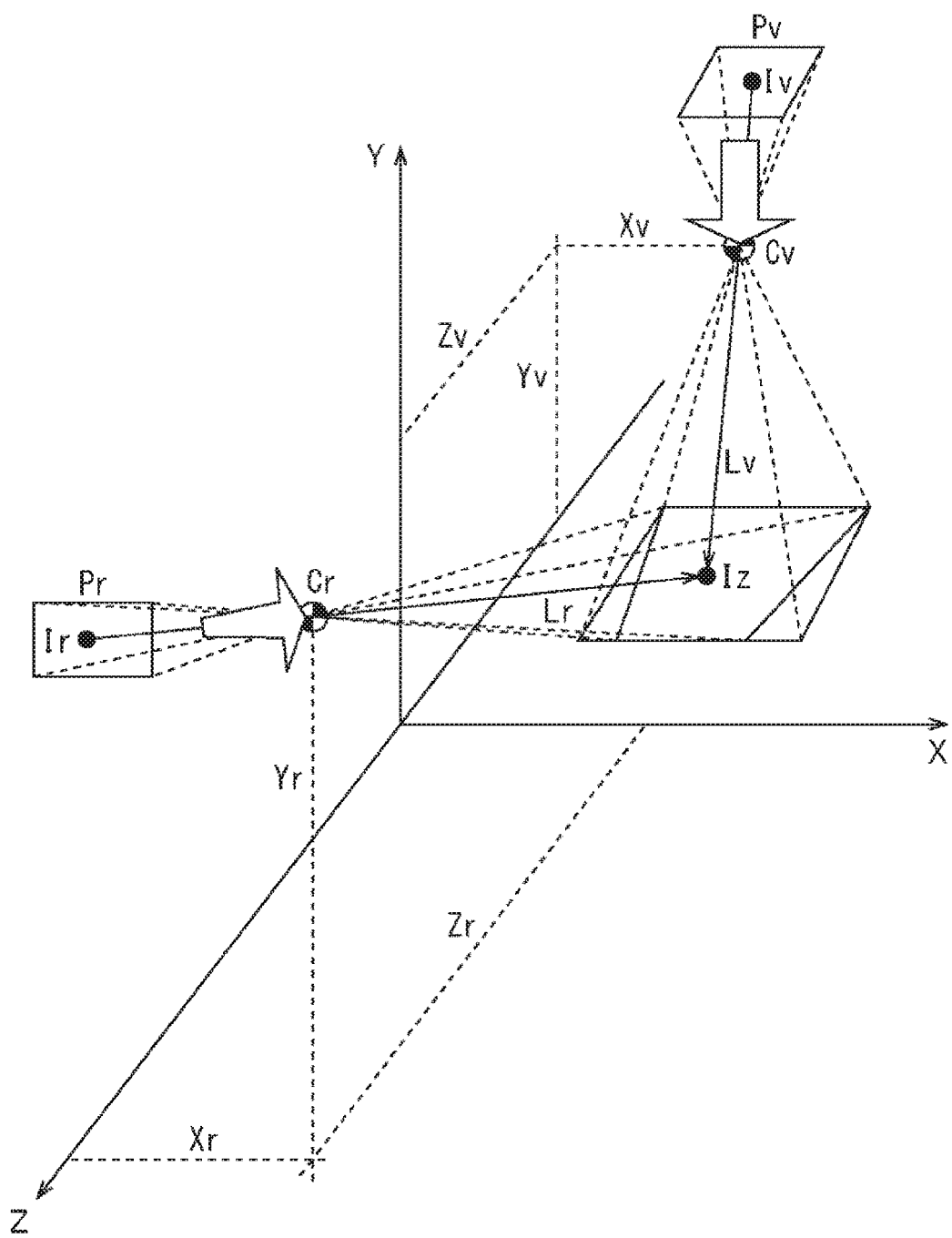
FIG. 29 is a diagram for describing viewpoint conversion processing.
Figure 30:
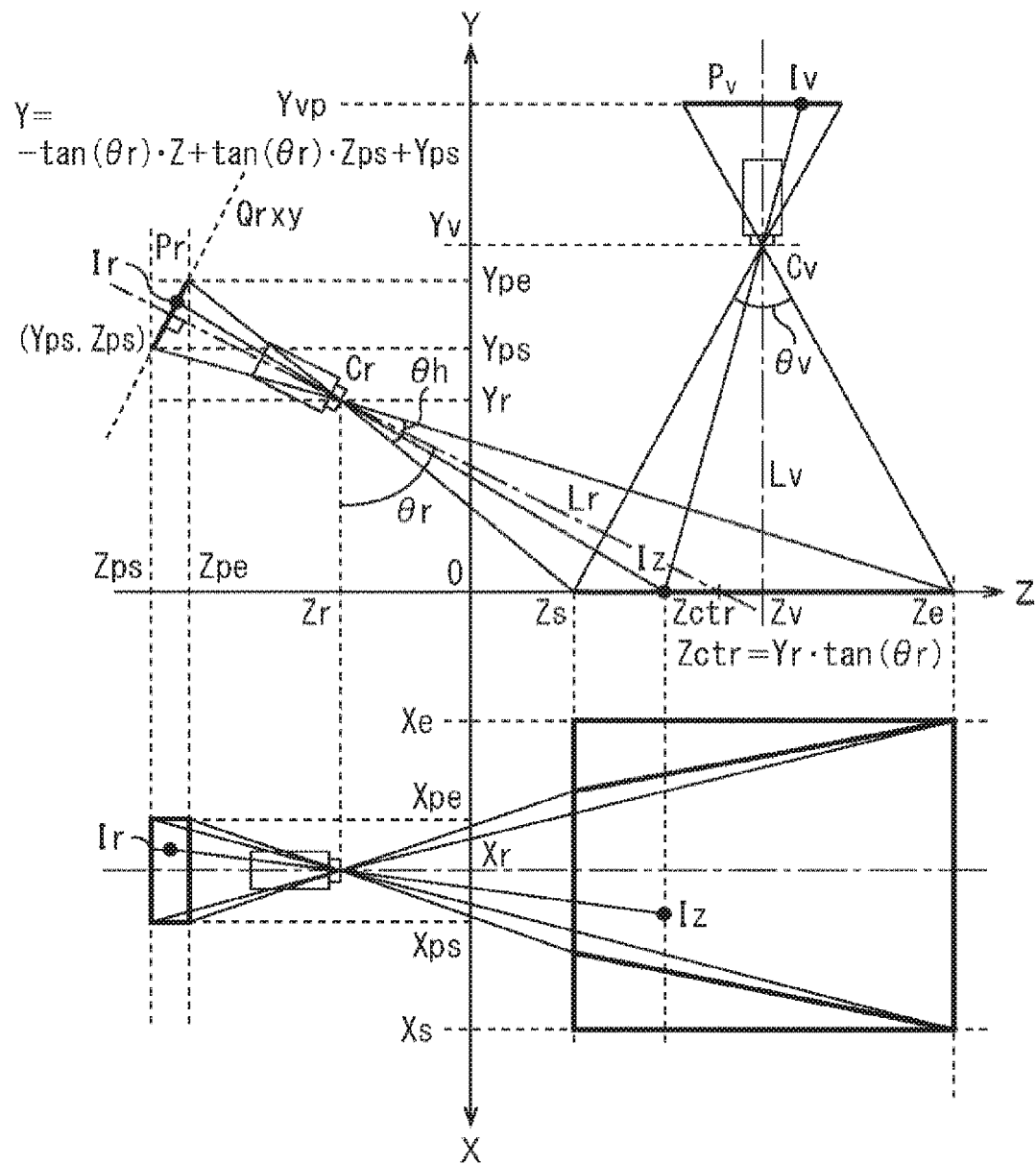
FIG. 30 is a diagram for describing the viewpoint conversion processing.

Here, viewpoint conversion processing will be described. FIGS. 29 and 30 are diagrams for describing the viewpoint conversion processing. FIG. 30 is a diagram illustrating a positional relationship between a picture by a real camera and a picture by a virtual camera illustrated in FIG. 29 developed into a Y-Z plane as seen from the side and an X-Z plane as seen from above.

As illustrated in FIG. 29, an example in which a picture Pr imaged by the actual camera installed at a point Cr (Xr, Yr, Zr) at an arbitrary position in a three-dimensional space is converted into a picture Pv of the virtual camera installed at a point Cv (Xv, Yv, Zv) at an arbitrary position will be described. Here, the two cameras shall be pinhole cameras that capture pictures at one point. Furthermore, the pictures Pr and Pv can be set to arbitrary positions according to the size of images as long as the pictures Pr and Pv are perpendicular to vectors Lr and Lv indicating directions of the cameras. It is desirable to set the pictures rearward in a case where the image is large and to set the pictures forward in a case where the image is small.

A procedure for converting the imaged picture Pr into the picture Pv of the virtual camera will be described. First, a point Iv is set at an arbitrary position on the picture Pv, and a point Iz at which a straight line connecting the point Iv and the point Cv intersects with the X-Z plane is obtained. Note that, in a case where the straight line connecting the point Iv and the point Cv does not intersect with the X-Z plane, the color of a pixel of the point Iv is set to a predetermined color to indicate that the point Iv is outside the imaging range of the real camera.

Next, a point Ir where a straight line connecting the point Iz and the point Cr intersects with a plane of the picture Pr is obtained, and the color of a pixel of the point Ir is set to the same color as the color of the pixel of the point Iv. Note that, in a case where the straight line connecting the point Iz and the point Cr does not intersect with the plane of the picture Pr, the color of the pixel of the point Ir is set to a predetermined color to indicate that the point Ir is outside imaging range of the real camera. The above processing is repeated until colors of pixels of all points on the picture Pr are determined.

A point Zctr where a center line of the point Cr at an actual camera position illustrated in FIG. 30 intersects with the Z axis is expressed by the following equation (16).

$$Zctr = Yr \cdot \tan(\theta r) \quad (16)$$

Here, θr is a tilt angle of the real camera with respect to the X-Z plane. A straight line Qrxy passing through a cross section by the Y-Z plane, of the picture Pr of the actual camera is orthogonal to the center line of the real camera (a straight line with a slope 1/tan (βr) passing through the point Cr and the point Zctr) and passes through a coordinate point (Yps, Zps) at a lower end of the picture Pr. Therefore, the straight line Qrxy is expressed by the following equation (17).

$$Y = -\tan(\theta r) \cdot Z + \tan(\theta r) \cdot Zps + Yps \quad (17)$$

The point Iz at which the straight line passing through the point Iv on the picture Pv of the virtual camera and the point Cv at the virtual camera position intersects with the Z axis is obtained, and then Y-Z coordinates of the point Ir at which the straight line passing through the point Iz and the point Cr at the actual camera position intersects with the straight line Qrxy expressed by the equation (17) are obtained. As for the X-Z plane, X-Z coordinates of the point Ir are obtained similarly to the Y-Z plane. Then, the color of the pixel of the point Iv on the picture Pv of the virtual camera is set to the same color as the color of the pixel of the point Iv on the picture Pr of the real camera, and the above-processing is performed for all the points on the picture Pv of the virtual camera.

In this manner, according to the imaging control system 501 of FIG. 27, parking assistance such as backward parking, parallel parking, and the like, provision of recognition information of bicycles, pedestrians, and the like obliquely backward at the time of intersection stop, monitoring of following cars in the next lane at the time of lane change, and assistance for the user's driving by visual observation can be performed in addition to driving assistance such as warning and automatic control of braking associated with distance measurement to a target object. For example, the analysis result of the analysis unit 714 can be supplied to the integration unit 812, and the positions of an obstacle and the like based on the distance measurement result can be displayed in a visually observable manner on a visual observation screen.

Note that, in the imaging control system 501 in FIG. 27, the image captured by the imaging unit 701 configuring the stereo camera system 521 is processed in the image conversion unit 811. However, a special camera may be separately provided. In the case of using the image of the imaging unit 701 configuring the tereo camera system 521, the one image can be used for both monitoring by visual observation and monitoring by distance measurement. As a result, the cost can be reduced. In the case where a visual monitoring system already exists, the monitoring by distance measurement can be performed by simply adding one camera configuring the stereo camera system 521.

(5) Configuration Example 4 of Imaging Control System (FIGS. 31 to 37)

Figure 31:
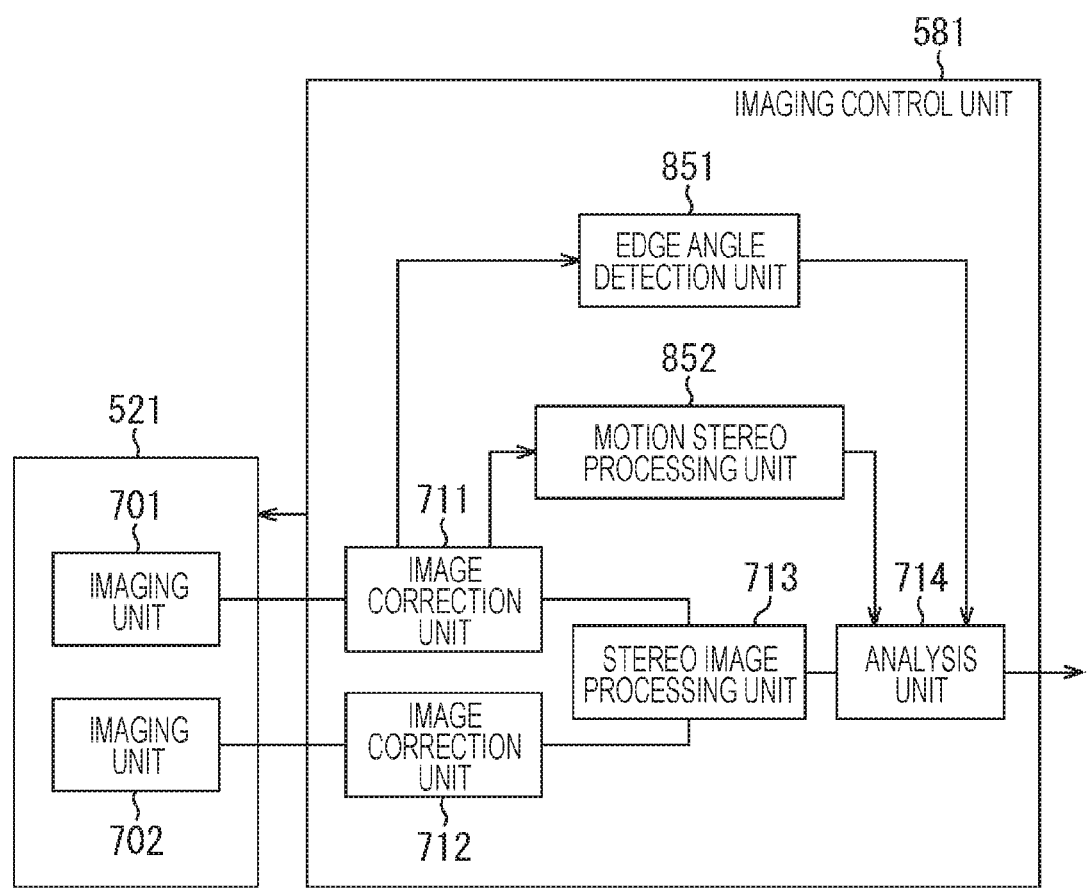
FIG. 31 is a block diagram illustrating a configuration of the imaging control system according to the second embodiment of the present technology.

Next, another imaging control system will be described with reference to FIG. 31. FIG. 31 is a block diagram illustrating a configuration of the imaging control system according to the second embodiment of the present technology.

The imaging control system 501 in FIG. 31 is configured by the stereo camera system 521 and the imaging control unit 581 similarly to the imaging control system 501 in FIG. 23. The imaging control unit 581 controls the imaging operation of the stereo camera system 521.

The stereo camera system 521 includes the imaging unit 701 including the camera 541 and the imaging unit 702 including the camera 542. As described above, the cameras 541 and 542 are arranged on the side surface of the vehicle 511 up and down and such that the optical axes are directed downward with respect to the direction parallel to the basis plane. The imaging unit 701 outputs an image captured by the camera 541, and the imaging unit 702 outputs an image captured by the camera 542.

The imaging control unit 581 includes image correction units 711 and 712, a stereo image processing unit 713, and an analysis unit 714. Outputs of the imaging unit 701 and the imaging unit 702 of the stereo camera system 521 are respectively supplied to the image correction unit 711 and the image correction unit 712, and aberration of a lens and the like are corrected as preprocessing. The stereo image processing unit 713 as the monitoring processing unit that performs the monitoring processing calculates the distance to the target object from the outputs of the imaging units 701 and 702. The analysis unit 714 analyzes a result of the distance measurement and outputs the analyzed result to a subsequent device.

The imaging control unit 581 in FIG. 31 further includes an edge angle detection unit 851 and a motion stereo processing unit 852. The edge angle detection unit 851 detects a portion where change in brightness or color is caused in the image, and an angle that is a direction of the change from the image corrected by the image correction unit 711, and outputs a detection result to the analysis unit 714.

The motion stereo processing unit 852 as another monitoring processing unit that performs monitoring processing performs distance measurement by motion stereo processing from the image corrected by the image correction unit 711. In other words, when the position of a stationary object in the image changes in a camera view together with movement of the camera, the distance measurement can be performed on a similar principle as the stereo image processing in the stereo camera system using a plurality of cameras. The measurement information is output to the analysis unit 714.

Figure 32:
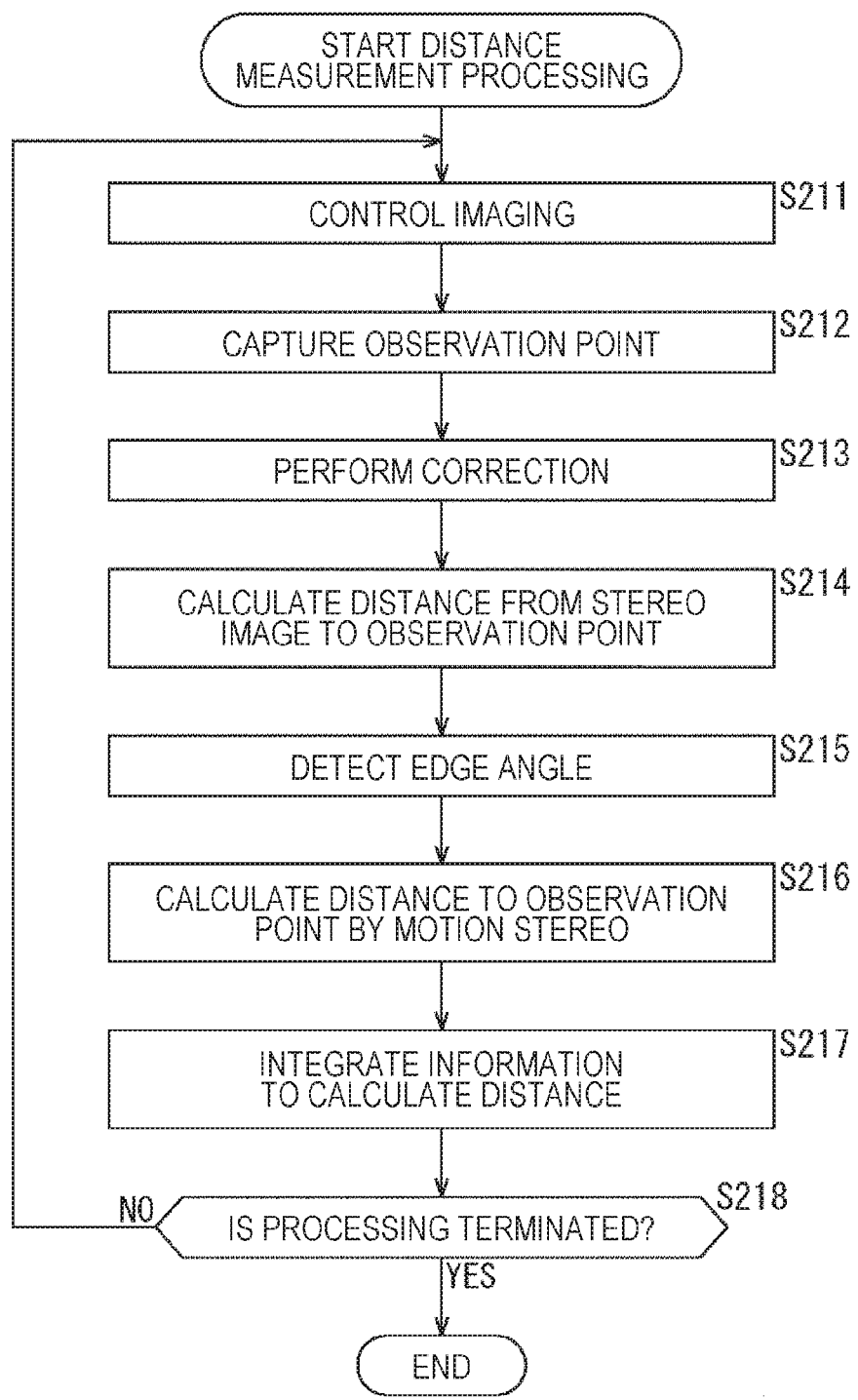
FIG. 32 is a flowchart for describing the distance measurement processing according to the second embodiment of the present technology.

Next, an operation of the imaging control system 501 in FIG. 31 will be described with reference to FIG. 32. FIG. 32 is a flowchart for describing distance measurement processing according to the second embodiment of the present technology.

In step S211, the imaging control unit 581 controls the imaging operation of the stereo camera system 521. Note that this processing will be continuously executed thereafter. Further, this processing can also be externally controlled. In step S212, the imaging unit 701 (including the camera 541) and the imaging unit 702 (including the camera 542) in FIG. 31 capture the observation point. In step S213, the image correction unit 711 corrects lens aberration, camera image distortion, and the like of the image captured by the imaging unit 701. Similarly, the image correction unit 712 corrects lens aberration, camera image distortion, and the like of the image captured by the imaging unit 702. In other words, the distortion of the image is corrected and the image is projected on a virtual plane to obtain a planar image for distance calculation.

In step S214, the stereo image processing unit 713 calculates the distance to the observation point. In other words, the camera 541 of the imaging unit 701 and the camera 542 of the imaging unit 702 are arranged at positions separated by a distance L. Therefore, the image captured by the camera 541 and the image captured by the camera 542 have a phase difference, and the distance to the observation point can be calculated on the basis of the phase difference. That is, an object corresponding to an object appearing in one image of the cameras 541 and 542 is detected from the other image, and the distance is calculated from the deviation between the positions of the objects in the two images. A calculation result is output to the analysis unit 714.

In step S215, the edge angle detection unit 851 detects an edge angle from the corrected image output by the image correction unit 711. In other words, the portion where change in brightness and color is caused in the image is detected, and the angle that is the direction of the change is detected.

For the edge detection, a difference (differential) method of calculating the degree of change in brightness can be adopted. For example, Prewitt edge detectors and Sobel edge detectors are known, and the edge can be detected by performing processing by each edge detection operator. Furthermore, a zero crossing method of detecting the position where change in brightest is steepest can be adopted. Of course, other various methods can also be adopted.

In step S216, the motion stereo processing unit 852 calculates the distance to the observation point by motion stereo. A calculation result is supplied to the analysis unit 714. Here, the motion stereo will be described.

Figure 33:
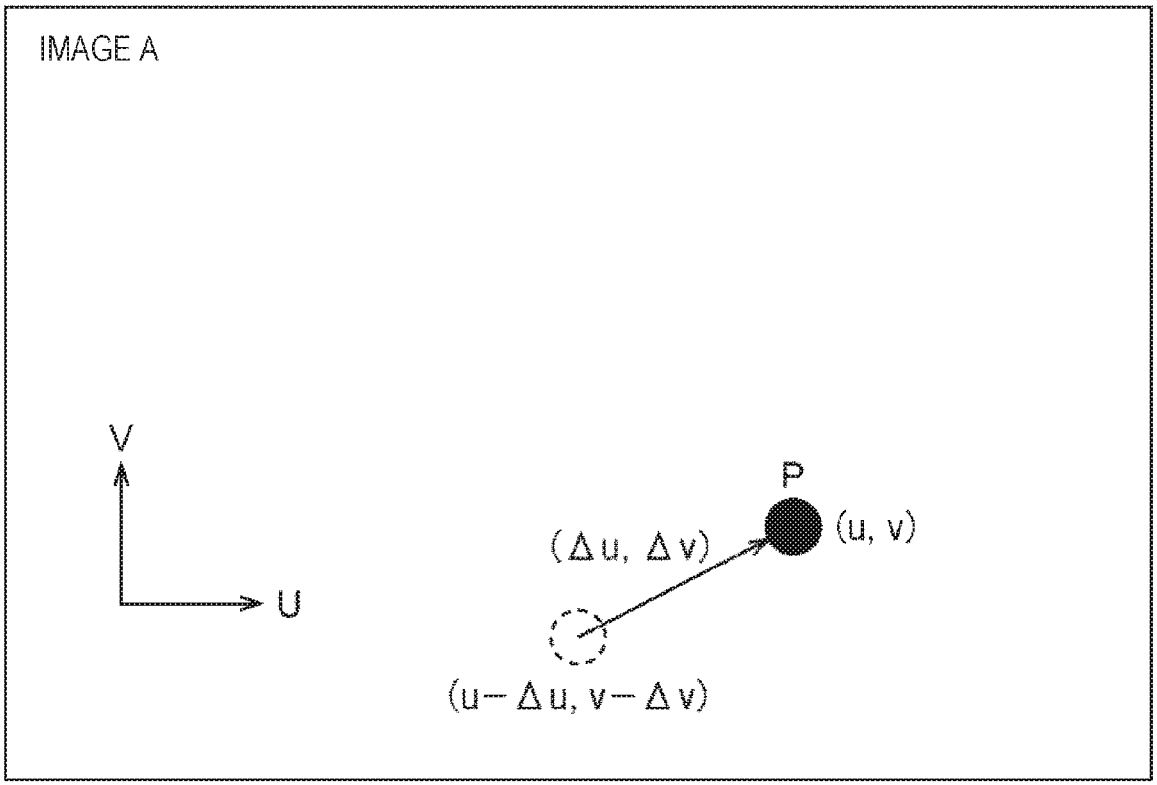
FIG. 33 is a diagram for describing an image of a current frame.
Figure 34:
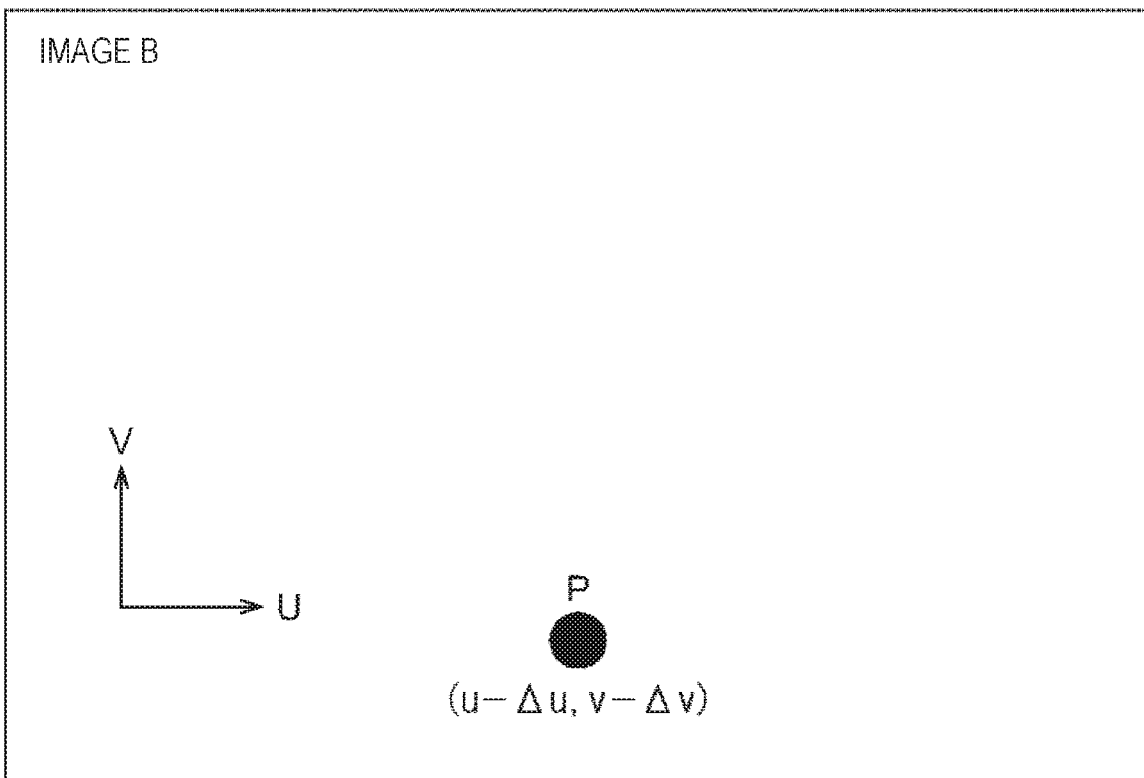
FIG. 34 is a diagram for describing an image of a past frame.

First, an optical flow will be described with reference to FIGS. 33 and 34. FIG. 33 is a diagram for describing an image of a current frame, and FIG. 34 is a diagram for describing an image of a past frame. The optical flow is a vector that indicates an amount of movement of corresponding points in preceding and subsequent images in chronological order. For example, processing of obtaining an optical flow from an image A of the current frame (see FIG. 33) and an image B (see FIG. 34) in the past frame acquired in the past than the image A begins with searching for from where in the image B a point existing in the image A is moved. Note that a V axis is taken in an up direction of the image and a U axis is taken in a right direction of the image. Furthermore, the center of the image is taken as the origin of U axis and V axis.

It is assumed that the point P is moved from the image B to the image A as illustrated in FIG. 33. The position of the point P in the image B is (u−Δu, v−Δv), and the position of the point P in the image A is (u, v). (Δu, Δv) that is a difference between the position of the point P in the image A and the position of the point P in the image B is the optical flow at the point (u, v) of the image A. In other words, the point (u, v) of the image A is the end point of the optical flow and a point (u−Δu, v−Δv) on the image A corresponding to the point (u−Δu, v−Δv) of the image B can be said to be a starting point of the optical flow.

Figure 35:
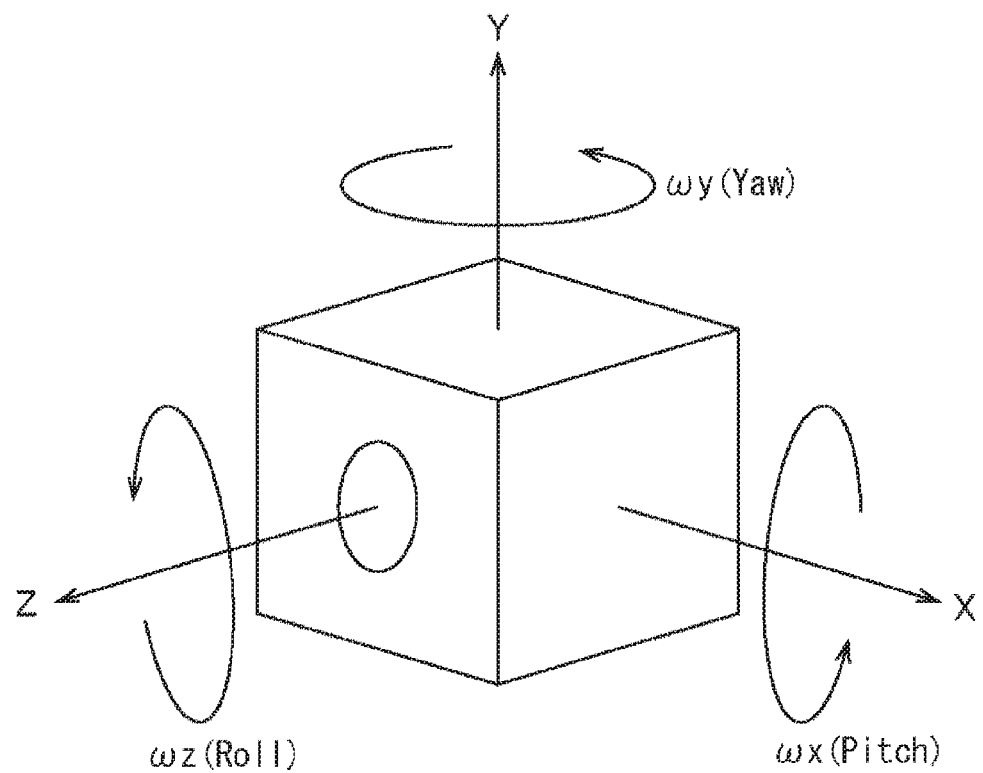
FIG. 35 is a diagram illustrating a relationship between a monocular camera and coordinate axes.
Figure 36:
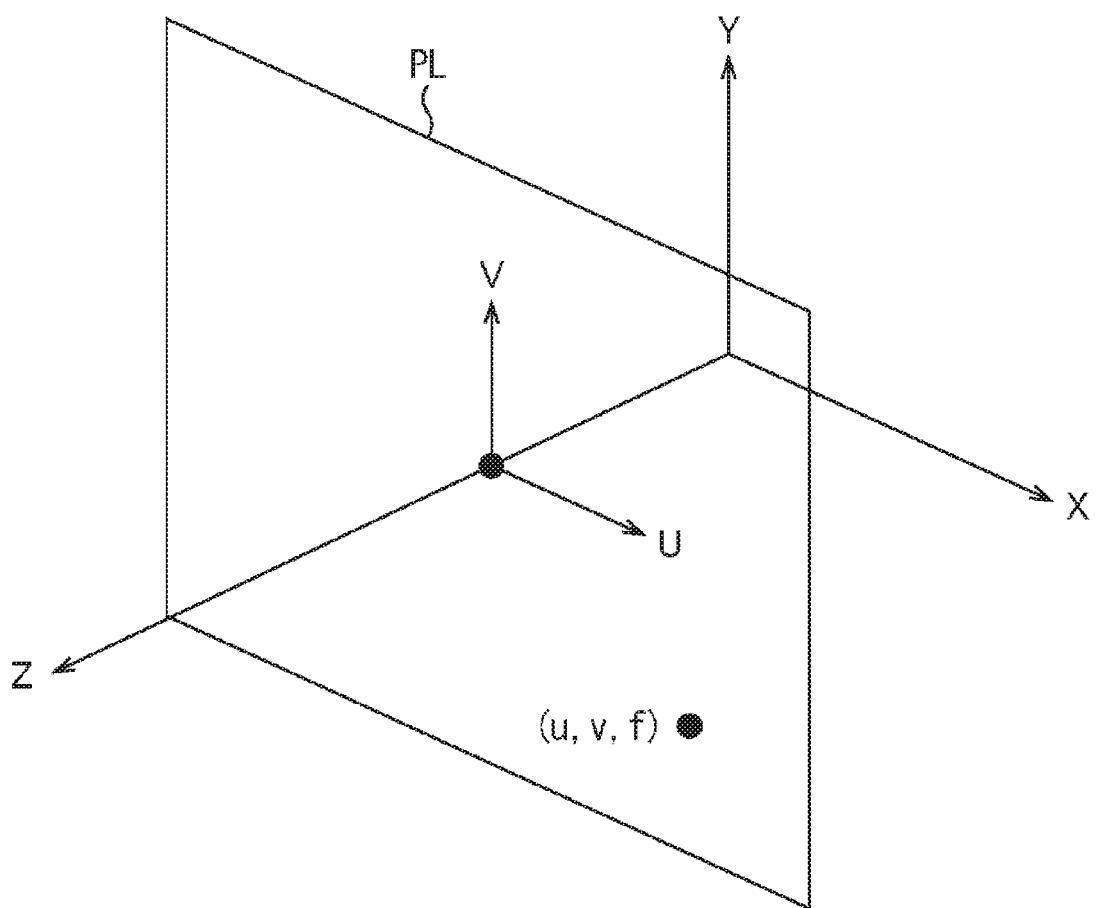
FIG. 36 is a diagram illustrating a relationship between a camera and an imaging surface.
Figure 37:
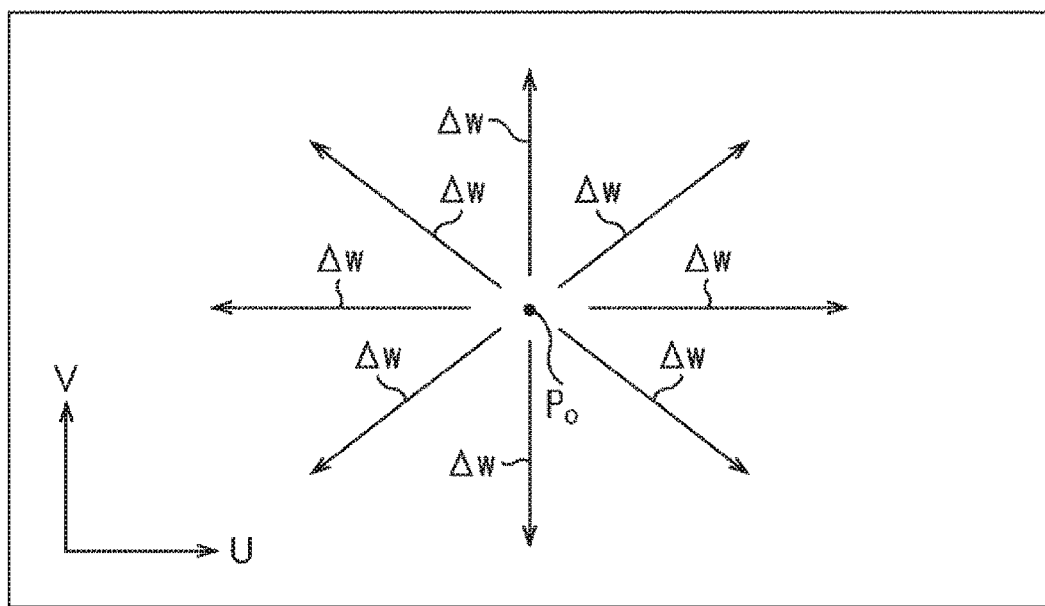
FIG. 37 is a diagram for describing an optical flow from a center of an image.

Next, a monocular motion stereo will be described with reference to FIGS. 35 to 37. FIG. 35 is a diagram illustrating a relationship between a monocular camera and coordinate axes. FIG. 36 is a diagram illustrating a relationship between a camera and an imaging surface. FIG. 37 is a diagram for describing an optical flow from a center of an image.

In monocular motion stereo, the amount of movement of the camera (hereinafter referred to as a camera motion parameter) is estimated from the optical flow between the images A and B, and the distance to the object existing in the image is estimated. Therefore, to implement the monocular motion stereo, relationship among the optical flow between the images A and B, the camera motion parameter, and the distance to the object is required. The camera motion parameter corresponds to the amount of movement of a capture unit.

Here, it is assumed that the object captured by the camera is stationary. In a general pinhole camera model as illustrated in FIG. 35, the model as illustrated in FIG. 36 is used as the camera and the imaging surface. The X and Y axes of camera coordinates and the U and V axes of the captured image are parallel to each other, and the center of the captured image is located at the position of (0, 0, f) in the camera coordinates (see FIG. 36). Here, f represents a focal length of the camera. PL represents a virtual imaging plane where the captured image is supposed to be located in the camera coordinate system.

The camera motion parameter has six degrees of freedom as illustrated in FIG. 35. In other words, three degrees of freedom with respect to the rotational movement amount (ωx, ωy, ωz) and three degrees of freedom with respect to the translational movement amount (tx, ty, tz). The rotational movement amount is a change amount of an angle within the unit time, and the translational movement amount is a change amount of a distance within the unit time. It is known that the following relationships are established among the camera motion parameters (ωx, ωy, ωz) and (tx, ty, tz), a distance z to the object captured by the camera, a certain point (u, v) in the image, and the optical flow (Δu, Δv) in the point.

$$\Delta u = -\omega y \cdot f - tx \cdot f/z + tz/z \cdot u + \omega z \cdot v + \omega x/f \cdot uv - \omega y/f \cdot u^2 \quad (18)$$

$$\Delta v = +\omega x \cdot f - ty \cdot f/z + tz/z \cdot v - \omega z \cdot u - \omega y/f \cdot uv + \omega x/f \cdot v^2 \quad (19)$$

The camera motion parameters are estimated from the optical flow using the equations (18) and (19). Note that, in a case where the vehicle 511 travels straight ahead, the camera motion parameters can be made simplified Since the camera 541 is a monocular camera, the camera motion parameters in the case of straight traveling are as follows.

$$(\omega x, \omega y, \omega z) = (0,0,0) \quad (20)$$

$$(tx, ty, tz) = (0,0,tz) \quad (21)$$

The equations (18) and (19) are as follows using the equations (20) and (21).

$$\Delta u = tz/z \cdot u \quad (22)$$

$$\Delta v = tz/z \cdot v \quad (23)$$

The following equation is obtained by squaring and adding respective sides of the equations (22) and (23).

$$(\Delta u)^2 + (\Delta v)^2 = tz^2/z^2 \cdot (u^2 + v^2) \quad (24)$$

Here, since the distance w from the center of the image is $w^2 = u^2 + v^2$, the equation (24) becomes the following equation using the equations (22) and (23).

$$\Delta w = tz/z \cdot w \quad (25)$$

The equation (25) means that the distance z can be estimated using the optical flow Δw (see FIG. 37) in a direction radially extending from the center of the image and a vehicle speed tz (a translational movement amount in the Z axis direction). It is theoretically explained that the distance z can be estimated by performing calculation as described above. FIG. 37 illustrates an image in which the starting point of the optical flow in the image B is also displayed on the image A. FIG. 37 can be regarded as an image of a vector set of optical flows. A point where these optical flows Δw converge toward the starting point is a vanishing point. In other words, the vanishing point can also be said to be a point where straight lines extending from the optical flow Δw toward the starting point intersect. In FIG. 37, a vanishing point Po coincides with the center of the image.

Referring back to the description of FIG. 32, in step S217, the analysis unit 714 integrates the information supplied from the stereo image processing unit 713, the edge angle detection unit 851, and the motion stereo processing unit 852 to calculate the distance. That is, the distance is recalculated on the basis of the detection result by the edge angle detection unit 851, the distance measurement processing result by the stereo image processing unit 713, and the distance measurement processing result by the motion stereo processing unit 852.

As described with reference to FIGS. 17 to 24, when the two cameras 541 and 542 of the stereo camera system 521 are arranged in the vertical direction (the direction perpendicular to the basis plane), the distance measurement in the lateral direction (direction parallel to the basis plane) in the image can be favorably performed. This is because the two cameras 541 and 542 are vertically arranged, so that the imaging position in the image easily changes in the lateral direction, and θa−θb in the equation (13) easily becomes large.

For example, in a case where the cameras 541 and 542 are installed on the side surface of the vehicle 511, the identification display on the road surface such as a white line on the road surface 551, the end portion of the road surface, the curb, the groove, the guardrail, and the like are often captured in a state close to a line in the lateral direction in the image. Therefore, the distance measurement by the stereo camera system 521 in which the cameras 541 and 542 are arranged in the vertical direction is advantageous. Conversely, distance measurement of vertical lines (lines in the vertical direction) in the image is disadvantageous. This is because, in a case where the cameras 541 and 542 are arranged in the vertical direction, detection of positional deviation of the vertical line caused by deviation of the imaging position in the vertical direction is difficult. For example, a rod-like object such as a utility pole in the camera view often has a vertical line (line in the vertical direction).

In a case where the vehicle 511 moves while the cameras 541 and 542 are arranged on the side surface of the vehicle 511 and capture an image, the object in the camera view flows in the lateral direction. In this way, in a case where the object in the image causes positional deviation with respect to time, motion stereo processing is easily applied. In the motion stereo, when the position of a stationary object in the image changes in the camera view together with movement of the camera, the distance measurement can be performed on the same principle as the stereo image processing in the stereo camera system using a plurality of cameras. In a case where the vertical line (the line in the vertical direction) in the image moves laterally, the positional deviation is easily detected and motion stereo is easily applied. Conversely, the motion stereo is not easily applied to the line in the lateral direction.

Therefore, the analysis unit 714 preferentially adopts the distance measured by the stereo image processing unit 713, for the line in the lateral direction or a line close to the line in the lateral direction on the basis of the direction of the edge detected by the edge angle detection unit 851. For example, calculation of the distance to the target object substantially extending along a road (that is, substantially parallel to the road), such as the road surface, the identification display on the road surface such as a white line, the end portion of the road surface, the curb, the groove, or the guardrail is executed by the stereo image processing unit 713. In contrast, the measurement result of the motion stereo processing unit 852 is preferentially adopted for the vertical line or the line close to the vertical line. For example, the motion stereo processing unit 852 executes calculation of the distance to the target object perpendicular to a road, such as a support post of a traffic signal or a traffic sign, a utility pole, or the like. Which measurement result is adopted may be determined in advance according to a reliability map created on the basis of experiments and the like.

As described above, the different distance measuring methods are adopted according to the direction of the line of the object. Of course, two methods may be integrated by weighting according to the direction of the edge or the like, instead of simply adopting one method.

In step S218, the stereo image processing unit 713, the edge angle detection unit 851, and the motion stereo processing unit 852 determine whether or not to terminate the processing. In a case where an instruction on termination of the processing has not been given yet from a user, the processing returns to step S211 and the processing in step S211 and subsequent steps is repeated. In a case where the instruction on the termination of the processing has been given, the processing is terminated.

Note that, in the above description, the distance measurement method has been made to correspond to the edge angle. However, for example, a detection unit that particularly detects an object substantially extending along a road (that is, substantially extending in parallel to the road), such as the road surface on the road, the identification display on the road surface such as a white line, the end portion of the road surface, the curb, the groove, or the guardrail, and a detection unit that particularly detects a target object not necessarily extending along the road (that is, substantially not in parallel to the road) can be separately provided. For example, the stereo image processing unit 713 may be configured as the detection unit that particularly detects the target object substantially extending in parallel to the road, and the motion stereo processing unit 852 may be configured as the detection unit that particularly detects the target object not necessarily in parallel to the road. In this case, the edge angle detection unit 851 can be omitted. Furthermore, a detection unit that detects an oncoming vehicle at a curve or the like can be provided.

As described above, according to the imaging control system 501 in FIG. 31, the distance is measured by a method according to the characteristic of the target object, whereby accurate measurement becomes possible.

Note that, although the imaging control system 501 in FIG. 31 is arranged on the left and right side surfaces of the vehicle 511. However, the imaging control system 501 can also be arranged on the front and rear sides of the vehicle, other than the side surfaces. Further, the front and rear, and the right and left imaging control systems 501 can perform the distance measurement operations in cooperation.

(6) Modifications (FIGS. 38, 39A, 39B, 39C, 40A, and 40B)

Next, modifications of the arrangement of the cameras 541 and 542 will be described with reference to FIGS. 38, 39A, 39B, 39C, 40A, and 40B. FIGS. 38, 39A, 39B, 39C, 40A, and 40B are diagrams illustrating arrangement of the cameras of the stereo camera system according to the second embodiment of the present technology.

Figure 38:
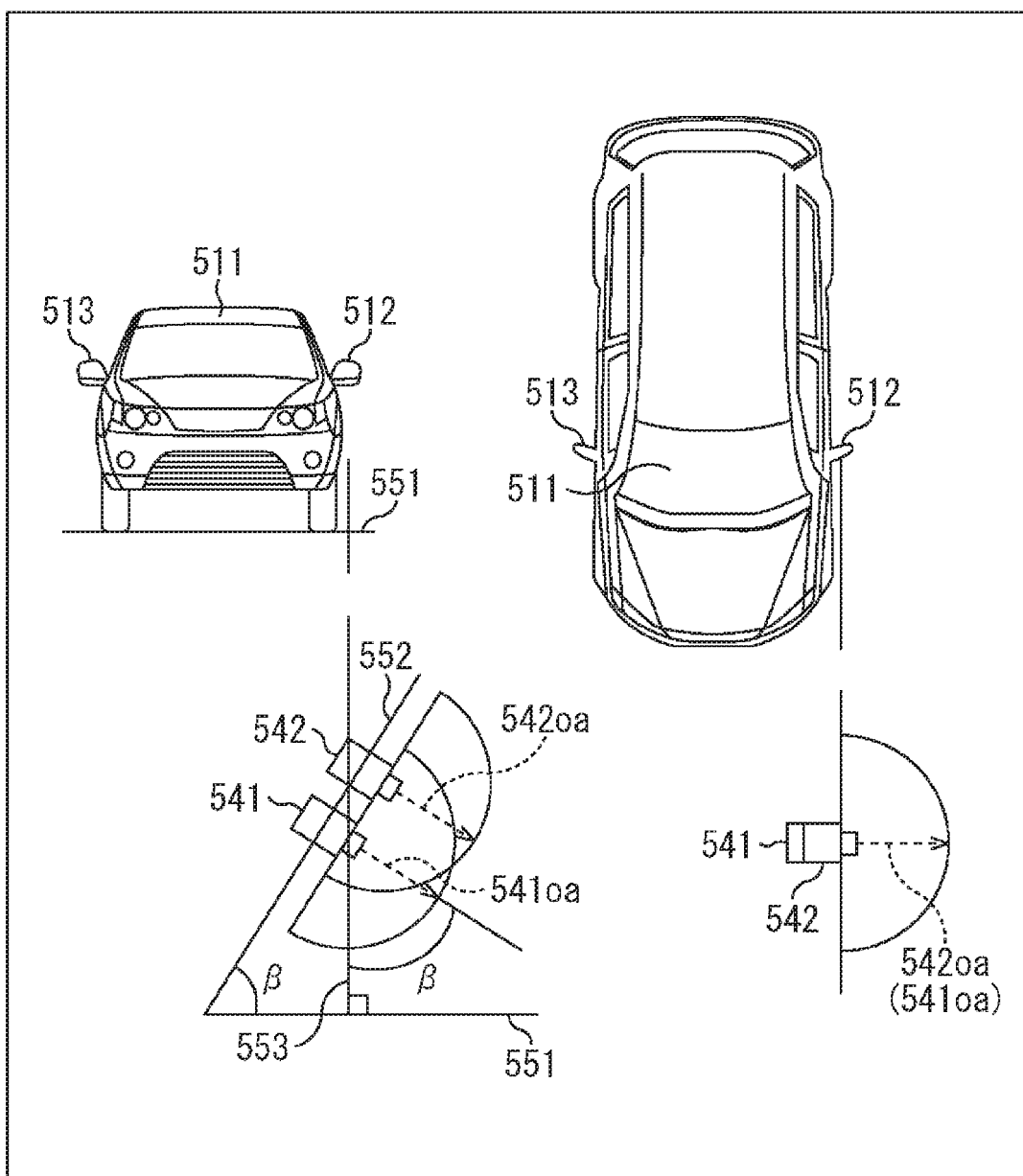
FIG. 38 is a diagram illustrating an arrangement of cameras of the stereo camera system according to the second embodiment of the present technology.
Figure 39:
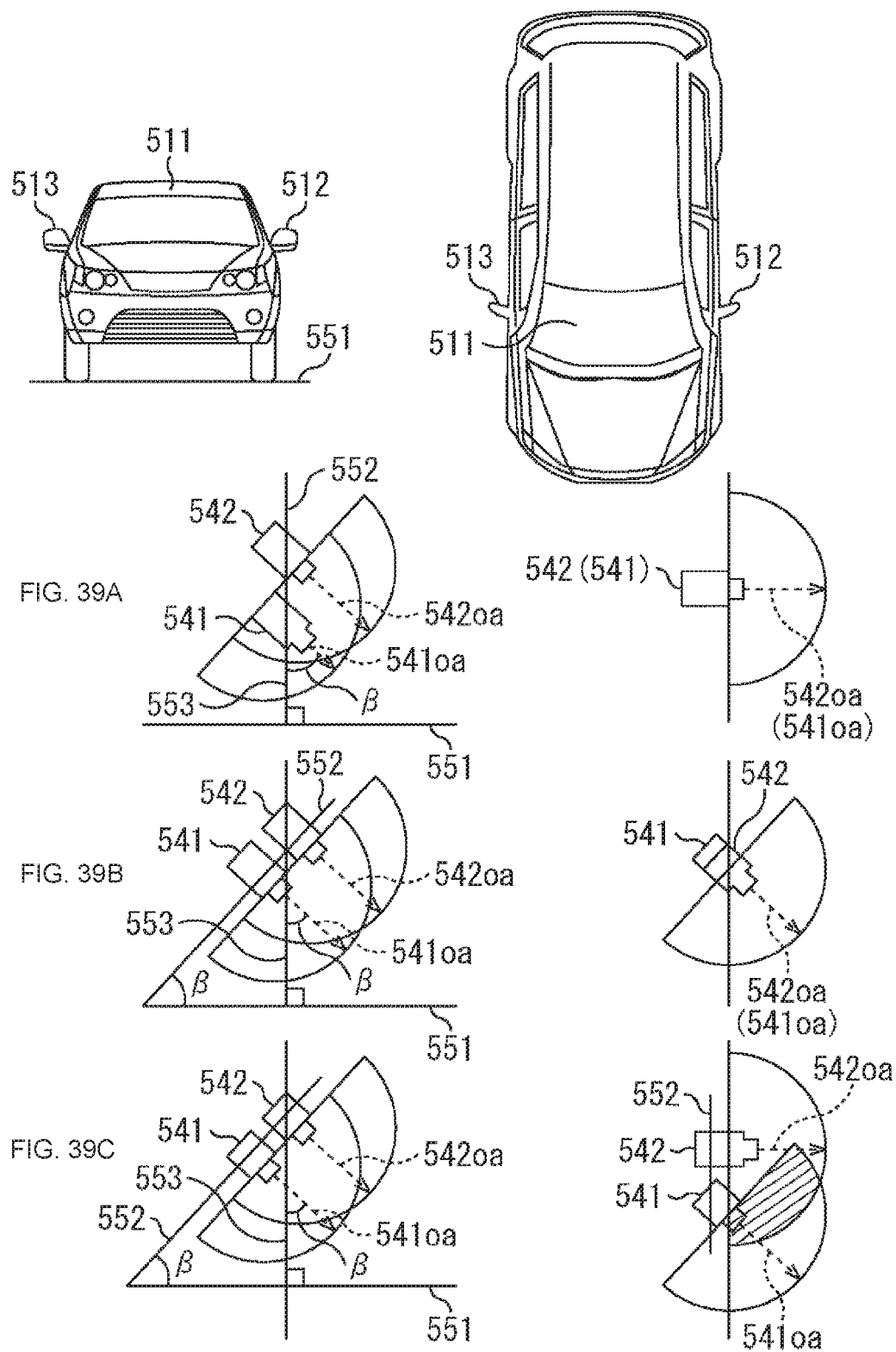
FIGS. 39A, 39B, and 39C are diagrams illustrating an arrangement of cameras of the stereo camera system according to the second embodiment of the present technology.
Figure 40:
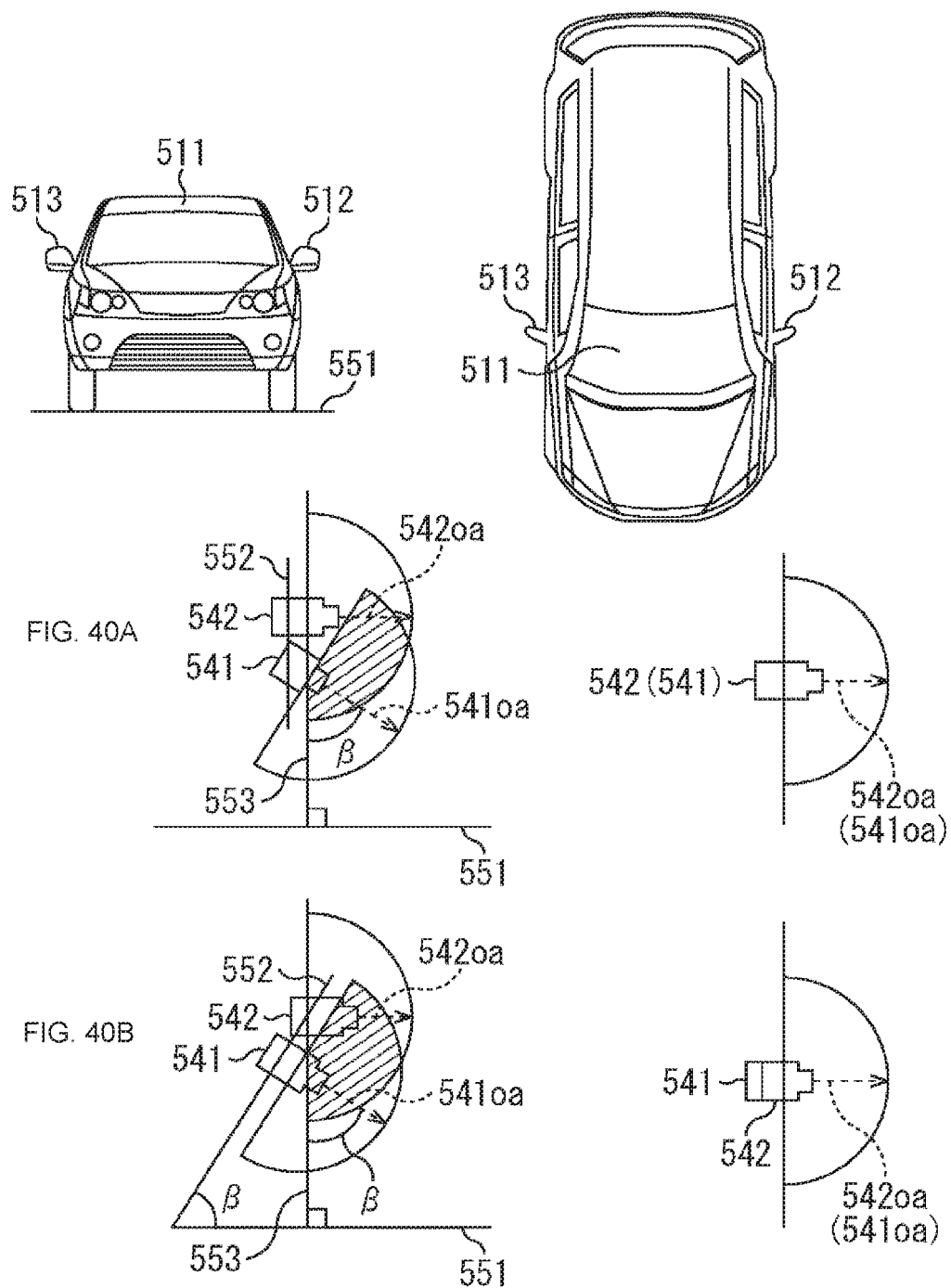
FIGS. 40A and 40B are diagrams illustrating an arrangement of cameras of the stereo camera system according to the second embodiment of the present technology.

In the examples of FIGS. 17 to 19, the cameras 541 and 542 have been arranged as illustrated in FIG. 38. In other words, as seen from the front of the vehicle 511 (in the left diagram in FIG. 38), the camera 542 is arranged above and the camera 541 is arranged below.

Then, the camera 542 is arranged at a position more distant from the vehicle 511 than the camera 541 (a position on an outer side of the vehicle 511), and the camera 541 is arranged at a position closer to the vehicle 511 than the camera 542 (a position on an inner side of the vehicle 511). The line 552 connecting the centers of the cameras 541 and 542 is inclined to jump out from the vehicle body to the monitoring direction (to jump out from the side of the vehicle 511). In other words, the line 552 is inclined to jump out from the mounting surface (side surface) of the vehicle body of the vehicle 511. The stereo camera system 521 is not parallel to the vehicle body and is not perpendicular to the road surface 551.

As seen from the front of the vehicle 511 (in the left diagram in FIG. 38), both the cameras 541 and 542 are directed in an obliquely downward direction of the vehicle 511. In other words, the cameras 541 and 542 are inclined in a plane including their optical axes 541oa and 542oa such that the optical axes 541oa and 542oa are directed downward with respect to the direction parallel to the basis plane (road surface 551) and intersect with the basis plane. That is, the cameras 541 and 542 are inclined such that the line 552 connecting the centers of the cameras 541 and 542 forms an angle β with respect to the basis plane. In other words, the cameras 541 and 542 are inclined such that the optical axes 541oa and 542oa form an angle β with respect to the line 553 perpendicular to the basis plane.

Furthermore, as seen from a top surface of the vehicle 511 (in the right diagram in FIG. 38), the optical axes 541oa and 542oa of the cameras 541 and 542 are directed in a direction perpendicular to a traveling direction (downward in FIG. 38) of the vehicle 511, that is, in a direction perpendicular to the side surface of the vehicle 511.

In contrast, in the example illustrated in FIG. 39A, as seen from the front of the vehicle 511 (in the left diagram in FIG. 39A), the camera 542 is arranged above and the camera 541 is arranged below. Then, the cameras 541 and 542 are arranged at the same distance from the vehicle 511. In other words, the cameras 541 and 542 are arranged such that the line 552 connecting the centers of the cameras 541 and 542 becomes parallel to the vehicle body (becomes perpendicular to the road surface 551 as the basis plane).

However, the cameras 541 and 542 are inclined in the plane including their optical axes 541oa and 542oa such that the optical axes 541oa and 542oa are directed downward with respect to the direction parallel to the basis plane and intersect with the basis plane.

Furthermore, as seen from the top surface of the vehicle 511 (in the right diagram in FIG. 39A), both the optical axes 5410a and 542oa of the cameras 541 and 542 are directed in the direction perpendicular to the traveling direction (downward in FIGS. 39A, 39B, and 39C) of the vehicle 511, that is, in the direction perpendicular to the side surface of the vehicle 511.

The configuration as seen from the front of the vehicle 511 of the example illustrated in FIG. 39B (in the left diagram in FIG. 39B) is similar to the case illustrated in the left diagram in FIG. 38. Repetitive description is omitted.

The configuration in the right diagram in FIG. 39B is different from the configuration in the right diagram in FIG. 38. In other words, in this example, both the optical axes 5410a and 542oa of the cameras 541 and 542 are directed, as seen from the top surface of the vehicle 511, slightly in the traveling direction, instead of the direction perpendicular to the traveling direction (downward in FIGS. 39A, 39B, and 39C) of the vehicle 511. When the optical axes 541oa and 542oa are slightly directed in the traveling direction like this, it is advantageous to perform a distance measuring operation in cooperation with the stereo camera system for measuring the distance in the range in the traveling direction (for example, the stereo camera system 521C for measuring the distance in the detection range 522C in FIG. 25).

The configuration as seen from the front of the vehicle 511 of the example illustrated in FIG. 39C (in the left diagram in FIG. 39C) is similar to the case illustrated in the left diagram in FIG. 38. Repetitive description is omitted.

The configuration in the right diagram in FIG. 39C is different from the configuration in the right diagram in FIG. 38. In other words, as seen from the top surface of the vehicle 511 (in the right diagram in FIG. 39C), the optical axis 542oa of the camera 542 is directed in the direction perpendicular to the traveling direction (downward in FIGS. 39A, 39B, and 39C) of the vehicle 511, that is, in the direction perpendicular to the side surface of the vehicle 511. That is, as far as the camera 542 is concerned, the configuration is similar to that of the case in FIG. 38.

In contrast, as for the camera 541, the optical axis 541oa is slightly directed in the traveling direction instead of in the direction perpendicular to the traveling direction (downward in FIGS. 39A, 39B, and 39C) of the vehicle 511. That is, as far as the camera 541 is concerned, the configuration is similar to that of the case in FIG. 39B. Therefore, the relatively narrow hatched range in the diagram is the distance-measurable range as the stereo camera system. In a case where the distance-measurable range needs to be expanded, a camera with the angle of view of 180 degrees or more can be used.

In the example illustrated in FIG. 40A, as seen from the front of the vehicle 511 (in the left diagram in FIG. 40A), the camera 542 is arranged above and the camera 541 is arranged below. Then, the cameras 541 and 542 are arranged at the same distance from the vehicle 511. In other words, the cameras 541 and 542 are arranged such that the line 552 connecting the centers of the cameras 541 and 542 becomes parallel to the vehicle body (becomes perpendicular to the road surface 551 as the basis plane).

Then, the camera 541 is directed in an obliquely downward direction of the vehicle 511 as seen from the front of the vehicle 511 (in the left diagram in FIG. 38). In other words, the camera 541 is inclined in the plane including the optical axis 541oa such that the optical axis 541oa is directed downward with respect to the direction parallel to the basis plane and intersects with the basis plane. The camera 541 is inclined such that the optical axis 541oa is at an angle β with respect to the line 553 perpendicular to the basis plane. That is, as far as the camera 541 is concerned, the configuration is similar to that of the case in FIG. 38.

However, the camera 542 is arranged such that the optical axis 542oa is directed parallel to the basis plane. That is, only one (the camera 541 arranged below) of the cameras 541 and 542 is arranged such that the optical axis 541oa is directed downward with respect to the direction parallel to the road surface 551 that is the basis plane, and intersects with the road surface 551. Then, the other (the camera 542 arranged above) is arranged such that the optical axis 542oa becomes parallel to the basis plane. Even when the cameras 541 and 542 are attached in this way, the hatched range in the vicinity of the vehicle 511 in the drawing is the distance-measurable range as the stereo camera system. The range is a relatively narrow range. In a case where the distance-measurable range needs to be expanded, a camera with the angle of view of 180 degrees or more can be used.

The configuration as seen from the front of the vehicle 511 of the example illustrated in FIG. 40A (in the right diagram in FIG. 40A) is similar to the case illustrated in the right diagram in FIG. 38. In other words, the optical axes 5410a and 542oa of the cameras 541 and 542 are directed in the direction perpendicular to the traveling direction (downward in FIGS. 40A and 40B) of the vehicle 511, that is, in the direction perpendicular to the side surface of the vehicle 511.

In the example illustrated in FIG. 40B, as seen from the front of the vehicle 511 (in the left diagram in FIG. 40B), the camera 542 is arranged above and the camera 541 is arranged below. Then, the camera 542 is arranged at a position more distant from the vehicle 511 than the camera 541, and the camera 541 is arranged at a position closer to the vehicle 511 than the camera 542. The line 552 connecting the centers of the cameras 541 and 542 is inclined to jump out from the vehicle body to the monitoring direction (to jump out from the side of the vehicle 511). That is, the cameras 541 and 542 are inclined such that the line 552 connecting the centers of the cameras 541 and 542 forms an angle β with respect to the basis plane.

Then, the camera 541 is inclined in the plane including the optical axis 541oa such that the optical axis 541oa is directed downward with respect to the direction parallel to the basis plane and intersects with the basis plane. That is, the camera 541 is inclined such that the line 552 connecting the center of the camera 541 and the center of the camera 542 forms an angle β with respect to the basis plane. In other words, the camera 541 is inclined such that the optical axis 541oa forms an angle β with respect to the line 553 perpendicular to the basis plane.

However, the camera 542 is arranged such that the optical axis 542oa is directed parallel to the basis plane. That is, only one (the camera 541 arranged below) of the cameras 541 and 542 is arranged such that the optical axis 541oa is directed downward with respect to the direction parallel to the road surface 551 that is the basis plane, and intersects with the road surface 551. Then, the other (the camera 542 arranged above) is arranged such that the optical axis 542oa becomes parallel to the basis plane. Even when the cameras 541 and 542 are attached in this way, the hatched range in the vicinity of the vehicle 511 in the drawing is the distance-measurable range as the stereo camera system. The range is a relatively narrow range. In a case where the distance-measurable range needs to be expanded, a camera with the angle of view of 180 degrees or more can be used.

The configuration as seen from the front of the vehicle 511 of the example illustrated in FIG. 40B (in the right diagram in FIG. 40B) is similar to the case illustrated in the right diagram in FIG. 38. In other words, the optical axes 5410a and 542oa of the cameras 541 and 542 are directed in the direction perpendicular to the traveling direction (downward in FIGS. 40A and 40B) of the vehicle 511, that is, in the direction perpendicular to the side surface of the vehicle 511.

In the above description, the angles of view of the cameras configuring the stereo camera system are the same (for example, 180 degrees), but the respective angles of view (focal lengths) may be different. If the angle of view is made wider, recognition in a wider range becomes possible, whereas if the angle of view is made narrow, recognition in a farther range in higher definition becomes possible. In the stereo camera system, the distance measurement within a range where the angles of view overlap becomes possible.

Note that various modifications may exist in the present technology within the scope not deviating from the essence of the present technology.

Application Example

The technology according to the present disclosure can be applied to various products. For example, the technology according to the present disclosure may be realized as a device mounted on any type of vehicles such as an automobile, an electric automobile, a hybrid electric automobile, an electric motorcycle, or the like.

Figure 41:
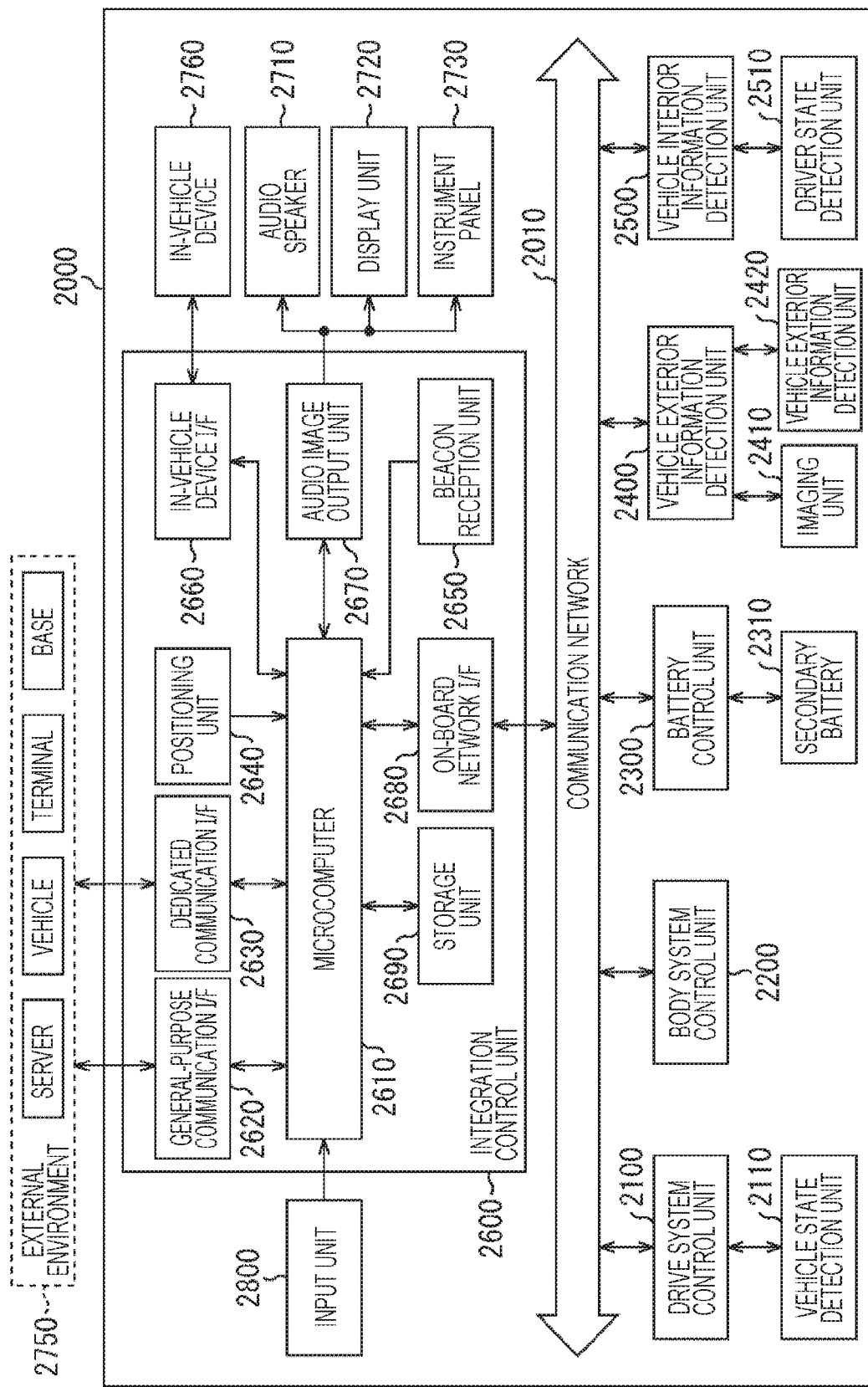

FIG. 41 is a block diagram illustrating a schematic configuration example of a vehicle control system 2000 to which the technology of the present disclosure is applicable. The vehicle control system 2000 includes a plurality of electronic control units connected via a communication network 2010. In the example illustrated in FIG. 41, the vehicle control system 2000 includes a drive system control unit 2100, a body system control unit 2200, a battery control unit 2300, a vehicle exterior information detection device 2400, a vehicle interior information detection device 2500, and an integration control unit 2600. The communication network 2010 that connects the plurality of control units may be, for example, an on-board communication network conforming to an arbitrary standard such as a controller area network (CAN), a local interconnect network (LIN), a local area network (LAN), or FlexRay (registered trademark), or a network conforming to a locally defined communication standard.

Each control unit includes, for example, a microcomputer that performs arithmetic processing according to various programs, a storage unit that stores programs executed by the microcomputer, parameters used for various calculations, and the like, and a drive circuit that drives various devices to be controlled. Each control unit includes a network I/F for communicating with another control unit via the communication network 2010 and a communication I/F for communicating with a device, a sensor, or the like outside the vehicle by wired communication or wireless communication. FIG. 41 illustrates, as functional configurations of the integration control unit 2600, a microcomputer 2610, a general-purpose communication I/F 2620, a dedicated communication I/F 2630, a positioning unit 2640, a beacon reception unit 2650, an in-vehicle device I/F 2660, an audio image output unit 2670, an on-board network I/F 2680, and a storage unit 2690. Similarly, the other control units include a microcomputer, a communication I/F, a storage unit, and the like.

The drive system control unit 2100 controls an operation of a device regarding a drive system of a vehicle according to various programs. For example, the drive system control unit 2100 functions as a control device of a drive force generation device for generating drive force of the vehicle, such as an internal combustion engine or a drive motor, a drive force transmission mechanism for transmitting drive force to wheels, a steering mechanism that adjusts a steering angle of the vehicle, a braking device that generates braking force of the vehicle and the like. The drive system control unit 2100 may have a function as a control device of an antilock brake system (ABS), electronic stability control (ESC), or the like.

The drive system control unit 2100 is connected with a vehicle state detection unit 2110. The vehicle state detection unit 2110 includes, for example, at least one of a gyro sensor for detecting angular velocity of an axial rotational motion of a vehicle body, an acceleration sensor for detecting acceleration of the vehicle, or a sensor for detecting an operation amount of an accelerator pedal, an operation amount of a brake pedal, a steering angle of a steering wheel, an engine speed, rotation speed of a wheel, or the like. The drive system control unit 2100 performs arithmetic processing using a signal input from the vehicle state detection unit 2110 and controls the internal combustion engine, the drive motor, an electric power steering device, a brake device, or the like.

The body system control unit 2200 controls operations of various devices equipped in the vehicle body according to various programs. For example, the body system control unit 2200 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 2200. The body system control unit 2200 receives an input of the radio waves or the signals, and controls a door lock device, the automatic window device, the lamps, and the like of the vehicle.

The battery control unit 2300 controls a secondary battery 2310 that is a power supply source of the drive motor according to various programs. For example, the battery control unit 2300 receives information such as a battery temperature, a battery output voltage, or a remaining capacity of the battery from a battery device including the secondary battery 2310. The battery control unit 2300 performs arithmetic processing using these signals to control temperature adjustment of the secondary battery 2310, a cooling device provided in the battery device, or the like.

The vehicle exterior information detection device 2400 detects information of an outside of the vehicle having the vehicle control system 2000 mounted. For example, at least one of an imaging unit 2410 or a vehicle exterior information detection unit 2420 is connected to the vehicle exterior information detection device 2400. The imaging unit 2410 includes at least one of a time of flight (ToF) camera, a stereo camera, a monocular camera, an infrared camera, or another camera. The vehicle exterior information detection unit 2420 includes, for example, an environmental sensor for detecting current weather or atmospheric phenomena or an ambient information detection sensor for detecting other vehicles, obstacles, pedestrians, and the like around the vehicle equipped with the vehicle control system 2000.

The environmental sensor may be, for example, at least one of a raindrop sensor for detecting rainy weather, a fog sensor for detecting fog, a sunshine sensor for detecting the degree of sunshine, or a snow sensor for detecting snowfall. The ambient information detection sensor may be at least one of an ultrasonic sensor, a radar device, or a light detection and ranging, laser imaging detection and ranging (LIDAR) device. The imaging unit 2410 and the vehicle exterior information detection unit 2420 may be provided as independent sensors or devices, respectively, or may be provided as devices in which a plurality of sensors or devices is integrated.

Figure 42:
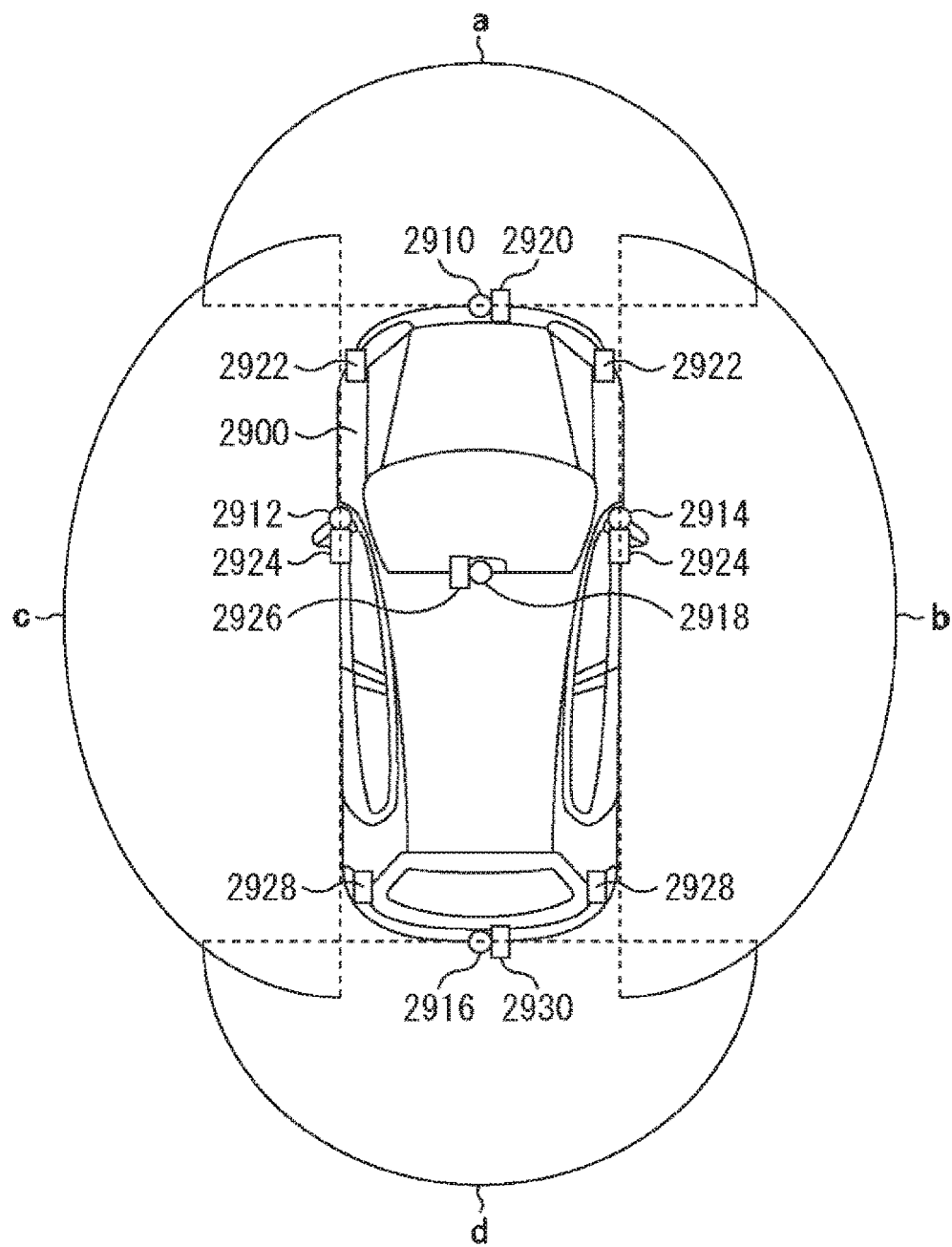

Here, FIG. 42 illustrates an example of installation positions of the imaging unit 2410 and the vehicle exterior information detection unit 2420. Each of imaging units 2910, 2912, 2914, 2916, and 2918 is provided at least one of positions such as a front nose, side mirrors, a rear bumper, a back door, and an upper portion of a windshield in an interior of a vehicle 2900, for example. The imaging unit 2910 provided at the front nose and the imaging unit 2918 provided at the upper portion of the windshield in the interior of the vehicle mainly acquire front images of the vehicle 2900. The imaging units 2912 and 2914 provided at the side mirrors mainly acquire side images of the vehicle 2900. The imaging unit 2916 provided at the rear bumper or the back door mainly acquires a rear image of the vehicle 2900. The imaging unit 2918 provided at the upper portion of the windshield in the interior of the vehicle is mainly used for detecting a preceding vehicle, a pedestrian, an obstacle, a traffic signal, a traffic sign, a lane, or the like.

Note that FIG. 42 illustrates an example of capture ranges of the imaging units 2910, 2912, 2914, and 2916. An imaging range a indicates an imaging range of the imaging unit 2910 provided at the front nose, imaging ranges b and c respectively indicate imaging ranges of the imaging units 2912 and 2914 provided at the side mirrors, and an imaging range d indicates an imaging range of the imaging unit 2916 provided at the rear bumper or the back door. For example, a bird's-eye view image of the vehicle 2900 as viewed from above can be obtained by superimposing image data imaged in the imaging units 2910, 2912, 2914, and 2916.

Vehicle exterior information detection units 2920, 2922, 2924, 2926, 2928, and 2930 provided at the front, rear, side, corner, and upper portion of the windshield in the interior of the vehicle 2900 may be ultrasonic sensors or radar devices, for example. Vehicle exterior information detection units 2920, 2926, and 2930 provided at the front nose, the rear bumper, the back door, and the upper portion of the windshield in the interior of the vehicle 2900 may be LIDAR devices, for example. These vehicle exterior information detection units 2920 to 2930 are mainly used for detecting a preceding vehicle, a pedestrian, an obstacle, and the like.

Referring back to FIG. 41, the description will be continued. The vehicle exterior information detection device 2400 causes the imaging unit 2410 to image an image of the outside the vehicle, and receives imaged image data. Furthermore, the vehicle exterior information detection device 2400 receives detection information from the connected vehicle exterior information detection unit 2420. In a case where the vehicle exterior information detection unit 2420 is an ultrasonic sensor, a radar device, or an LIDAR device, the vehicle exterior information detection device 2400 transmits ultrasonic waves, electromagnetic waves, or the like and receives information of received reflected waves. The vehicle exterior information detection device 2400 may perform object detection processing or distance detection processing for persons, vehicles, obstacles, signs, letters, or the like on a road surface on the basis of the received information. The vehicle exterior information detection device 2400 may perform environment recognition processing of recognizing rainfall, fog, a road surface condition, or the like on the basis of the received information. The vehicle exterior information detection device 2400 may calculate the distance to the object outside the vehicle on the basis of the received information.

Furthermore, the vehicle exterior information detection device 2400 may perform image recognition processing or distance detection processing of recognizing persons, vehicles, obstacles, signs, letters, or the like on a road surface on the basis of the received image data. The vehicle exterior information detection device 2400 may perform processing such as distortion correction or alignment for the received image data and combine the image data imaged by different imaging units 2410 to generate a bird's-eye view image or a panoramic image. The vehicle exterior information detection device 2400 may perform viewpoint conversion processing using the image data imaged by the different imaging units 2410.

The vehicle interior information detection device 2500 detects information of an inside of the vehicle. The vehicle interior information detection device 2500 is detected with a driver state detection unit 2510 that detects a state of a driver, for example. The driver state detection unit 2510 may include a camera for imaging the driver, a biometric sensor for detecting biological information of the driver, a microphone for collecting sounds in the interior of the vehicle, and the like. The biometric sensor is provided, for example, on a seating surface, a steering wheel, or the like, and detects the biological information of an occupant sitting on a seat or the driver holding the steering wheel. The vehicle interior information detection device 2500 may calculate the degree of fatigue or the degree of concentration of the driver or may determine whether or not the driver falls asleep at the wheel on the basis of detection information input from the driver state detection unit 2510. The vehicle interior information detection device 2500 may perform processing such as noise canceling processing for collected sound signals.

The integration control unit 2600 controls the overall operation in the vehicle control system 2000 according to various programs. The integration control unit 2600 is connected with an input unit 2800. The input unit 2800 is realized by a device that can be operated and input by an occupant, such as a touch panel, a button, a microphone, a switch, or a lever, for example. The input unit 2800 may be, for example, a remote control device using an infrared ray or another radio waves, or may be an externally connected device such as a mobile phone or a personal digital assistant (PDA) corresponding to the operation of the vehicle control system 2000. The input unit 2800 may be, for example, a camera, and in this case, the occupant can input information by gesture. Moreover, the input unit 2800 may include, for example, an input control circuit that generates an input signal on the basis of the information input by the occupant or the like using the above input unit 2800 and outputs the input signal to the integration control unit 2600, and the like. The occupant or the like inputs various data to and instructs the vehicle control system 2000 on a processing operation by operating the input unit 2800.

The storage unit 2690 may include a random access memory (RAM) for storing various programs executed by the microcomputer, and a read only memory (ROM) for storing various parameters, a calculation result, a sensor value, or the like. Furthermore, the storage unit 2690 may be realized by a magnetic storage device such as a hard disc drive (HDD), a semiconductor storage device, an optical storage device, a magneto-optical storage device, or the like.

The general-purpose communication I/F 2620 is a general-purpose communication I/F that mediates communication with various devices existing in an external environment 2750. The general-purpose communication I/F 2620 may include, for example, a cellular communication protocol such a global system of mobile communications (GSM) (registered trademark), WiMAX, long term evolution (LTE), or LTE-advanced (LTE-A), or another wireless communication protocol such as a wireless LAN (also called Wi-Fi (registered trademark)). The general-purpose communication I/F 2620 may be connected to a device (for example, an application server or a control server) existing on an external network (for example, the Internet, a cloud network, or a company specific network) via a base station or an access point, for example. Furthermore, the general-purpose communication I/F 2620 may be connected with a terminal (for example, a terminal of a pedestrian or a shop, or a machine type communication (MTC) terminal) existing in the vicinity of the vehicle, using a peer to peer (P2P) technology, for example.

The dedicated communication I/F 2630 is a communication I/F supporting a communication protocol formulated for use in the vehicle. The dedicated communication I/F 2630 may include, for example, a standard protocol such as a wireless access in vehicle environment (WAVE) that is a combination of a lower layer IEEE 802.11p and an upper layer IEEE 1609, or dedicated short range communications (DSRC). The dedicated communication I/F 2630 typically performs V2X communication that is a concept including one or more of vehicle to vehicle communication, vehicle to infrastructure communication, and vehicle to pedestrian communication.

The positioning unit 2640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 2640 may specify a current position by exchanging signals with a wireless access point or may acquire the position information from a terminal such as a mobile phone, a PHS, or a smartphone having a positioning function.

The beacon reception unit 2650 receives, for example, a radio wave or an electromagnetic wave transmitted from a wireless station or the like installed on a road, and acquires information such as a current position, congestion, road closure, or required time. Note that the function of the beacon reception unit 2650 may be included in the above-described dedicated communication I/F 2630.

The in-vehicle device I/F 2660 is a communication interface that mediates connection between the microcomputer 2610 and various devices existing in the vehicle. The in-vehicle device I/F 2660 may establish wireless connection using a wireless communication protocol such as a wireless LAN, Bluetooth (registered trademark), near field communication (NFC), or wireless USB (WUSB). Furthermore, the in-vehicle device I/F 2660 may establish wired connection via a connection terminal (not illustrated) (and a cable if necessary). The in-vehicle device I/F 2660 exchanges control signals or data signals with, for example, a mobile device or a wearable device possessed by the occupant, or an information device carried in or attached to the vehicle.

The on-board network I/F 2680 is an interface that mediates communication between the microcomputer 2610 and the communication network 2010. The on-board network I/F 2680 transmits and receives signals and the like according to a predetermined protocol supported by the communication network 2010.

The microcomputer 2610 of the integration control unit 2600 controls the vehicle control system 2000 according to various programs on the basis of information acquired via at least one of the general-purpose communication I/F 2620, the dedicated communication I/F 2630, the positioning unit 2640, the beacon reception unit 2650, the in-vehicle device I/F 2660, or the on-board network I/F 2680. For example, the microcomputer 2610 may calculate a control target value of the drive force generation device, the steering mechanism, or the brake device on the basis of the acquired information of the interior and the exterior of the vehicle, and output a control command to the drive system control unit 2100. For example, the microcomputer 2610 may perform cooperative control for the purpose of avoiding a collision of the vehicle or alleviating impact, tracking based on the distance between vehicles, vehicle speed maintained traveling, automatic driving, or the like.

The microcomputer 2610 may create local map information including peripheral information of the current position of the vehicle on the basis of information acquired via at least one of the general-purpose communication I/F 2620, the dedicated communication I/F 2630, the positioning unit 2640, the beacon reception unit 2650, the in-vehicle device I/F 2660, or the on-board network I/F 2680. Furthermore, the microcomputer 2610 may predict danger such as a collision of the vehicle, approach of a pedestrian or the like, or entry of the pedestrian or the like into a closed road on the basis of the acquired information, and generate a warning signal. The warning signal may be, for example, a signal for generating a warning sound or for lighting a warning lamp.

The audio image output unit 2670 transmits an output signal of at least one of a sound or an image to an output device that can visually and aurally notify the occupant of the vehicle or outside the vehicle of information. In the example in FIG. 41, as the output device, an audio speaker 2710, a display unit 2720, and an instrument panel 2730 are exemplarily illustrated. The display unit 2720 may include, for example, at least one of an on-board display or a head-up display. The display unit 2720 may have an augmented reality (AR) display function. The output device may be another device such as a headphone, a projector, or a lamp, other than these devices. In the case where the output device is a display device, the display device visually displays a result obtained in various types of processing performed by the microcomputer 2610 or information received from another control unit, in various formats such as a text, an image, a table, and a graph. Furthermore, in the case where the output device is an audio output device, the audio output device converts an audio signal including reproduced audio data, acoustic data, and the like into an analog signal, and aurally outputs the analog signal.

Note that, in the example illustrated in FIG. 41, at least two control units connected via the communication network 2010 may be integrated as one control unit. Alternatively, an individual control unit may be configured by a plurality of control units. Moreover, the vehicle control system 2000 may include another control unit (not illustrated). Furthermore, in the above description, some or all of the functions carried out by any one of the control units may be performed by another control unit. That is, predetermined arithmetic processing may be performed by any of the control units as long as information is transmitted and received via the communication network 2010. Similarly, a sensor or a device connected to any of the control units may be connected to another control unit, and a plurality of control units may transmit and receive detection information to each other via the communication network 2010.

In the above-described vehicle control system 2000, the imaging control unit 81 and the imaging control unit 581 according to the present embodiment described with reference to FIGS. 4, 23, 26, 27, and 31 can be applied to the integration control unit 2600 of the application example illustrated in FIG. 41.

Further, at least part of the configuration elements of the imaging control unit 81 and the imaging control unit 581 described with reference to FIGS. 4, 23, 26, 27, and 31 may be realized in a module (for example, an integrated circuit module configured by one die) for the integration control unit 2600 illustrated in FIG. 41. Alternatively, the imaging control unit 81 and the imaging control unit 581 described with reference to FIGS. 4, 23, 26, 27, and 31 may be realized by a plurality of the control units of the vehicle control system 2000 illustrated in FIG. 41.

Note that a computer program for realizing the functions of the imaging control unit 81 and the imaging control unit 581 described with reference to FIGS. 4, 23, 26, 27, and 31 can be mounted in any of the control units or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium.

Furthermore, embodiments of the present technology are not limited to the above-described embodiments, and various modifications can be made without departing from the gist of the present technology.

<Others>

The present technology can also have the following configurations.

(1)

An imaging control device including:

an imaging control unit configured to control imaging by a stereo camera system including at least a set of cameras arranged in a vertical direction, the set of cameras including at least one camera arranged to have an optical axis directed obliquely downward; and a monitoring processing unit configured to perform monitoring processing on the basis of an image captured by the stereo camera system.

(2)

The imaging control device according to (1), in which the image is an image captured by the camera arranged on a side surface of a vehicle.

(3)

The imaging control device according to (1) or (2), in which the monitoring processing unit calculates a distance of a target object along a surface on which the vehicle travels.

(4)

The imaging control device according to (1) or (3), in which the target object includes any one of a road surface, an identification display on the road surface, an end portion of the road surface, a curb, and a guardrail.

(5)

The imaging control device according to any one of (1) to (4), further including:

another monitoring processing unit configured to calculate a distance of a target object perpendicular to the surface where the vehicle travels.

(6)

The imaging control device according to any one of (1) to (5), in which the monitoring processing unit performs distance measurement processing based on the stereo camera system, and the another monitoring processing unit performs distance measurement processing by motion stereo processing.

(7)

The imaging control device according to any one of (1) to (6), in which the monitoring processing unit detects an edge from the image captured by the camera, and calculates a distance on the basis of an angle of the edge.

(8)

The imaging control device according to any one of (1) to (7), further including:

an image conversion unit configured to convert the image captured by the camera into an image viewing a periphery of the vehicle.

(9)

The imaging control device according to any one of (1) to (8), further including:

a distance measurement unit configured to perform distance measurement processing for a distance in front of and behind the vehicle by an ultrasonic wave, a radar, a laser sensor, or an infrared sensor.

(10)

The imaging control device according to any one of (1) to (9), in which the camera arranged to have the optical axis directed obliquely downward is arranged such that an angle made by the optical axis and a direction toward directly below the vehicle from the optical axis falls within a range from Π/6 to 5Π/12.

(11)

The imaging control device according to any one of (1) to (10), in which the image captured by the camera is an image captured by a wide-angle camera.

(12)

The imaging control device according to any one of (1) to (11), further including:

at least a set of cameras configuring the stereo camera system.

(13)

An imaging control method including:

a step of controlling imaging by a stereo camera system including at least a set of cameras arranged in a vertical direction, the set of cameras including at least one camera arranged to have an optical axis directed obliquely downward; and a step of performing monitoring processing on the basis of an image captured by the stereo camera system.

(14)
A vehicle including:
a stereo camera system including at least a set of cameras arranged in a vertical direction, the set of cameras including at least one camera arranged to have an optical axis directed obliquely downward; and
a monitoring processing unit configured to perform monitoring processing on the basis of an image captured by the stereo camera system.

REFERENCE SIGNS LIST

1 Imaging control system
11 Vehicle
21A to 21D Stereo camera system
22A to 22D Detection range
91A to 91D Stereo distance measurement unit
92A to 92D Distance accuracy improvement unit
93 Integration unit
101A to 101D and 102A to 102D Imaging unit

The invention claimed is:
1. An imaging control device, comprising:
circuitry configured to:
control an imaging operation of a stereo camera system, wherein
the stereo camera system includes a set of cameras in a first direction, and
the set of cameras includes at least one camera that has an optical axis directed obliquely downward with respect to a second direction different from the first direction;
execute a monitoring process based on a first image captured by the at least one camera;
detect an edge portion from the first image based on a change in one of a color or brightness in the first image;
detect an angle of the edge portion based on a direction of the change;
determine a first distance of a first target object from the imaging control device based on the monitoring process and the angle of the edge portion, wherein the first target object is along the second direction; and
determine a second distance of a second target object from the imaging control device based on a motion stereo process, wherein
the second target object is along a third direction that is perpendicular to the second direction, and
the motion stereo process is based on a movement of the at least one camera and a change in a position of the second target object in the first image with respect to a second image captured by the at least one camera.
2. The imaging control device according to claim 1, wherein the at least one camera is on a side surface of a vehicle.
3. The imaging control device according to claim 2, wherein the vehicle travels along the second direction.
4. The imaging control device according to claim 3, wherein the first target object includes one of a road surface, an identification display on the road surface, an end portion of the road surface, a curb, a groove, or a guardrail.
5. The imaging control device according to claim 1, wherein the circuitry is further configured to determine the first distance of the first target object from the imaging control device based on the stereo camera system.

6. The imaging control device according to claim 2, wherein
the circuitry is further configured to convert the first image into a third image, and
the third image includes a periphery of the vehicle.
7. The imaging control device according to claim 2, wherein
the first target object corresponds to an object that is in one of a front of the vehicle or behind the vehicle, and
the circuitry is further configured to determine the first distance of the first target object based on one of an ultrasonic wave, a radar, a laser sensor, or an infrared sensor.
8. The imaging control device according to claim 2, wherein
an angle between the optical axis and the second direction is within a range from $\Pi/6$ to $5\Pi/12$, and
the second direction is along a traveling direction of the vehicle.
9. The imaging control device according to claim 2, wherein the at least one camera is a wide-angle camera.
10. The imaging control device according to claim 2, further comprising the stereo camera system.
11. An imaging control method, comprising:
controlling, by circuitry of an imaging control device, an imaging operation of a stereo camera system, wherein
the stereo camera system includes a set of cameras in a first direction, and
the set of cameras includes at least one camera that has an optical axis directed obliquely downward with respect to a second direction different from the first direction;
executing, by the circuitry, a monitoring process based on a first image captured by the at least one camera;
detecting, by the circuitry, an edge portion from the first image based on a change in one of a color or brightness in the first image;
detecting, by the circuitry, an angle of the edge portion based on a direction of the change;
determining, by the circuitry a first distance of a first target object from the imaging control device based on the monitoring process and the angle of the edge portion, wherein the first target object is along the second direction; and
determining, by the circuitry, a second distance of a second target object from the imaging control device based on a motion stereo process, wherein
the second target object is along a third direction that is perpendicular to the second direction, and
the motion stereo process is based on a movement of the at least one camera and a change in a position of the second target object in the first image with respect to a second image captured by the at least one camera.
12. A vehicle, comprising:
a stereo camera system including a set of cameras in a first direction, wherein
the set of cameras includes at least one camera that has an optical axis directed obliquely downward with respect to a second direction different from the first direction, and
the at least one camera is configured to capture a first image and a second image; and circuitry configured to:
- execute a monitoring process based on the first image;
- detect an edge portion from the first image based on a change in one of a color or brightness in the first image;
- detect an angle of the edge portion based on a direction of the change;
- determine a first distance of a first target object from the vehicle based on the monitoring process and the angle of the edge portion, wherein the first target object is along the second direction; and
- determine a second distance of a second target object from the vehicle based on a motion stereo process, wherein
  - the second target object is along a third direction that is perpendicular to the second direction, and
  - the motion stereo process is based on a movement of the at least one camera and a change in a position of the second target object in the first image with respect to the second image.

* * * * *